United States Patent [19]

Tingleff et al.

[11] 4,424,038

[45] Jan. 3, 1984

[54] INFLIGHT AIRCRAFT TRAINING SYSTEM

[75] Inventors: Paul Tingleff, Amherst; Homer Prue; Charles Stewart, both of Nashua, all of N.H.

[73] Assignee: Sanders Associates, Inc., Nashua, N.H.

[21] Appl. No.: 117,407

[22] Filed: Jan. 31, 1980

[51] Int. Cl.³ .............................................. G09B 9/08
[52] U.S. Cl. ....................................................... 434/2
[58] Field of Search ........................................ 434/2, 3

[56] References Cited

U.S. PATENT DOCUMENTS

| | | | |
|---|---|---|---|
| 3,514,521 | 5/1970 | Burchard et al. | 434/2 |
| 3,808,711 | 5/1974 | Membrino et al. | 434/2 |
| 4,085,524 | 4/1978 | Meyer | 434/2 |

FOREIGN PATENT DOCUMENTS 1383325  2/1975  United Kingdom ................... 434/3

OTHER PUBLICATIONS

"Aids to Training-The Design of Radar Synthetic Training Devices For the R.A.F.", by G. W. A. Dummer, Paper No. 740, Radio Section, Proceedings of Institution of Electrical Engineers-Part 3-Mar. 1949, British, pp. 101-112.

*Primary Examiner*—Maynard R. Wilbur
*Assistant Examiner*—Robert C. Burk
*Attorney, Agent, or Firm*—Louis Etlinger; Donald A. Streck

[57] ABSTRACT

Inflight training apparatus is provided for military aircraft radar warning receivers that is plug compatible with the standard receiver processor to provide realistic training scenarios responsive to pilot maneuvering while recording the pilot's actions for post flight analysis. The training apparatus includes inertial navigation equipment to indicate position and attitude of the training aircraft, a memory in which is stored position and types of enemy radars and threats that would be encountered on an actual combat mission, and a processor which receives inputs from the inertial navigation equipment, memory and radar warning receiver control panel to control the standard receiver video display to generate the training scenario thereon. The training display moves, rotates, and is blanked simulating the effects of aircraft altitude and attitude as the aircraft turns, banks and performs other maneuvers which may be navigational or evasive maneuvers.

5 Claims, 8 Drawing Figures

INFLIGHT AIRCRAFT TRAINING SYSTEM

FIELD OF THE INVENTION

This invention relates in general to aircraft training systems.

BACKGROUND OF THE INVENTION

In the prior art, equipment for providing training for particular aircraft systems have generally been simulators located on the ground at training facility locations. There are only a few training locations at which a limited number of expensive simulators are located and these locations are remote from most operational aircraft bases which are located all over the world. In addition to there being an insufficient number of simulators to provide frequent training to all air crew members, the aircraft crew members to be trained must leave their operations units in order to receive such training. In many cases reduction in aircrew manpower for even a few days of training is unacceptable.

Prior art ground based simulators can provide only a small amount of realism and cannot provide the realism of an actual flight.

Some inflight training arrangements are available at one or two training ranges where the air crewmen fly over the training range and receive realistic radar warning displays with inflight realism. Inflight training range training has limitations, however, in that the air crewmen must leave their operations bases, all air crewmen cannot receive frequent training, the training scenario is limited and expensive to change, and the training scenario is relatively short unlike actual combat missions.

Thus, existing ground based aircraft training simulators and inflight training range facilities both have limitations which limit their usefulness.

SUMMARY OF THE INVENTION

The present invention solves the aforementioned shortcomings of the prior art inflight training range facilities and ground located simulator training systems. The present invention permits frequent inflight training of air crewmen while at their assigned airbases. Further, the inflight training scenarios can simulate actual combat missions both in duration and the threats experienced. In addition, the reactions of the pilot and/or other air crewmen in response to the training scenario are recorded for future analysis of their performance. Analysis permits improving the performance of the air crewmen.

More particularly, the embodiment of the present invention disclosed herein is a military combat aircraft radar warning receiver simulator which is used to provide inflight training with realistic training scenarios which may include scenarios that duplicate those to be encountered on actual combat or reconnaissance missions. In operation the radar warning receiver processor is removed from the aircraft and the simulator installed in its place. The simulator is plug compatible with the existing radar warning receiver processor thereby minimizing modifications to the aircraft. This permits frequent training of aircraft crewmen at their operations bases in their own combat aircraft during routine flights and eliminates the need for having to go to remote training facilities.

The aircrew whose aircraft is quickly and easily equipped with a preprogrammed radar warning receiver simulator initialize the simulator, take off, and fly to a predetermined point over friendly territory where the simulator is then enabled. The initialization process causes the simulator to function as if the location at which the simulator is initialized is the airbase where the aircraft is either stationed or operating from. The purpose is to assure that during the training flight the aircraft doesn't actually enter enemy airspace. At airbase locations such as in the United States, the simulator may be initialized before take-off. No matter which case, the scenario on the radar warning receiver video display is the same as if the aircraft was flown from its operations base on an actual combat or reconnaissance mission.

As the simulator equipped aircraft is flown over its planned training course simulating a combat or reconnaissance flight as defined by direction distance, time and altitude, the location of simulated enemy search, threat and aircraft radars are appropriately displayed on the receiver video display. As the training aircraft travels straight, turns or performs other maneuvers, the display of the radars on the video display changes accordingly in a realistic manner.

The simulator may include an altimeter to sense the aircraft altitude and includes inertial navigation equipment to sense the location and attitude of the aircraft. Data from these elements within the simulator can be used by the computer located in the simulator to provide realistic terrain blanking dependent on the aircraft altitude and provides display rotation and blanking as the aircraft turns, rolls and performs evasive maneuvers. The display blanking may be simulating antenna pattern dead spots around the aircraft.

As is well known, the aircraft pilot and crew member operating the radar warning receiver respond to the radar warning display and perform course changes, evasive maneuvers and activate appropriate counter measures for self protection. These actions are recorded and analyzed subsequent to the training flight. The analysis permits improving the responses and techniques used to evade threats and thereby improve the chances of surviving actual combat and reconnaissance missions.

The invention will be more readily understood from the following description of an illustrative embodiment of the invention when read with reference to the accompanying drawing in which.

GENERAL DESCRIPTION

Figure 1:
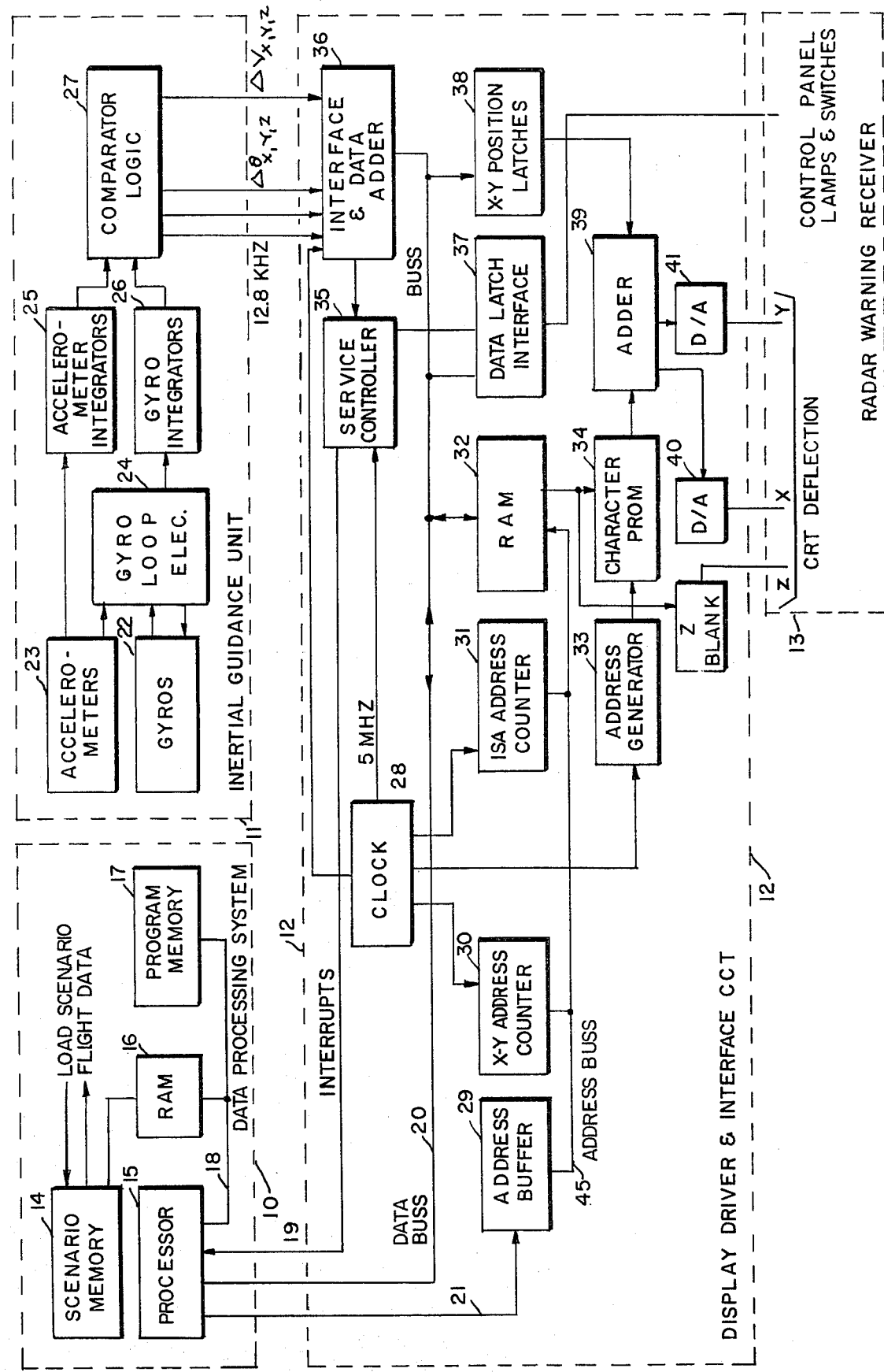
FIG. 1 is a detailed block diagram of our unique radar warning simulator.

The Radar Warning Receiver (RWR) of the preferred embodiment of the present invention is found in military combat aircraft. The RWR receives and processes radar signals from such threats as search radars, anti aircraft radar, missile site radar and intercept aircraft radar and provides a video display identifying the direction, type of radar thereby identifying the type of threat, and the approximate range of the radar from the aircraft. The pilot and/or other cooperating air crewmen, depending on the type of aircraft, take evasive maneuvers, alter flight path and utilize appropriate passive or active countermeasures such as chaff, flares and electronic countermeasures jammers in response to the audio and video output from the RWR. Such actions increase the chances of survival of the aircraft and its crew in a combat or reconnaissance environment.

Due to the importance of the RWR, it is important that the pilot and other air crewmen operating the RWR must receive frequent and realistic training both of which are not readily available with ground based simulators and inflight training over training ranges, both of which are usually remote from the operations bases.

With the preferred embodiment of the invention disclosed herein, an inflight RWR simulator is provided which is relatively small and self-contained; is easily programmed on the ground for an infinite variety of training scenarios which may duplicate combat and reconnaissance missions in complexity and time duration; is utilized at operations bases within the aircraft; and is used to provide frequent, realistic inflight training. The preprogrammed RWR simulator is quickly and easily exchanged for the plug-in processor module of the RWR equipment within the aircraft and the crew receives training in their own assigned aircraft without being temporarily reassigned to remote bases for training.

Once the plug compatible pre-programmed RWR simulator is installed in an aircraft, the RWR simulator is either initialized before takeoff or subsequent to takeoff at some point remote from the airbase. In either case, initialization causes the simulator to commence functioning as if the aircraft were just leaving the airbase. The simulator may be initialized at an airborne point remote from the base to assure that during the simulated mission the aircraft does not pass over unfriendly or enemy territory. This is not a problem when starting the simulated training mission from airbases in the United States where the simulator may be initialized before takeoff. However, at airbases close to unfriendly or hostile countries, the aircraft must be flown some distance away from the hostile country before the simulator is initialized to assure that the aircraft does not pass over hostile territory. This must be done as the aircraft would be flying course headings for given periods of time as if the aircraft had taken off from the airbase on a mission over hostile territory. During the training flight various types of search, threat and intercept aircraft radar are displayed on the RWR video screen and the RWR equipment is operated in the same manner as if the aircraft were on an actual reconnaissance or combat mission. In a well known manner, the pilot of the aircraft, and other cooperating crewmen will make course changes, altitude changes, take evasive maneuvers and utilize on-board countermeasures equipment just as they would do during an actual mission to prevent being shot down. The only difference is that flares and chaff most likely will not be ejected from the aircraft. The video and audio outputs of the RWR control equipment on the aircraft in response to the simulator can be realistic to the point that blanking occurs for terrain blanking depending upon the altitude of the aircraft and blanking due to antenna pattern dead spots around the aircraft depending upon the attitude of the aircraft as it flies level or undergoes various evasive or other maneuvers. In addition, the display will change and appropriate audio signals will be provided to the operator reflecting the change in received radar signal status of missile radar sites in their acquisition, firing and homing modes of operation.

Actions of the pilot and other air crewmen responsive to the training scenario are recorded for evaluation after the training flight. In this manner techniques may be developed and the crews develop a high degree of proficiency in the utilization of their defensive equipment to thereby maximize their chances of surviving actual reconnaissance and combat missions.

To prepare a training scenario, a file is placed in a memory of the simulator for the flight to be simulated. Each threat radar has many entries in the memory file. These entries indicate the type of threat radars, the distances from the point at which the RWR simulator is initialized to each radar, how close the aircraft must be to the radar before the radar is turned on, changes in radar operating mode or frequency, altitude the aircraft must be at before certain weapons systems associated with specific radars are utilized, terrain blanking information, antenna dead spot information, audible sounds generated for different threat radars reflecting their operational status and other similar information. Internal to the simulator is self-contained inertial navigation system, altimeter, a microprocesor and the memory containing the training scenario file and the operational program for the simulator. The inertial navigation system indicates the position of the aircraft with respect to the earth to the processor. The altimeter indicates the altitude of the aircraft to the processor. The processor relates the present position of the aircraft to the position of simulator initialization point and checks the scenario file. Information for threat radars that would be displayed on the RWR video display are utilized to present the appropriate audio and video display signals on the RWR. The display is updated frequently to accurately reflect the motion of the aircraft. The processor also utilizes the inertial guidance system signals when the aircraft is diving, rolling or performing other maneuvers to appropriately change the RWR display just as it would appear in a real non-simulated situation. Further, the processor utilizes the antenna dead spot information and, terrain blanking information then can be stored in memory, as well as aircraft altitude information, to appropriately blank the display of threat radars to accurately simulate blanking.

To better understand the description of the system block diagram shown in FIG. 1 and the computer program flow charts shown in the remaining figures, a description of the controls on the RWR must first be given. There are ten buttons or switches, including multiple position rotary switches, on the RWR control panel which are listed and described immediately hereinafter.

1. AADefeat—This button is utilized by the RWR operator to either enable or disable the display of radars associated with anti-aircraft weapons systems. This control would typically be used when the combat aircraft is flying at high altitude where conventional low altitude effective anti-aircraft weapons systems are ineffective and the display of their radars would only clutter up the RWR video display.

2. Target Separate—In actual operation occasions arise where the RWR display of two or more radars the display of which is overlapped on the RWR video display. While this button is depressed by the RWR operator the overlapped displays of the two or more radar sources is separated so that the operator can determine the type of radars.

3. Unknown Enable—In operation the radar warning receiver receives radar signals from various radar types, many of which are identified by the receiver as being threat radars of a specific kind. However, signals may be received from other radars which the receiver cannot identify as being of any type of known threat. These unknown radars will not be shown on the RWR video display unless the Unknown Enable button is operated.

4. Priority Switch—This is a two-position switch which causes the RWR receiver to display either the five or sixteen highest priority threat radars. The RWR operator may use this switch to display only the five highest priority radars to avoid possible confusion by having sixteen radars displayed.

5. Gate Switch—This switch does not affect the operation of the inflight training system of the present invention so is not described here.

6. Test—This is a four-position rotary switch having an off position and the remaining three positions are used to test all lamps on the receiver, put various characters on the video display to assure its operation and a system test checking various computer programs within the system.

7. Missile Launch—This button is operated by the equipment operator and causes the RWR to display friendly radars for limited training purposes.

8. Altitude Priority—This switch causes the RWR to display all threat radars, threat radars for weapons systems that can only affect the aircraft at high altitudes, or threat radars for weapons systems that can only affect the aircraft at low altitudes.

9. Diamond Hand-off—On the RWR video display there is usually a diamond encircling the highest priority threat at any moment in time. As the highest priority threat changes the diamond automatically transfers to the newest highest priority threat. The RWR operator also receives audio signals for the threat so marked by the diamond. When the operator depresses and holds down this button, the diamond moves from one threat radar to another threat radar in descending order of the threat priority at approximately one second intervals. Upon the diamond marking a display of a threat radar of interest, the key is released and the diamond remains marking the threat of interest. Accordingly, an audio tone is provided the operator for the threat of interest. To return the diamond to the highest priority threat, this key is momentarily operated.

10. Mode—This is a multi-position rotary switch, one position of which is entitled Priority Open. When the switch is in this position, the following operation is provided. When the RWR operator has placed the previously described Priority Switch in the position such that only the five highest priority threat radars are displayed, if there are more than five threat radars a lamp is lit to inform the operator that there are more than five threats and the operator may then operate the Priority Switch to cause up to sixteen threats to be displayed. A second position of the Mode switch is entitled Search Radar and causes search radars to be displayed at the outer periphery of the display. Other positions of the Mode switch cause the receiver to display only those threats located in front of the aircraft and operating in designated radio frequency bands. Still other positions of the switch are utilized to display the radars for infrared tracking weapons.

DETAILED DESCRIPTION

Turning now to FIG. 1, therein is shown a detailed block diagram of our novel radar warning receiver training system which is plug compatible with radar warning receiver equipment already existing in combat aircraft. Our novel training apparatus comprises data processing system 10, inertial guidance unit 11, and driver and interface circuit 12 which are physically all contained within a single housing. These three units are described in greater detail hereinafter.

Data processing system 10 contains a scenario memory 14 which is a bubble memory that will not lose its stored contents if power to this memory is interrupted. Memory 14 has a training scenario stored therein prior to the warning receiver training apparatus being installed in a combat aircraft for training purposes. As mentioned previously an almost infinite variety of training scenarios may be created to provide realistic training for combat aircrews at their assigned airbases. The complexity of the training scenarios is limited only by the number of storage bits within the memory 14. In addition, as a combat aircraft goes through a training flight utilizing our novel radar warning receiver training equipment, the flight path and maneuvers the aircraft is taken through by the pilot responsive to the training scenario are also recorded in scenario memory 14 to be read out at the end of the training flight for evaluation.

Processor 15 is a 16-bit general purpose computer which functions under control of the program stored within program memory 17. Memory 17 is an electronic Programmable Read Only Memory (PROM) well known in the art, which may be erased and reprogrammed with a new program. Utilizing a programmable computer our novel radar warning receiver equipment can be updated to provide training scenarios with increased capability and new types of threats. Random Access Memory (RAM) 16 is used as a scratch pad memory to temporarily store information being read out of and written into scenario memory 14 and to provide scratch pad memory to processor 15 as it functions under control of the program stored in memory 17. Information and program written into and read out of memories 16 and 17 is coupled to and from processor 15 via buss 18. Flow charts for the program are shown in FIGS. 3A through 3F which are described further in this specification.

The program source listing stored in program memory 17 is at the end of this specification and Table A located in this specification just prior to the program source listing is an index that correlates the steps in the program flow charts of FIGS. 3A through 3F with the program source listing.

Inertial guidance unit 11 is a commercially available unit containing standard apparatus and provides outputs indicating change in aircraft attitude ($\delta\theta_{X, Y, Z}$) and change in aircraft velocity ($\delta V_{X, Y, Z}$). These outputs are pulse trains representing the attitude and velocity changes in the aircraft body frame. Inertial guidance unit 11 is the key to providing realism with our novel radar warning receiver training apparatus. The inertial guidance equipment senses the aircraft's movements during the training flight and provides information which is processed with data processing system 10 to change the radar warning receiver video display to properly reflect aircraft motion during the training flight. In addition, it is the information from the inertial guidance unit 11 that is stored in scenario memory 14 for evaluation of the aircraft flight path and evasive maneuvering following the training flight.

Within inertial guidance unit 11 are three sets of gyros 22 and accelerometers 23 that sense angular rates and acceleration about the X, Y and Z Cartesian coordinates. As motion of the aircraft is sensed by inertial guidance unit 11, the error signals from gyros 22 and accelerometers 23 are applied to gyro-loop electronics 24 which attempts to hold the accelerometer pendulum and gyro gimbal nulled in a manner well known in the art. These signals are also used as the analog rate signals within unit 11. Accelerometer integrator 25 and gyro integrator 26 convert the respective analog signals input thereto from units 23 and 24 into digital pulse trains that are input to comparator logic 27. Comparator logic circuit 27 adds the pulse trains from integrators 25 and 26 to a 12.8 KHz reference signal. The 12.8 KHz reference signal is needed to provide an accurate time base for the data sampling interval. These pulse trains then represent the incremental changes in attitude $\delta\theta_{X, Y, Z}$ and incremental changes in velocity $\delta V_{X, Y, Z}$ experienced by the inertial guidance platform.

Driver and interface circuit 12 functions as the interface between data processing 10, inertial guidance unit 11, and radar warning receiver 13. Acting in many ways like the radar warning receiver processor which our novel training equipment replaces on a plug compatible basis, circuits within driver and interface circuit 12 generate the characters seen on the radar warning display and provide the necessary voltages to drive the cathode ray tube of receiver 13. Other circuits temporarily store information from the inertial guidance unit 11 to be input to data processing system 10. In addition, information regarding the status of the control buttons and switches on the radar warning receiver control panel are applied via driver interface circuit 12 to data processing system 10 as software interrupts; and lamps on the control panel of receiver 13 are lit under control of data processing system 10 via driver interface circuit 12.

Processor 15 operates on an interrupt basis in a manner well known in the art. All interrupts are applied to processor 15 via input lead 19 from service controller 35 displayed via interface circuit 12. Service controller 35 performs two functions. The first of these functions is to take a 5 MHz input from clock 28 and divide same by 10 to provide the 2 microsecond time clock signals used to control the system. The second function is to receive all interrupt information from inertial guidance unit 11 and radar warning receiver 13. The order of priority of these interrupts is also determined by controller 35 which causes processor 15 to be interrupted in accordance with predetermined interrupt priorities. The order of interrupt priority from the highest priority to the lowest priority for the RWR control panel only is: (1) Display Information, (2) New Information for Display, (3) Read Sensor Data, (4) Switch Interrupts, (5) Information to Lamps, and (6) Sensor Data Available.

Interrupts from inertial guidance unit 11 are applied via the interface portion of interface and data adder 36 and service controller 35 to processor 15. Interrupt information from radar warning receiver 13 is information indicating the status of the switches on the receiver control panel within the aircraft. As the switches are operated each sends an indication to data latch interface 37 within interface circuit 12. The switch or control information is stored within data latch interface 37 and is then input to service controller 35 as shown. Service control 35 analyzes all received interrupts and orders them for priority input to processor 15 as mentioned previously.

In operation RAM 32 performs two basic functions. First, RAM 32 is used to store inertial sensor information applied thereto via interface 36 from guidance unit 11 to be read out to processor 15 which uses the sensor information to update the radar warning receiver 13 display. After processor 15 processes sensor information stored in RAM 32 under control of the program stored in program memory 17, processor 15 generates signals for an updated display on the cathode ray tube (CRT) of radar warning receiver 13 and stores same in another portion of RAM 32. The display information stored in RAM 32 by processor 15 is periodically read out to update the display on receiver 13. To perform this update function, processor 15 knows in what address locations of RAM 32 are stored the display information to be updated. Processor 15 first generates the address in RAM 32 for the updated information and applies same via leads 21 to address buffer 29. Address buffer 29 applies this address via address buss 45 to addressing inputs of RAM 32. With specific address locations within RAM 32 being accessed, the updated information is applied via data buss 20 to be stored in the particular memory locations within RAM 32.

To periodically update the video display of radar warning receiver 13, RAM 32 has its display information periodically read out therefrom under the control of X-Y address counter 30 and ISA address counter 31 both of which are driven by clock 28. Counters 30 and 31 typically generate sequential addresses which read out all display information stored within RAM 32. The first information to be read out of RAM 32 is a binary word indicating the specific location on the video display of receiver 13 at which an alpha-numeric or other symbol is to be displayed. This position information read out of RAM 32 is applied via data buss 20 to be stored within X-Y position latches 38 which then input same to adder 39. Next the specific alpha-numeric or other character that is to be displayed at the specific X-Y location is read out of RAM 32 and input to Character PROM 34. At the same time Address Generator 33 is responsive to counts from clock 28 to sequentially and cyclically energize each of the alpha-numeric or other characters stored within PROM 34. Only that alpha-numeric or other character identified by the information also input to PROM 34 from RAM 32 will cause a digital code to be output from PROM 34 to adder 39 identifying the character. Adder 39 is responsive to both the information input to it from PROM 34 indicating the character to be displayed, and from the X-Y position latches 38 indicating the position on the receiver 13 video display at which the selected characters are to be displayed to generate another digital signal which when applied respectively to digital to analog converters 40 and 41, generates the X and Y deflection signals for the CRT display of receiver 13. In this manner, the selected character is displayed at the appropriate location on the CRT. This process is repeated for each character displayed on the CRT of receiver 13 and occurs cyclically for refresh purposes. As the aircraft performs maneuvers, or just travels in a straight line, its change in position is sensed by inertial guidance unit 11 and processor 15 responds to these changes in information to change the information stored in RAM 32 to appropriately change the display on the CRT of receiver 13. In this manner the operator of the RWR in the aircraft receives a very realistic video display which accurately simulates real operations.

At the same time, processor 15 is responsive to interrupts applied via lead 19, service controller 35 and data latch interface 37 indicating the state of switches and controls on the control panel of radar warning receiver 13 to display only particular threats, to light particular lamps on the panel of receiver 13 and to provide particular audio tones to the receiver operator.

As RAM 32 is cyclically read out under the control of counters 30 and 31, information in this memory is read out. As information regarding a particular character to be displayed is read out of RAM 32, the code identifying the particular character is applied to character PROM 34 and the position information is stored in X-Y position latches 38. The position information stored in latches 38 is input to adder 39. Character PROM 34 responds both to the character identifying signal input thereto from RAM 32 and a cyclical count from address generator 33 to generate the signals necessary to display the particular character on the CRT of radar warning receiver 13. These character display signals are also input to adder 39 which sums this signal with the position information. The output from adder 39 is via digital to analog converters 40 and 41 and then applied to the X and Y CRT deflection circuits in receiver 13. The result is that the particular character is displayed at the appropriate location on the face of the CRT of receiver 13.

During a training flight the flight path taken by the aircraft, including any evasive maneuvers, is reflected by signals output from inertial guidance unit 11. The signals from unit 11 not only are used by processor 15 as previously described and receiver 13, but also loads this information into an assigned portion of scenario memory 14. Subsequent to the training flight, the plug in piece of apparatus comprising data processing system 10, inertial guidance unit 11 and display drive and interface circuit 12 which are plug compatible with the standard radar warning receiver equipment which it replaces, is taken out of the aircraft and the flight data stored within scenario memory 14 during the training flight is read out and analyzed to provide information to the pilot as to the particular maneuvers and flight path he took the aircraft through during the training flight. In this manner the pilot is able to sharpen his combat flying skills and increase his chances for survival in actual combat.

Figure 2:
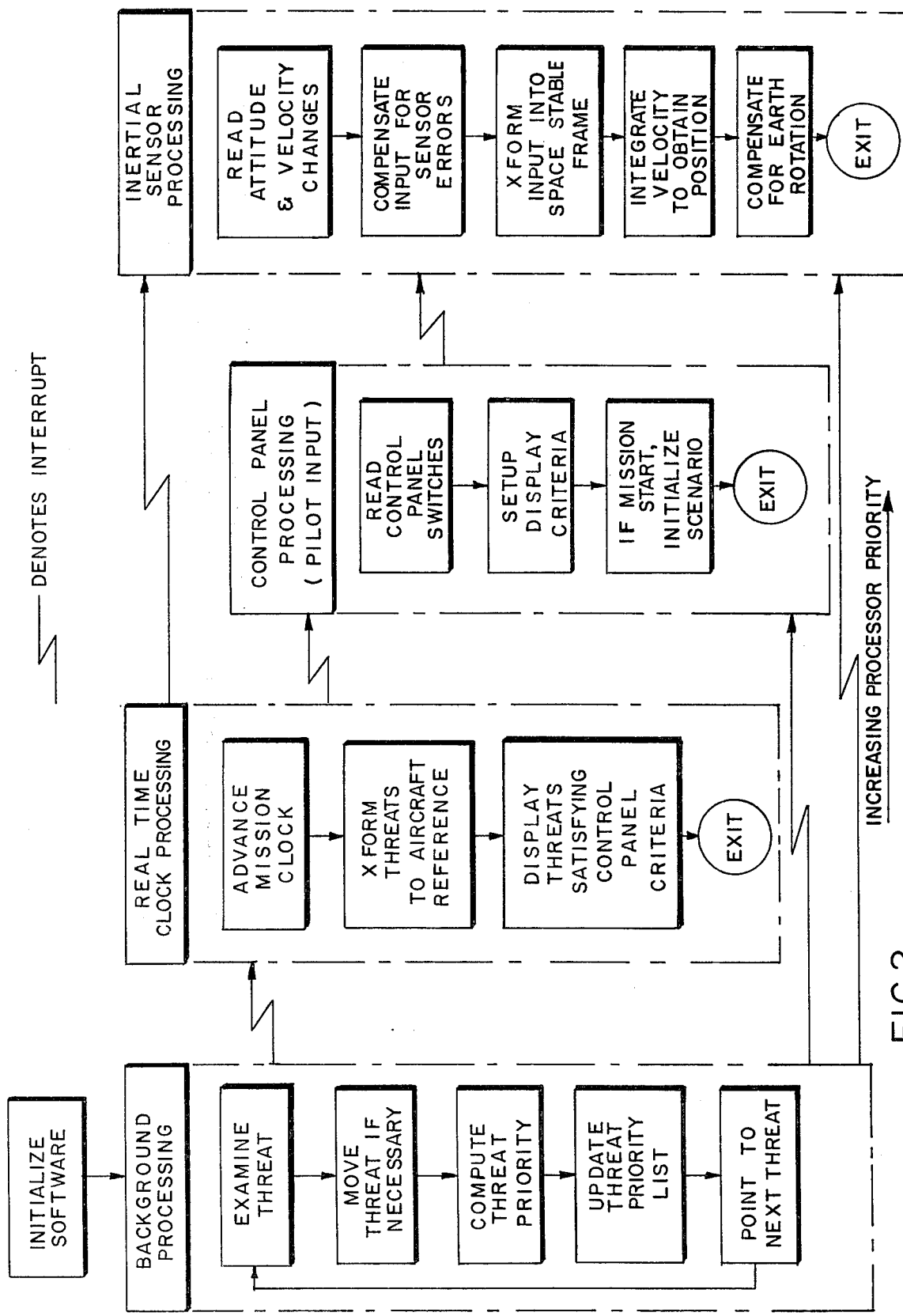
FIG. 2 is an overall block diagram of the system computer program.

Turning now to FIG. 2, therein is shown a general block diagram of the computer program stored in program memory 17 and utilized by processor 15. The more detailed flow charts for the program are shown in FIGS. 3A through 3F which are described further in this specification. As may be seen in FIG. 2, the computer program is broken into four major portions entitled Background Processing, Real Time Clock Processing, Control Panel Processing, and Inertial Sensor Processing. As the name Control Panel Processing implies, this portion of the computer program processes information received from the radar warning receiver control panel via operated switches and returns signals to the control panel to light appropriate lamps. The Inertial Sensor Processing portion of the computer program processes the inputs received from inertial guidance unit 11. As noted on FIG. 2 by the arrow with the title Increasing Processor Priority, the Inertial Sensor Processing has the highest priority and will preempt or interrupt all other program operations for processing by processor 15. Control Panel Processing is the next highest priority, Real Time Clock Processing has the third highest priority and Background Processing has the lowest priority. As noted on FIG. 2, the jagged lines between the four major blocks of computer programming denote program interrupts.

Basically, the background processing software arranges scenario threats in a threat priority order and does what processing is necessary to appropriately move scenario interceptor aircraft and other threats on the video display of the radar warning receiver. The real time clock processing software periodically updates the video display and reviews the priority threat list in view of the priority set by the operator of the radar warning receiver using controls thereon. The control panel processing portion of the program responds to the operation of controls and switches on the control panel of the radar warning receiver to cause other portions of the computer program to perform such functions as suppressing the display of unknown radar sources, suppressing the display of anti-aircraft artillery radar sources when the aircraft is at a high enough altitude to be outside the effective range and to separate the display of two targets that are so close as to be overlayed on the display. The control panel processing also handles lighting of lamps on the radar warning receiver control panel and provides an audio tone to the receiver operator for such functions as when a missile is launched against the aircraft. The inertial sensor processing program processes the outputs from inertial guidance unit 11 to compensate inertial sensor data for known errors and to compute rotation matrices keeping track of the aircraft attitude with relationship to the center of the earth. There is a fifth portion of the scenario program entitled Initialize Software which is utilized only at the beginning of the training scenario and allows the inertial guidance unit 11 to locate the spin axis of the earth relative to the attitude of the aircraft and to get the latitude of the aircraft. This operation is slightly different than the customary gyro compassing performed in other inertial navigational systems.

Figure 3A:
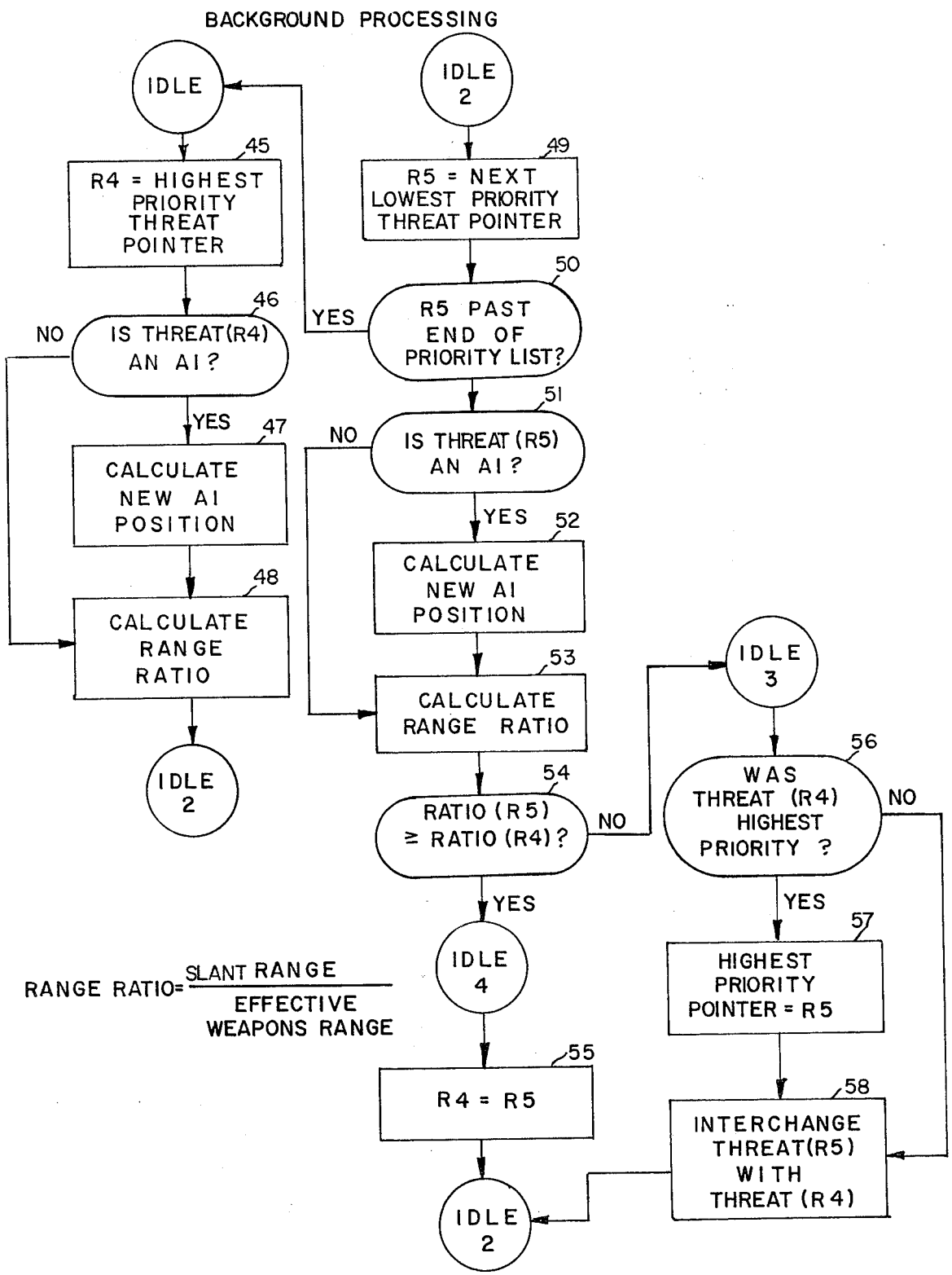
FIGS. 3A through 3F are the program flow charts for the system computer program.
Figure 3B:
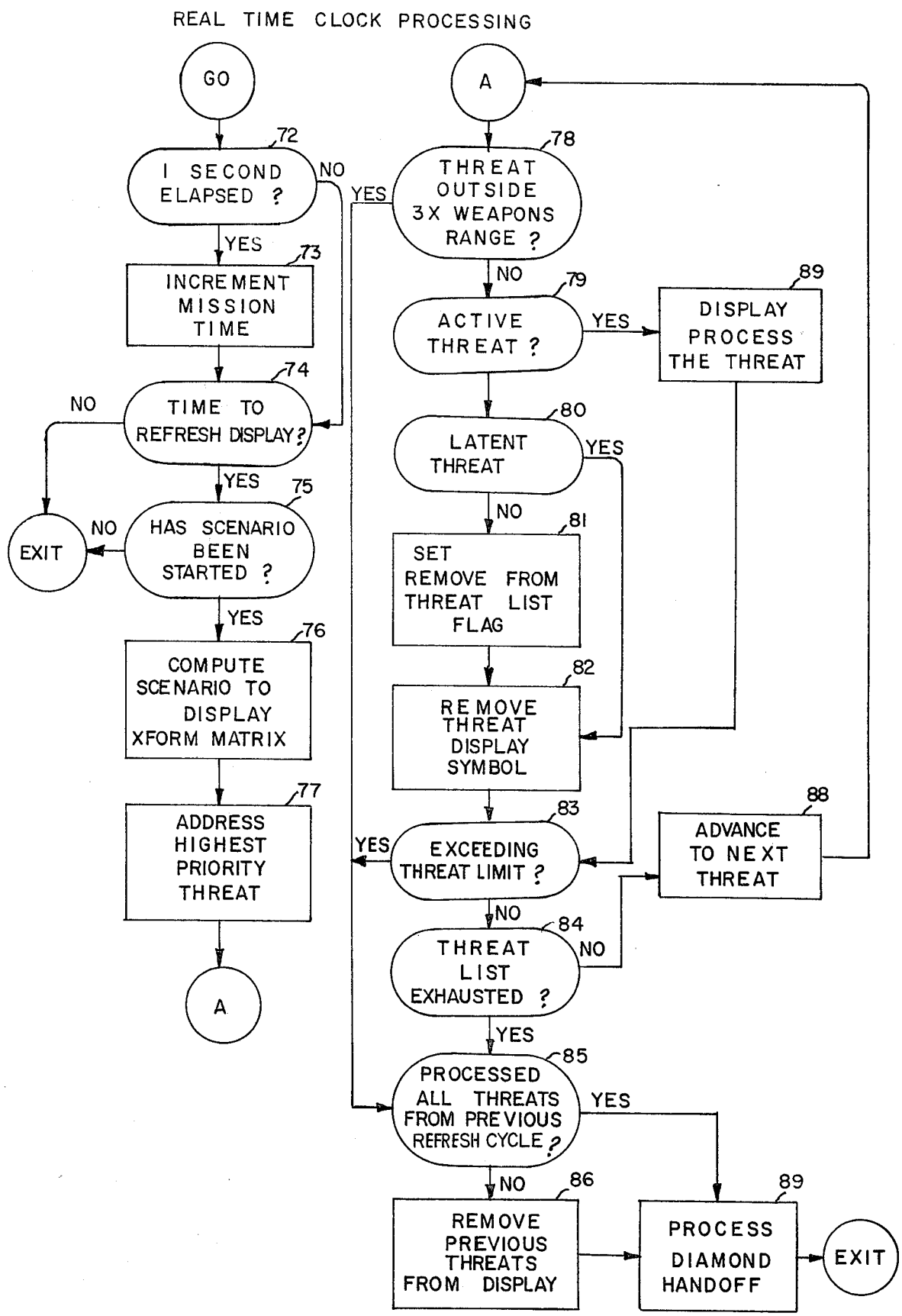
Figure 3C:
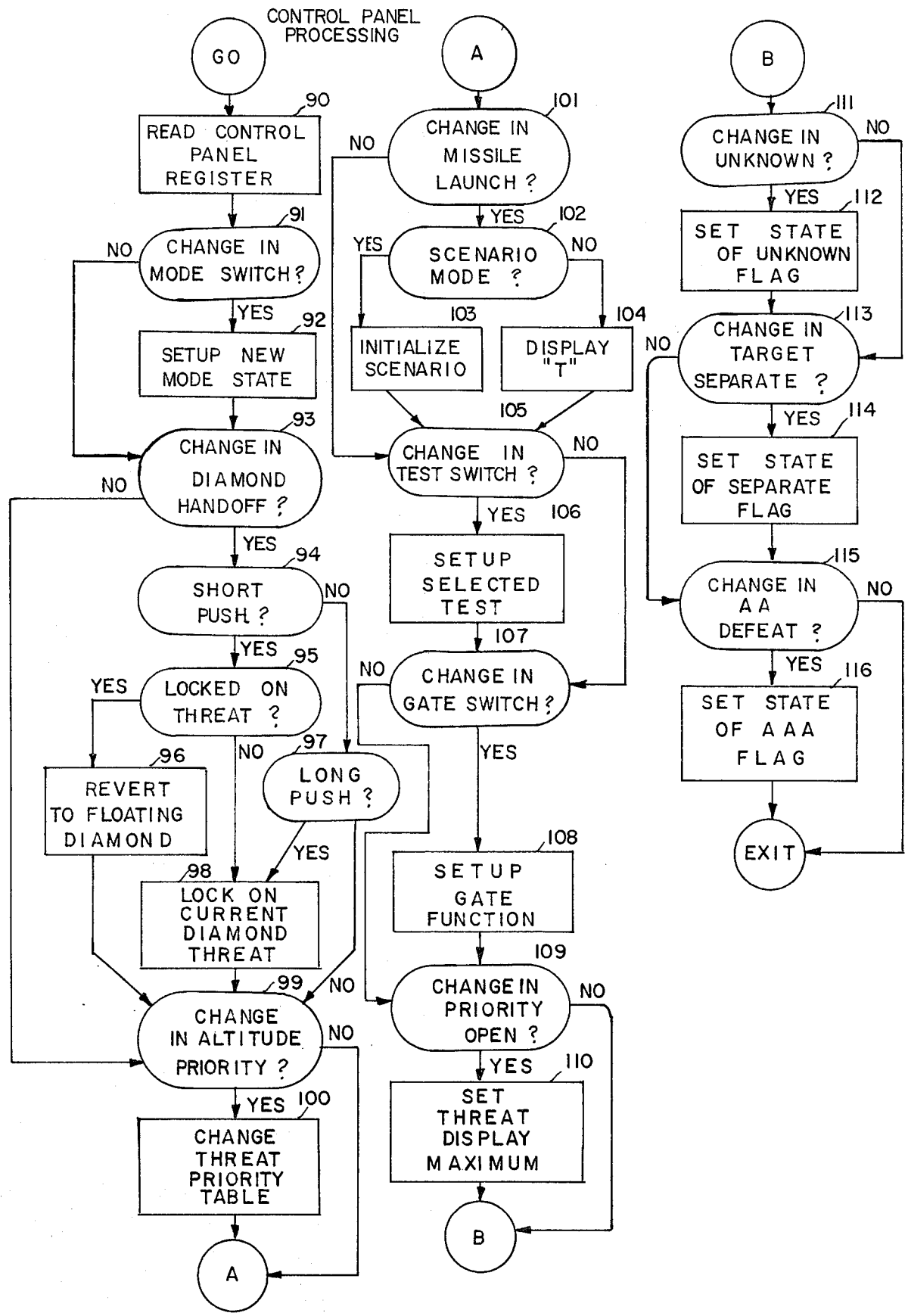
Figure 3D:
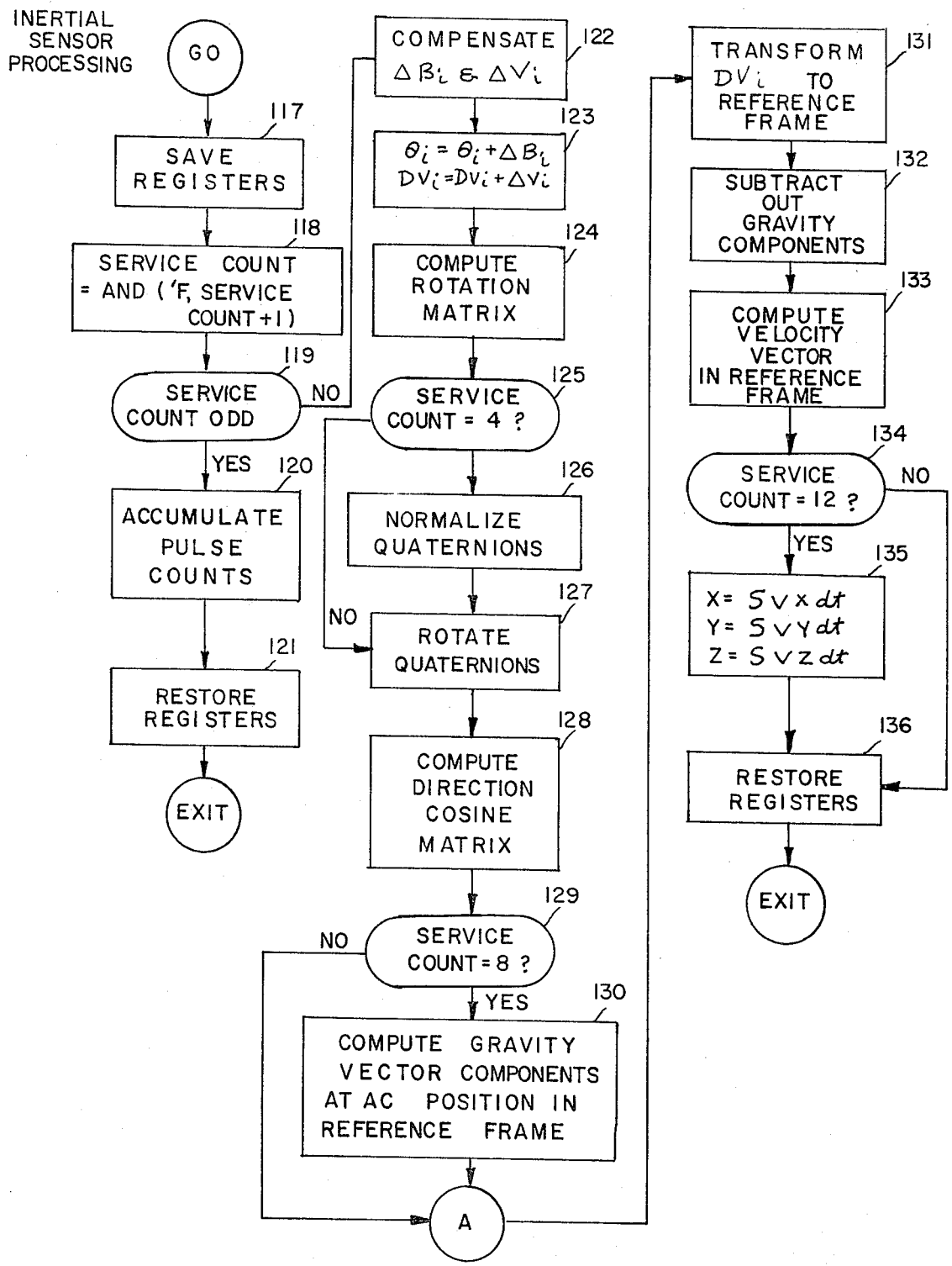

FIGS. 3A through 3F show more detailed flow charts for the computer program stored within memory 17 of data processing system 10. FIG. 3A shows the Background Processing flow chart which includes a block entitled "Calculate New AI Position" 47. This latter block is disclosed in greater detail in FIG. 3E. FIG. 3B is the real time clock processing flow chart and FIG. 3C is the control panel processing flow chart. FIG. 3D is the inertial processing flow chart wherein is a block entitled "Compute Gravity Vector Components" 130, which block is disclosed in further detail in FIG. 3F and entitled "Gravity Routine."

Table A, which is located further in this specification immediately prior to the computer program listing itself, is a formal index which shows the correlation between the computer program listing and the flow chart diagram of FIG. 2. For instance, referring to Table A, that part of the computer program associated with the block on FIG. 2 entitled "Initialize Software" is first shown. Thereafter are the computer program subheadings under each of the blocks of FIG. 2. For example, under "Examine Threat" is seen IDLE, and under "Move Threat If Necessary" is seen MOVE and SQRT. This correlation may be seen all the way throughout Table A.

Turning now to FIG. 3A, therein is shown the detailed program flow chart for the background processing. From FIG. 2 it may be seen that the background processing software has the lowest processor priority and, accordingly, the processing of the background processing software is often interrupted by other portions of the program. When all interrupt processing has been completed then microprocessor 15 returns to the background processing software. As the background processing software is often interrupted, and the real time clock processing and control panel processing software may also be interrupted by the inertial sensor processing software which has a higher priority, microprocessor 15 functions in a manner that when its processing of some software is interrupted the instructions and other data stored in registers at the moment of interrupt are stored to be recalled to continue the processing upon return from interrupt.

The purpose of the background processing software is to maintain and periodically update a threat radar list in a priority order. As microprocessor 15 processes background processing software it works its way down the threat radar list from highest priority to lowest priority. The highest priority threat is at the top of the list while the lowest priority threat is at the bottom of the list. The priority of a threat radar is determined by a numerical value called the range ratio and as the range ratio value decreases the priority of the threat radar increases. The value of the range ratio is computed by microprocessor 15 from an equation wherein the range ratio equals the slant range divided by the effective weapons range. From the information stored in scenario memory 14 the slant range to each threat radar is computed and then compared to the effective weapon range of each threat to get the range ratio. Microprocessor 15 organizes a threat priority list to keep the highest priority threat first. This updating is necessary to account for the flight path of the aircraft on which is located the radar warning receiver and also the movement of aircraft interceptors having threat radars.

Figure 3E:
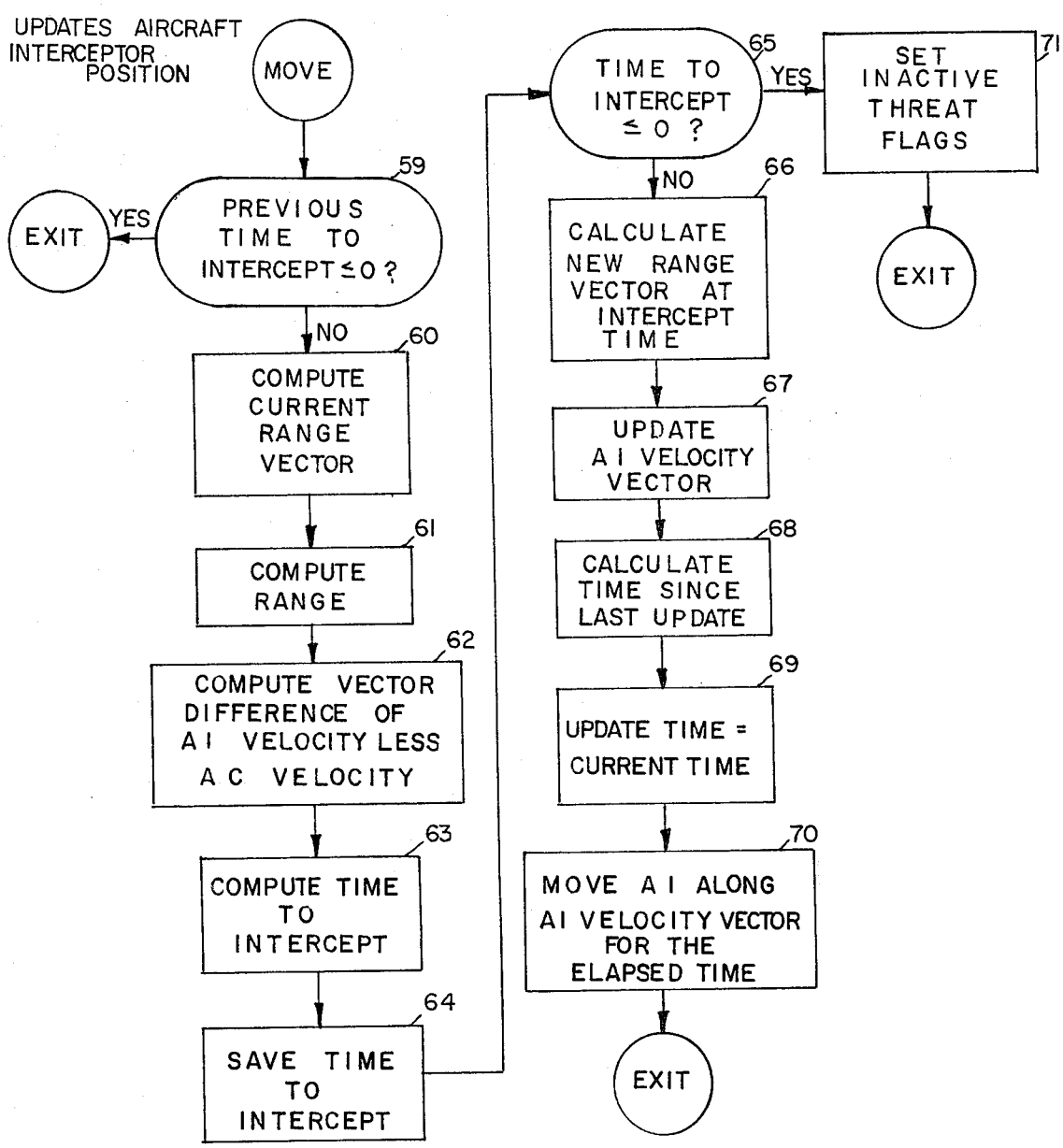

The background processing software is shown in FIGS. 3A and 3E with the flow chart shown in FIG. 3E being an expansion of the flow chart block entitled "Calculate New AI Position" 47 in FIG. 3A. The block diagram of the software starts at IDLE and the program represented by block 45 points to the highest priority threat. Thereafter, the threat list is analyzed in descending order of threat priority and the threat priority list is reordered as threat priorities change as determined by the calculation of the range ratio of each threat.

Once the highest priority threat is determined by block 45, the program represented by block 46 first determines whether the threat is an aircraft interceptor (AI) the source position of which will continuously change. If the threat is not an aircraft interceptor the program goes directly to block 48 to calculate the updated range ratio of the highest priority threat, which range ratio will change as the training aircraft changes position on the face of the earth. In the event that the highest priority threat is an aircraft interceptor we exit from block 46 through that portion of the program represented by block 47 wherein the new position of the aircraft interceptor is calculated. This is necessary as the aircraft interceptor is continuously changing position. Microprocessor 15 uses the updated aircraft interceptor position to determine if the aircraft interceptor has passed the training aircraft and is no longer a threat. In this event the aircraft interceptor is no longer a threat and is removed from the threat table. Once the new position of the aircraft interceptor is calculated, the new range ratio of the aircraft interceptor is calculated by that portion of the program represented by block 48 in the flow chart.

Once the updated range ratio of the highest priority threat is calculated as just described, we pass via IDLE 2 to block 49 which points to the next lowest priority threat within the threat table. Block 50 represents that portion of the software which determines whether the next lowest priority threat pointer points to a threat which is past the end of the priority list. If the answer to this question is "yes", the software returns via IDLE to blocks 45 through 48 to perform the functions just described restarting at the beginning of the threat table.

In the event that the next lowest priority threat is not past the end of the priority list, the software progresses to make a decision as reflected in block 51 as to whether or not the next lowest priority threat is an aircraft interceptor. In the event that this next lowest priority threat is not an aircraft interceptor, the software continues to block 53 to calculate the range ratio.

In the event that the next lowest priority is an aircraft interceptor, we go to block 52 where the new position of the aircraft interceptor (next lowest priority threat) is calculated before passing on to block 53 to again calculate the range ratio. When the next lowest priority threat is not an aircraft interceptor the program bypasses block 52. The functions performed in blocks 51 through 53 are identical to those functions performed by blocks 46 through 48 previously described. Once the range ratio is calculated for the next lowest priority threat we enter that portion of the software represented by block 54 wherein the range ratio for the next lowest priority threat is compared to the range ratio of the highest priority threat. In the event that the range ratio of the next lower priority threat is not greater than or equal to the range ratio of the previously processed higher priority threat we pass via IDLE 3 to block 56 to determine if the threat that was previously analyzed was the highest priority threat. If the previously processed threat is not the highest priority threat, block 57 is bypassed to go to block 58 which causes microprocessor 15 to reorder the threat table interchanging the lower priority threat R5 with the previously higher priority threat R4. If the previously processed threat R4 is the highest priority threat the program goes to block 57 which causes microprocessor 15 to now place the highest priority pointer on threat R5 instead of threat R4 before continuing on to block 58 to interchange threats R4 and R5 in the threat list. Once this is done we pass to IDLE 2 which cycles the program back to the block 49 to repeat the steps thereafter for the next lower priority threat in the threat table. This sequence is repeated until all threats have been processed. If the range ratio of higher priority threat R4 is equal to or greater than the range ratio of threat R5 the program goes via IDLE 4 and block 55 to repeat the processing starting at IDLE 2. In this manner, the threat priority table is periodically checked and reordered as appropriate to keep it updated. Microprocessor 15 utilizes the updated priority threat list to determine which threats should be displayed on the video display in response to other software which is described hereinafter.

That portion of the computer program represented by blocks 47 and 52, both entitled "Calculate New AI Position," is shown in a more detailed block diagram in FIG. 3E which is now described. As the title "Updates Aircraft Interceptor Position" implies, this program subroutine is used only for threats which have a non-zero velocity. These non-zero velocity threats are mobile threats, generally aircraft interceptors, whose latest position must periodically be calculated and the range ratio recalculated. When the decision made in decision blocks 46 and 51 of FIG. 3A is "yes", the computer program subroutine represented by the flow chart in FIG. 3E is called up. Immediately upon starting the subroutine, a decision is made by block 59 as to whether or not the previously calculated time to intercept a mobile threat is less than or equal to zero. This means that the mobile threat has reached and/or has passed the training aircraft. Based upon principles of modern aerial warfare, an assumption is made that the intercept aircraft, once having passed the training aircraft, cannot turn around and reintercept the training aircraft. Thus, if the previous time to intercept was equal to or less than zero, a "yes" decision is made and we exit from the subroutine with no further processing. When the previous time to intercept is greater than zero the intercept aircraft is still converging on the training aircraft so the program computes the current range vector as represented by block 60. After the range vector for the intercept aircraft is updated then the distance or range of the intercept aircraft is computed in block 61. Thereafter, the vector difference of the intercept aircraft and training aircraft velocities are computed using the direction vectors and distances of both aircraft as represented by block 62. Once this difference has been computed the time to intercept between the intercept aircraft and the training aircraft is calculated as represented by block 63 and the computed time is saved in a register as represented by block 64. Upon the revised time to intercept of an intercept aircraft being less than or equal to zero, that intercept aircraft is no longer a threat and the program exits from block 65 to block 71 to set an inactive threat flag on the aircraft interceptor and then exits from the subroutine. However, upon the revised time to intercept being greater than zero the program goes to block 66 to calculate a new range vector for the intercept aircraft at the new computed time to intercept.

As the training aircraft will most likely take evasive maneuvers to avoid contact with the intercept aircraft, the velocity vector for the intercept aircraft under consideration must be updated and this function is now done as represented by block 67. The next step in the program is to calculate the time since the last update of the intercept time as represented by block 68. This updated time is the elapsed time since the program made calculations with regards to a specific intercept aircraft and is utilized to determine how far along the velocity vector the intercept aircraft has moved for the elapsed time as represented in block 70. At this time all calculations with regards to a specific intercept aircraft are complete and we exit from the subroutine to calculate the range ratios as represented in blocks 48 and 53 of FIG. 3A.

The next major subroutine of the system software is the real time clock processing subroutine the detailed flow chart for which is shown in FIG. 3B. The primary purpose of the real time clock processing subroutine is to keep track of the elapsed time for the training mission and to cause periodic display refresh of the video display on the radar warning receiver with the training scenario.

The first step is to determine if one second has elapsed in the mission time as represented by block 72. If one second has elapsed the program goes to the step represented by block 73 and the mission time is incremented by one second. The incremented mission time is then compared to the time at which the video display was last refreshed to determine if the display should be refreshed as represented by block 74. The program also goes directly to block 74 if one second has not elapsed as shown by block 72. If it is not time to refresh the video display, which is refreshed two times a second, the program exits from the subroutine to return from interrupt to process lower priority program. If it is determined by the program represented by block 74 that it is time to refresh the display, the next question to be determined is if the training scenario has been started by the pilot. If the training scenario has not been started by the pilot, there is no need to go through with display processing and we exit from the subroutine. In the event, however, that the scenario has been started we go to the portion of the program represented by block 76 and a transform matrix is computed to get into the display coordinate system. To accomplish this transformation a vector in the scenario frame, which vector is derived with the background processing program subroutine, is first transformed into a space stable reference frame where the rotation of the earth is first accounted for. Next the partially transformed vector in the space stable reference frame is transformed into a strapdown frame by the inertial sensor processing and finally is transformed into the display coordinates.

Once scenario vectors have been transformed by the display transform matrix represented by block 76 into the display coordinate system software the program goes down through the threat priority list starting with the highest priority threat as indicated by block 77 to determine if the particular threat is to be displayed.

As previously described, different types of threats will not be displayed as indicated by the settings of controls on the radar warning receiver control panel.

The program as represented by decision block 78 next decides whether or not the threat being processed is beyond three times the weapon range of the weapon associated with the particular threat radar. If the training aircraft is beyond three times the weapon range that weapon is not a serious threat and will be disregarded by not displaying the threat. If this decision is "yes", the program goes directly to decision block 85 which is described hereinafter. In the event that the training aircraft is within three times the weapons range, the assumption is made that the threat radar associated therewith will be in view on the video display of the radar warning receiver so the program progresses to block 79 to determine if the threat being processed is an active threat. There are cases where the threat may not be active, such as the threat being an aircraft interceptor which has gone past the training aircraft. Another such case is that the training aircraft may not be within the turn-on slant range of the weapon yet. Upon the threat being an active threat the program goes to block 87 which causes the program to display the threat as is described further in the specification. In the event the threat is not an active threat the program goes to block 80 to decide whether or not the weapon is a latent threat. A latent threat is one that will soon be an active threat such as a training aircraft soon to be within the turn-on slant range of the weapon. If the weapon is a latent threat the program passes to block 82 which will be described hereinafter. In the event the weapon is not a latent threat the program passes to block 81. A weapon that is not a latent threat, such as an aircraft interceptor which has already passed the training aircraft, will not receive any further consideration. This type of threat is to be removed from the threat list. To accomplish this, the program represented by block 81 sets a program flag which causes the threat to be removed from the threat list. The program then progresses to block 82 which checks to see if the non-active and non-latent threat is presently being displayed. If it is being displayed the program causes the display to be removed from the video display. The program next progresses to block 83 where a decision must be made following the display of each threat radar in a descending order of threat priority as to whether the number of threats being displayed exceeds a number indicated by the pilot using switches on the radar warning receiver control panel. If the maximum number of threats is already being displayed no further time is wasted processing threats that will not be displayed and the program exits from block 83 and go directly to block 85 which is described hereinafter. However, in the event the maximum number of displayed threats is not exceeded the program goes from block 83 to block 84 to determine if the end of the threat list has been reached. The determination that all threats have not been processed causes the program to go to block 88 which causes the program to cycle back to block 78 to process the next threat in the threat list. This process continues down through the threat list in a descending order of priority until either all threats are displayed or until the indicated maximum number of threats are displayed.

Upon the threat list being exhausted the program goes to block 85. The program associated with block 85 makes a determination whether or not all threats in the threat list were processed on a previous displayed refresh cycle. If all threats were not processed any leftover threats from the previous refresh cycle are deleted as indicated by block 86 before the diamond hand-off is processed. Upon all threats in the threat list having been processed on a previous refresh cycle, the program processes the diamond hand-off as represented by block 89. Once the video display of the radar warning receiver is current, displaying only those threats as indicated by settings of the controls of the receiver, then the diamond hand-off must be associated with a particular threat radar displayed on the receiver video display as indicated by the operator. As previously described, the operator operates one of the controls to move the diamond displayed on the video screen from one threat radar to another. Once the diamond processing is completed the real time clock processing subroutine is finished and the microprocessor returns to processing a lower priority subroutine of the computer software.

The program subroutine having the second highest priority is the control panel processing subroutine which responds to the operations of all controls on the radar warning receiver control panel and returns all signals to the control panel to provide the audible and visual outputs. The detailed flow chart for the control panel processing subroutine is shown in FIG. 3C and is now described. Upon there being a change in any of the controls on the radar warning receiver control panel an interrupt is generated indicating that this control panel subroutine needs processing. Due to the priority of the subroutines noted in FIG. 2 the control panel processing subroutine will interrupt and take precedence over the background processing subroutine of FIG. 3A and real time clock processing subroutine of FIG. 3B, but will not take priority over the inertial sensor processing subroutine of FIG. 3D. As previously described with reference to FIG. 1 the various switches and controls on the radar warning receiver control panel each have an associated latch within circuit 37 of the display driver and interface circuit 12. It is these latches within circuit 37 which are tied to data buss 20 and are read by processor 15 utilizing the software of the control panel processing subroutine per block 90 in FIG. 3C. The software reflected by decision block 91 first determines whether or not there has been change in the mode switch on the radar warning receiver control panel. Upon there being no change in the setting of the mode switch we go to block 93, but if there has been a change in the mode switch we go block 92 to set up a new mode state as indicated by the new setting of the mode switch before going to block 93. The software represented by block 93 determines whether or not the diamond hand-off button has been operated. If the diamond hand-off button has not been operated we bypass the steps represented by blocks 94 through 98 and go to block 99. However, if the diamond hand-off button has been operated we go to block 94 to determine if this button was operated with a short push or a long push. This is necessary for a short push on the button causes the diamond to float and mark only the current highest priority threat; whereas a long push causes the diamond to circulate through each of the threats in descending priority order at a one second interval allowing the operator to momentarily listen to the pulse repetition interval (PRI) of each of the threats. Upon the diamond hand-off button being released after a long push, the now circulating diamond will stop whenever it presently is located on the display and the operator will continue listening to the PRI of the marked threat. Upon the program determining that the operation of the diamond hand-off button was a short push we go to block 95 to determine if the diamond is already locked onto a threat; that is, already in the floating mode. Upon the diamond being locked onto a given threat by a previous long push and subsequent release of the diamond hand-off button the program goes to block 96 and the causes the diamond to float again to mark only the highest priority threat. If the diamond was not locked onto a threat a short push causes the program to go to block 98 to change the state of the diamond causing it to lock onto the highest priority threat presently being marked. Similarly, if it was determined in block 94 that the operation of the diamond hand-off button was not a short push, we go to block 97 to determine if the operation of the button was a long push. Upon determination that the operation of the button is a long push we go to block 98 and the software again causes the diamond to lock onto the threat currently being marked with the diamond when the button is released. Thus, a short push on the diamond hand-off button causes one of two things to happen. If the diamond hand-off button is operated with a short push when the highest priority threat is being marked in the floating mode, the diamond will only lock onto the highest priority threat. In the alternative, if the diamond hand-off button is operated with a short pulse when the diamond is marking a displayed threat other than the highest priority threat, the diamond will revert to the floating mode marking the highest priority threat.

In block 99 of the computer program flow chart the program next determines whether or not the altitude priority rotary switch has been operated changing the altitude priority of threat radars. Upon there being no change in the altitude priority of targets we go directly, via the circle marked with a capital letter "A", to block 101. Upon there being a change in the altitude priority we go to block 100 instead and the threat priority table is changed to reflect the altitude priority selected by the switch. For example, there are certain weapon systems which can only threaten the aircraft at high altitudes and need not be displayed if the aircraft is flying at very low altitudes. If any of these high altitude threats are being displayed and the altitude priority switch indicates that only weapon systems which can threaten the aircraft at low attitudes are to be displayed, the high altitude weapon system threat radar display must be removed from the threat list and, accordingly, removed from the display.

The control panel processing subroutine next progresses, via the circle marked with a capital "A", to block 101 which determines if the missle launch button on the receiver control panel has been operated. As previously described, this button is operated to cause the receiver to display friendly radars for limited training purposes. If the missile launch button has not been operated the program goes to block 105 which will be described further in the specification. In the event the missile launch button has been operated, the program goes to block 102 to determine whether or not the radar warning receiver equipped with our novel training equipment has been placed in the training scenario mode. In the event that the receiver is not in the training scenario mode the program goes to block 104 and causes a capital "T" to be displayed indicating that the training mode that has been selected by the operation of the missile launch button. In contrast, in a radar warning receiver equipped with our novel equipment the operation of the missile launch button while the equipment is in the scenario mode causes the program to go to block 103 which initializes the scenario to restart the training scenario from the beginning.

The program next determines in block 105 whether or not there has been a change in the setting of the test switch. As described previously, the test switch is a four-position rotary switch having an off position with the remaining three positions being used to test all lamps on the receiver and to cause various characters to be displayed on the video display to assure its operation. In addition, a systems test checking various programs within the system is also performed. In the event there has been no change in the setting of the test switch the program goes to block 107 to check the operation of the gate switch as is described further in this specification. However, in the event that the test switch has been operated the program goes to block 106 and causes the particular test selected by the switch to be enabled. Then the program also goes on to check the status of the gate switch as indicated by block 107.

As previously described, if there has been no change in the setting of the test switch, there is no need to set up a test so the program went directly to block 107 to determine if there is a change in the setting of the gate switch. The program also went to this step in the program if a new test had been selected and the selected test has been set up in response to the program. In the event there has been no change in the setting of the gate switch the program goes directly to block 109. However, in the event there has been a change in the test switch the program goes to block 108 which causes the newly selected gate function to be implemented before the program goes to block 109. Block 109 determines the present state of the two-position Priority Switch which causes the receiver to display either the five or sixteen highest priority threat radars. Upon there being no change in the operation of the Priority Switch the program exists from block 109 to point "B" which takes the program into block 111. In the event that the Priority Switch has been operated to the other of its two positions the program goes to block 110 to cause the display to display only five or sixteen threat radars as indicated by the new position of this switch. Once this function has been completed, the program then progresses via point "B" to block 111.

The next radar warning receiver control panel input to be checked is the Unknown Enable button. As described briefly heretofore, received radar signals that cannot be identified as being associated with a known threat are normally not displayed to avoid cluttering of the video display. However, to provide flexibility the Unknown Enable button may be operated which alternately causes the unknown radar types to be displayed or not displayed on the video display. Once this is done the program progresses to block 113.

Block 113 determines if there has been a change in the Target Separate button on the radar warning receiver control panel. As previously described the operation of this button causes two overlapped radar displays to be separated so that the operator can determine the type of radars. Upon there being no change in the operation of the Target Separate button, the program progresses directly to block 115. However, if there is a change in the state of the Target Separate button, the program progresses to block 114 which either causes the overlapped threat displays to be separated if the button is newly operated, or to overlap the two displayed threats if the button has been released.

The program then progresses on to block 115 to determine if there has been a change in the setting of the AA Defeat switch on the receiver control panel. This switch is typically operated when the aircraft is operating at high altitudes where low altitude effective antiaircraft weapons systems are ineffective and the display of their radars would only clutter up the receiver video display. If there has been no change in the state of the AA Defeat button the program exits as the control panel processing subroutine is completed. In the event that there has been a change in the setting of the AA Defeat switch the program progresses to block 116 which either places flags next to the AA threat radars in the list or removes these flags, which in turn either causes there AA threat radars to be displayed or supressed, depending upon the state of the switch. After this function has been completed the program again exits as the control panel processing subroutine is completed.

Turning now to FIG. 3D, therein is shown the block diagram for the inertial sensor processing subroutine. Program block 130 within this figure is blown up in greater detail in the flow chart entitled "Gravity Routine" shown in FIG. 3F. The inertial sensor processing subroutine processes inputs from the inertial sensor unit to keep track of the motion of the aircraft relative to a space stable reference frame. One hundred twenty-eight times a second an interrupt is generated for the inertial sensor processing subroutine. As noted in FIG. 2, the inertial sensor processing subroutine has the highest processor priority and will interrupt the processing of any of the other three subroutines. Upon an interrupt being generated for the inertial sensor subroutine, the program goes into its first step represented by block 117. Block 117 causes registers to be set aside to save the information for whatever other subroutine processing is interrupted. Upon the inertial sensor processing subroutine being completed the program can return to the interrupted subroutine and, using the information stored in the registers, picks up within the subroutine at the point of interruption. The program next progresses to block 118 which causes the inertial sensor processing interrupts to be counted. The program then proceeds to block 119 to determine if the interrupt count made per block 118 is an odd or even number. An odd interrupt count causes the program to progress to block 120 wherein the program causes the service count or interrupts to merely accumulate. Thereafter the program progresses to block 121 which causes the information stored in the registers set aside per block 117 to be restored for continuation of processing of an interrupted subroutine. The program then exits from the inertial sensor processing subroutine to commence processing a previously interrupted subroutine. As odd interrupts are generated at a rate of 128 times a second for the inertial sensor processing subroutine are only accumulated and no further processing takes place, effectively the rate is 64 times a second as processing only continues with the inertial sensor processing subroutine for even service counts of interrupts.

In the event the service count of interrupts is an even number, rather than odd, we exit from block 119 to block 122 wherein the program compensates the inertial sensor data for known sensor errors such as gyro drift, scale factor unbalance, accelerometer bias, alignment uncertaintities of the gyro and mass unbalance of the gyro. These are known factors which are constants to be used to compensate for the known sensor errors. In reality these known error factors change a small amount in flight but error introduced by treating them as constants is not large enough to be of any real concern. The program next progresses to block 123 wherein velocity and angle differences introduced by actual movement of the aircraft are determined to get revised information regarding the motion of the aircraft. The next step in the subroutine is to compute the rotation matrix as shown in block 124. This rotation matrix is called a quaternion rotation matrix and is used to get the attitude of the aircraft in the space stable reference frame referenced to the center of the earth. The next step in the inertial sensor processing subroutine is reflected by block 125 wherein a decision is made if the phase of the service count of the interrupts is equal to four. Every eighth second the program goes to block 126 wherein the quaternion is normalized to round off errors that are introduced by the finite word length in the computer before going on to block 127. Block 127 is also reached directly from block 125 in the event that this interrupt count is not four. In block 127 the quaternions are rotated reflecting the aircraft position. This is done in order to keep track of the training aircraft in the reference frame referenced to the center of the earth to properly provide a display of threat radars as the aircraft is flown and maneuvered by its pilot. The program next progresses to block 128 to compute the direction cosine matrix using the quaternions.

The next step in the program is to update the gravity vector if the service count is equal to eight. At this one-eighth second rate the program goes to block 130 to compute the gravity vector components at the aircraft position in the reference frame. Between these one-eighth second intervals the program goes directly to point "A" which takes us into block 131. We also go to block 131 via point "A" after the gravity vector components are computed. The fine details of the computation of the magnitude of the gravity vector of block 130 are described further in this specification with the detailed description of the gravity routine program flowchart shown in FIG. 3F.

In block 131 the body axis acceleration of the training aircraft is transformed into the reference frame. Once this is done the program progesses to block 132 where the gravity components are subtracted out. Next the program goes to block 133 where the aircraft velocity vectors in the reference frame are accumulated and used to compute an overall velocity vector in the reference frame. The next step in the subroutine is in block 134 which is used to check the service count pulse equal to 12 to create a one-eighth second time interval at which the position of the aircraft is updated. If the service count of interrupts is not equal to 12 the program goes directly to block 136, and if the service count of interrupts is equal to 12 we go to block 135 which is completed before going into block 136. In block 135 the X, Y and Z components of velocity are integrated with respect to time get the aircraft velocity in the space stable reference frame. Once this is completed the program progresses to block 136 which causes the information taken from an interrupted subroutine and stored in registers until the interrupt was completed to be restored and we exit from the inertial sensor processing subroutine. The microprocessor then commences processing a previously interrupted subroutine starting at the point at which is was interrupted.

Figure 3F:
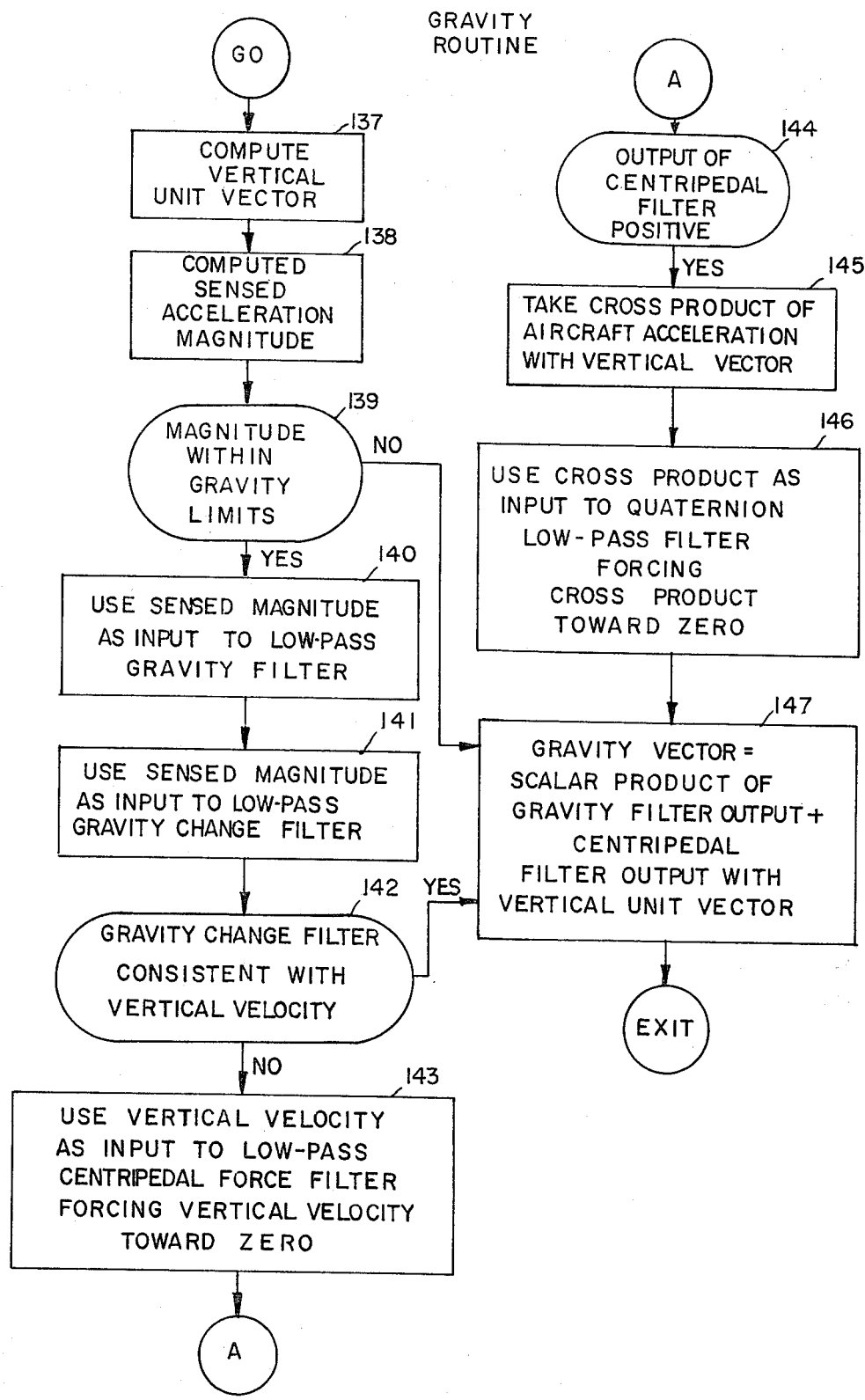

In FIG. 3F is shown the computer program flowchart for the gravity routine which is only shown as block 130 in FIG. 3D. In computing the gravity vector components a procedure is utilized whereby the approximate gravity is completed from the sense of acceleration received from the inertial sensor. The first step in the gravity routine is block 137 wherein the vertical unit vector is completed. To accomplish this the computation X, Y and Z position of the training aircraft in the reference frame is utilized. Once this has been done the program performs the next step represented by block 138 of computing the sensed acceleration magnitude. Information received from the inertial sensor unit is accumulated over one second periods to be used to compute the sensed acceleration magnitude. The magnitude of the computed sensed acceleration is then analyzed in block 139 to determine if the sense of acceleration magnitude is what it is expected to be if all the training aircraft were doing were proceeding at constant velocity subject only to the earth's gravity. Upon the answer to this determination being "no", the program proceeds to block 147 which is described further in the specification. Upon the answer to this determination being "yes", the program progresses from block 139 to block 140 and the computed sensed acceleration magnitude is input to a low pass gravity filter wherein the sensed magnitude is integrated over five minutes to filter out any vibration and similar effects. Thereafter, the program progresses to block 141 in which the program looks at the rate of change of the gravity vector. A rate of change occurs as the training aircraft changes altitude. For example, if the training aircraft were gaining altitude there is a positive vertical component of velocity which causes the gravity vector to be of a decreasing magnitude. Similarly, if the training aircraft were losing altitude there is a negative vertical component of velocity which causes the gravity vector to increase in magnitude. It is the rate of change of the gravity vector that is of interest.

Once the rate of change of the gravity vector is determined the program proceeds to block 142 wherein the information derived in block 141 is checked to determine if the gravity change is consistent with the vertical velocity of the training aircraft. In the event that the rate of gravity change is consistent with the vertical velocity of the training aircraft, the program goes to block 147 which is described further in this specification. However, in the event that the gravity change is inconsistent with the vertical velocity, the program progresses to block 143. For example, if the output of the gravity change filter shows that the gravity vector is increasing but we have a positive vertical velocity, there is a problem and the information is inconsistent. For this inconsistent information the program represented by block 143 takes the vertical velocity component to zero by putting the vertical velocity component through a low pass centripedal force filter which forces the component towards zero. The program then progresses to block 144 via "A" to determine if the output from the centripedal force filter is positive. When the output is positive we make the assumption that the acceleration we are sensing is due to the gravity vector and proceed to block 145. In block 145 the program takes a cross product of a vector along the axis of the training aircraft with the vertical vector to compensate for the fact that the attitude of the aircraft may not precisely be what is calculated by the computer. This must be done as the vertical vector may not be purely vertical yielding tangental acceleration and causing misalignment of the gravity vector. The result is the computer eventually losing track of the aircraft. If the cross product is zero, the computer is tracking the aircraft. In the event that the cross product taken by the program represented by block 145 is not zero the program progresses to block 146 wherein the cross product is used as an input to a software implemented quaternion low-pass filter which forces the cross product towards zero and thereby assures that the computed vertical vector is actually vertical.

The next step in the program is represented by block 147 which is reached from blocks 139, 142 or 146. At this step the program sums the output of the centripedal force filter with the output of the gravity filter and performs a scalar product multiplication on the sum to get the gravity vector. Once this step is complete the gravity routine is finished and the program returns to block 131 within the inertial sensor processing subroutine shown in FIG. 3D.

The above completes the description of the computer program flowcharts shown in FIGS. 3A through 3F. The computer program written from these flowcharts may be found further in the specification in Appendix A. Table A preceeding the computer program shows the correlation between the program and the flowchart diagrams of FIGS. 2 and 3A through 3F.

Sometime in the future radar warning receivers will most likely not be a separate equipment within military aircraft but instead will be integrated with the electronic counter-measures and other equipments. Accordingly, there will not be a separate module that can be removed from the aircraft and replaced with the training module disclosed herein as the preferred embodiment. In such future integrated systems other inertial navigation systems within the aircraft will provide inputs to our novel equipment. Similarly, for another but not all inclusive example, other microprocessors and memories within the aircraft electronic systems will provide the storage and processing now provided within out system. Such changes are within the ability of those skilled in the art to implement while staying within the scope of our invention.

While what is described hereinabove is the applicants' preferred embodiment of their invention it is obvious that one skilled in the art may make numerous changes without departing from the scope of the invention.

TABLE A
---
INITIALIZE SOFTWARE
START
ALIGN 0
ALIGN 1
    COMP
        SNGDBL, MURWCD, DZML30
    ATTUDE
        ENRM
            DZML30, DMUL30
        ROTATE
            DZML30, DMUL30
        EROT
            DZML30
        SRDCM
            DZML30
    DVXFM
        ROWVC3
            DZML30, DMUL30
ALIGN 2
    COMP
        SNGDBL, MURWCD, DZML30
    ATTUDE
        ENRM
            DZML30, DMUL30
        ROTATE
            DZML30, DMUL30
        EROT
            DZML30
        SRDCM
            DZML30
    LSQALI
        DMUL30, DZML30, V3NRM
            DZML30, DMUL30, DSQRT, DDIV30
        DDIV30, DSQRT, DDIV
        STEP 1
            DZML30, DMUL30, DSQRT, DDIV30
        STEP 2
            DZML30, DMUL30, DSQRT, DDIV30
        STEP 3
            DZML30, DMUL30, DSQRT, DDIV30
    INIROT
        INRSRV
            EROT
                DZML30
    INIPOS
        DMUL30, DZML30
    SCNINI
        DZML30, NAV0
EXAMINE THREAT
IDLE
MOVE THREAT IF NECESSARY
MOVE
    SQRT
COMPUTE THREAT PRIORITY
RNGPRI
    SQRT
UPDATE THREAT PRIORITY LIST
IDLE
POINT TO NEXT THREAT
IDLE
ADVANCE MISSION CLOCK
RTCSRV
TRANSFORM THREATS TO AIRCRAFT REFERENCE
RTCSRV
    SCNSTP, SCNDIS
DISPLAY THREATS SATISFYING

TABLE A-continued

CONTROL PANEL CRITERIA
RTCSRV
    RMVTHR
        DPPUSH
    DSPOCT
    DPPOP
    MISINT, DPPUSH
    RMVTHR
        DPPUSH
    SRCRDR
        RMVTHR
            DPPUSH
        DSPTHR
            DPPOP, SQRT, SEPARO
                AOARTN
    UNKRDR
        RMVTHR
            DPPUSH
        DSPTHR
            DPPOP, SQRT, SEPARO
                AOARTN
    AAARDR
        RMVTHR
            DPPUSH
        DSPTHR
            DPPOP, SQRT, SEPARO
                AOARTN
DISPLAY THREATS
    XRDR
        RMVTHR
            DPPUSH
        DSPTHR
            DPPOP, SQRT, SEPARO
                AOARTN
    BLKRDR
        RMVTHR
            DPPUSH
READ CONTROL PANEL SWITCHES
CPSRV
SETUP DISPLAY CRITERIA
CPSRV
    DPPUSH, DPPOP, DSPDMP
INITIALIZE SCENARIO
CPSRV
    SCNPOS
        DZML30, DMUL30, DSQRT, DDIV30
    SCNINI
        DZML30, NAVØ

READ ATTITUDE AND VELOCITY CHANGES
STRAP
    RDSTRP

COMPENSATE INPUT FOR SENSOR ERRORS
STRAP
    COMP
        SNGDBL, MURWCD, DZML30
    VERT
        DZML30, DSQRT, DDIV30, DMUL30, INRSRV
        EROT
            DZML30

TRANSFORM INPUT INTO SPACE STABLE FRAME
STRAP
    ATTUDE
        ENRM
            DZML30, DMUL30
        ROTATE
            DZML30, DMUL30
        EROT
            DZML30
        SRDCM
            DZML30
    DVXFM
        ROWVC3
            DZML30, DMUL30
    GRAV
        DZML30, DMUL30, DSQRT, DDIV30

INTEGRATE VELOCITY TO OBTAIN POSITION
STRAP
    NAV
        DZML30, DMUL30

COMPENSATE FOR EARTH ROTATION
STRAP
    NAV
        DZML30, DMUL30

INTERFACE

```
;CONDITIONAL ASSEMBLY SWITCHES
;
DEBUG    EQU    1              ;0/1 = DON'T/DO ASSEMBLE ON-LINE
                                     DEBUGGER
LABTST   EQU    1              ;0/1 = OPERATIONAL/LABORATORY TEST
         ORG    '1000
;
;MODE ASSIGNMENTS
;
I        EQU    0              ;IMMEDIATE
R        EQU    2              ;RELATIVE
A        EQU    2              ;ABSOLUTE
;
;DISPLAY INTERFACE
;
DSPCHR   EQU    'F000          ;CHARACTER REGISTERS
DSPXY    EQU    'F080          ;POSITION REGISTERS
SYMON    EQU    '80            ;SYMBOL TURN ON BIT
RING0    EQU    '70            ;DISPLAY CENTER COORDINATE
RING1    EQU    '80-RING0      ;1.5-LETHAL RANGE RADIUS
RING2    EQU    'A0-RING0      ;LETHAL RANGE RADIUS
RING3    EQU    'B0-RING0      ;2-LETHAL RANGE RADIUS
RING4    EQU    'E0-RING0      ;OUTER EDGE RADIUS
;
```

```
;RTC INTERFACE
;
RTCXFR  EQU     'A0                     ;INTERRUPT XFER VECTOR ADR
RTS     EQU     'FFE6                   ;RTC STATUS REGISTER
;
;STRAPDOWN INTERFACE
;
SRPXFR  EQU     '13C                    ;STRAPDOWN XFER VECTOR ADR
STROP   EQU     'F100                   ;+ANGLE BYTE
STROM   EQU     'F101                   ;-ANGLE BYTE
STRVXP  EQU     'F106                   ;+DELTA VX BYTE
STRVXM  EQU     'F107                   ;-DELTA VX BYTE
STRVYP  EQU     'F109                   ;+DELTA VY BYTE
STRVYM  EQU     'F108                   ;-DELTA VY BYTE
STRCX   EQU     'F116                   ;LITTON X ANGLE RATE
STRCY   EQU     'F114                   ;LITTON Y ANGLE RATE
STRCZ   EQU     'F118                   ;LITTON Z ANGLE RATE
STRVX   EQU     'F132                   ;LITTON X DEL VELOCITY
STRVY   EQU     'F134                   ;LITTON Y DEL VELOCITY
STRVZ   EQU     'F136                   ;LITTON Z DEL VELOCITY
BADLIT  EQU     '138                    ;LITTON DATA ERROR XFR ADR
;
;CONTROL PANEL INTERFACE
;
CPXFR   EQU     '1AC                    ;CONTROL PANEL XFER ADR
CPREAD  EQU     'F1FE                   ;CONTROL PANEL STATUS REGISTER
CPWRT   EQU     'F1FC                   ;CONTROL PANEL OUTPUT REGISTER
MSKMOD  EQU     '7                      ;MODE SWITCH MASK
01260   MSKHND  EQU     '18             ;HANDOFF MASK
01280   HANDL   EQU     '10             ;LONG HANDOFF PUSH
01100   HANDS   EQU     '8              ;SHORT HANDOFF PUSH
01120   MSKALT  EQU     '60             ;ALTITUDE PRIORITY SWITCH
                                         MASK
01140   KNTAUT  EQU     '20             ;ALTITUDE=AUTO
01160   KNTLO   EQU     '40             ;ALTITUDE=LO
01180   KNTHI   EQU     '60             ;ALTITUDE=HI
01200   BITLN   EQU     '80             ;MISSILE LAUNCH SWITCH BIT
01220   MSKTST  EQU     '300            ;TEST SWITCH MASK
01240   KNTOFF  EQU     '000            ;TEST=OFF
01260   KNTLMP  EQU     '100            ;TEST=LAMP
01280   KNTDSP  EQU     '200            ;TEST=DISPLAY
01300   KNTSYS  EQU     '300            ;TEST=SYSTEM
01320   MSKGAT  EQU     'C00            ;GATE SWITCH MASK
01340   BITOPN  EQU     '1000           ;OPEN PRIORITY BIT
01360   BITUNK  EQU     '2000           ;UNKNOWN ENABLE BIT
01380   BITTGT  EQU     '4000           ;TARGET SEPARATE BIT
01400   BITAAA  EQU     '8000           ;AAA DEFEAT BIT
01420   LMPLCH  EQU     '1              ;MISSILE LAUNCH LAMP
01440   LMPALT  EQU     '2              ;MISSILE ALERT LAMP
01460   LMPOPN  EQU     '4              ;OPEN LAMP
01480   LMPHND  EQU     '8              ;HANDOFF LAMP
01500   LMPUNK  EQU     '10             ;UNKNOWN LAMP
01520   LMPSPR  EQU     '20             ;SEPARATE LAMP
01540   LMPTGT  EQU     '40             ;TARGET LAMP
01560   LMPPRI  EQU     '80             ;PRIORITY LAMP
01580           ;
01600           ;TTY INTERFACE
01620           ;
01640   TKS     EQU     'FFF0           ;TTY STATUS REGISTER
01660   TKB     EQU     'FFF2           ;TTY DATA REGISTER
01680   TPS     EQU     'FFF4           ;TTY PRINT STATUS REGISTER
01700   TPB     EQU     'FFF6           ;TTY PRINT DATA REGISTER
01720           EJEC
```

INITIALIZE

```
START   BR      *+6                     ;PRIMARY ENTRY POINT
        JMPM    *+4(R)                  ;ALTERNATE ENTRY POINT

LM      R3,NTHRT(R)             ;SETUP STACK POINTER

MOVL    R4,THRLEN
        MUL     R3,R4
        ADD     R4,R4
        LA      R15,THRTAE(R4)          ;R15=STACKP=THRTAB*2*THRLEN*NTHRT

LM      R14,'F0(I)              ;TURN OFF INTERRUPTS

LSR     R14
        LA      R14,DISOFF(R)           ;BLANK DISPLAY

JSUB    DSPDMP(R)

MOVL    R14,MAXTHR              ;SETUP DISPLAY STACK
        MOVL    R13,0                   ;R13=ADR WITHIN DISPLAY BUFFER
        LA      R12,DISSTK(R)           ;R12=ADR DISPLAY STACK

SM      R12,DISPNT(R)           ;INIT DISPLAY STACK POINTER

LM      R0,'8000(I)             ;END OF ACTIVE BUFFER TAG

START1  SI      R13,R12
        SM      R0,DISBUF(R13)

ADDL    R13,4
        BCT     R14,START1
        LA      R14,CPSRV(R)            ;SETUP CONTROL PANEL INTERRUPT
                                         SERVICE

SM      R14,CPXFR(A)

LM      R0,'90(I)

SM      R0,CPXFR+2(A)

LA      R14,SDV(R)

LA      R13,SDVT(R)

LA      R10,E2(R)               ;R10=ADR OF 2ND QUATERNION (E2)

LA      R9,PCD0(R)              ;R9=ADR PCD0

LA      R7,ACPOS(R)             ;R7=ADR ACPOS

LA      R6,DACVEL(R)            ;R6=ADR DACVEL

MOVL    R12,0
        MOVL    R11,6
START3  SI      R12,R14                 ;SDV(I)=0
        SI      R12,R13                 ;SDVT(I)=0
        SI      R12,R10                 ;EVEC(I+1)=0
        SI      R12,R9                  ;PCD0(I)=0
        SI      R12,R7                  ;ACPOS(I)=0
```

```
SM      R12,CRSENB(R)       ;DISABLE CROSS PRODUCT

LM      R12,'FF7F(I)        ;SETUP OLD CONTROL PANEL STATUS

XRMR    R12,CPREAD(A)

ANDL    R12,'F8
ORL     R12,5
SM      R12,CPOLD(R)

MOVL    R12,LMPTGT
SM      R12,LMPWRC(R)       ;INIT LAMPS

SM      R12,CPWRT(A)

LM      R14,NTHRT(R)        ;R14 COUNTS THRU THREATS

LA      R12,THRTAB(R)       ;R12=ADR THREAT TABLE

SM      R12,PRIBEG(R)       ;INIT PRIORITY THREAT POINTER

MOVL    R13,-1
MOV     R13,R12             ;R13=ADR CURRENT THREAT
ADDL    R12,2*THRLEN        ;R12=ADR NEXT THREAT
S       R12,R13             ;POINT TO NEXT THREAT
SM      R11,THROCT(R13)     ;INIT DISPLAY ADR

LMB     R10,THRFLG(R13)     ;SET THREAT TO LATENT

ANDL    R10,-MASACT/'100-1
ORL     R10,CNTLNT/'120
SMB     R10,THRFLG(R13)

BCT     R14,STARTS
MOVL    R11,0
S       R11,R13             ;MARK END OF PRIORITY THREAD
LM      R0,'64D7(I)         ;GSHFT7=2**14*G**2 (1KM/SEC=2**30)

SM      R0,GEST(R)
LA      R14,ALIGN0(R)       ;STRAPDOWN SERVICE ROUTINE

SM      R14,SRPXFR(A)       ;  =INITIAL ALIGNMENT

LM      R0,'F0(I)

SM      R0,SRPXFR+2(A)

MOVL    R0,0                ;INIT ALIGNMENT FLAG (AFLG)
SM      R0,AFLG(R)          ;0/1 = INCOMPLETE/COMPLETE

LM      R0,'90(I)           ;ENABLE INTERRUPTS

LSR     R0
LM      R0,AFLG(R)          ;WAIT FOR INITIAL ALIGNMENT

BZ      *-4                 ; TO COMPLETE
JSUB    LSQALI(R)           ;COMPUTE LATITUDE & INITIAL ALIGNMENT

LM      R0,'F0(I)           ;DISABLE INTERRUPTS

LSR     R0
LA      R13,ACVEL(R)        ;R13=ADR ACVEL
```

```
SI      R12,R6              ;DACVEL(I)=0
BCT     R11,START3
ADDL    R10,-16             ;R10=ADR E1
LM      R0,'4000(I)         ;E1=1

SI      R0,R10
SI      R12,R10
SM      R12,SSRVCT(R)       ;STRAPDOWN SERVICE COUNT=0

SM      R12,TIMKNT(R)       ;ALIGNMENT TIME COUNT=0

SM      R12,TIMKNT+2(R)

SM      R12,W1SQM(R)        ;.4*W1**2=0

SM      R12,W1SQM+2(R)

LA      R14,OLDOX(R)        ;INIT COMPENSATION OLDOX & OLDOZ

MOVL    R13,4
SI      R12,R14
BCT     R13,.-2
MOVL    R13,12              ;INIT RAW DATA INPUTS
LA      R14,RAWDV(R)

SI      R12,R14
BCT     R13,.-2
SM      R12,TIME(R)         ;MISSION TIME=0

SM      R12,DISPRI(R)       ;AUTO PRIORITY

SM      R12,DISUNK(R)       ;UNKNOWN ENABLED

SM      R12,DISTGT(R)       ;NO TARGET SEPARATION

LA      R14,BADSRV(R)       ;SERVICE LITTON DATA ERROR

SM      R14,BADLIT(A)

LM      R0,'F0(I)

SM      R0,BADLIT+2(A)

SM      R12,BADCNT(R)

MOVL    R12,-1
SM      R12,DMDADR(R)       ;DELETE DIAMOND ADR

SM      R12,SCNENE(R)       ;DISABLE SCNARIO PROCESSING
SM      R12,TSTLMP(R)       ;DISABLE LAMP TEST

SM      R12,DSPENE(R)       ;DISABLE THREAT DISPLAY

SM      R12,DISIR(R)        ;NOT IR

SM      R12,DISBND(R)       ;ALL RF BANDS

SM      R12,DISSCH(R)       ;SEARCH RADARS DISABLED

SM      R12,DISTRN(R)       ;NOT TRAINING

SM      R12,DISAAA(R)       ;AAA DISABLED
```

```
MOVL    R3,6                    ;R3 COUNTS 3 COMPONENTS
MOVL    R2,0
SI      R2,R13                  ;ACVEL(I)=0
SI      R2,R14                  ;DACVEL(I)=0
BCT     R3,*-6
ADDL    R13,ACPOSX-ACVEL-2*6    ;R13=ADR ACPOSX
LA      R14,WE(R)               ;R14=ADR WE

JSUB    DZML30(R)               ;(R0,R1)=WE*R*COS(LAT)

ADDL    R13,ACVELY-ACPOSX       ;R13=ADR ACVELY
SI      R0,R13                  ;UPDATE ACVELY
S       R1,R13
MOVL    R0,1                    ;INIT SERVICE COUNT
ANRM    R0,SSRVCT(R)

LM      R0,'80(I)               ;INIT TIME UPDATE

ADMR    R0,SSRVCT(R)

SM      R0,SECUPD(R)

LM      R0,'8000(I)             ;FORCE OVERFLOW ON 1 SEC GRAVITY

SM      R0,GSCND(R)

LA      R14,STRAP(R)            ;STRAPDOWN SERVICE ROUTINE IS REAL THING
SM      R14,SRPXFR(A)

LA      R14,RTCSRV(R)           ;SETUP RTC SERVICE ROUTINE

SM      R14,RTCXFR(A)

LM      R0,'90(I)

SM      R0,RTCXFR+2(A)

MOVL    R13,1                   ;RTC @50MS
SMB     R13,RTS(A)

MOVL    R0,'10                  ;ENABLE INTERRUPTS
LSR     R0
EJEC
```

BACKGROUND PROCESSING

```
IDLE    LM      R4,PRIBEG(R)        ;R4=CURRENT THREAT POINTER

LA      R6,PRIBEG-THRPNT(R) ;R6=PAST THREAT POINTER

MOV     R5,R4
        LM      R0,THRVEL(R5)       ;MOBILE THREAT?

BZ      **6                 ;NO
        JSUB    MOVE(R)             ;YES, MOVE IT

JSUB    RNGPRI(R)           ;COMPUTE (RANGE RATIO)**2

IDLE2   EQU     *
        IFN     DEBUG
        LMB     R0,TKS(A)           ;R0=KEYBOARD STATUS
```

```
         BNM     TTYEND              ;NO CHARACTER
         LMB     R0,TKB(A)           ;R0=INPUT CHARACTER

ANDL    R0,'7F
         CMPL    R0,'A               ;LP?
         BE      *+6                 ;YES, DON'T ECHO
         JSUB    TTYOUT(R)           ;NO, ECHO

MOV     R1,R0               ;TRY FOR # CONVERSION
         ADDL    R1,-'30
         BLT     TTY2
         CMPL    R0,'39
         BLE     TTYA                ;CHAR 1-9
         ADDL    R1,-7
         CMPL    R1,'A               ;CHAR A-Z?
         BLT     TTY2
TTYA     CMPM    R1,CHRCOM(R)        ;LESS THAN BASE?

BGE     TTY2                ;NO
         JIND    CHRNBR(R)           ;YES, XFER TO NUMBER PROCESS

TTY2     LA      R3,CHRCOM+2(R)      ;R3=ADR COMMAND TABLE

MOVL    R2,CHRLEN-1         ;R2 COUNTS THRU TABLE
TTY3     CMPM    R0,0(R3)

BNE     TTY4                ;NO MATCH, KEEP TRYING
         JIND    CHRWRK-CHRCOM(R3)   ;MATCH, XFER TO PROCESS

TTY4     ADDL    R3,2                ;KEEP LOOKING FOR MATCH
         BCT     R2,TTY3
CHRERR   MOVL    R0,'3F              ;NO MATCH IN TABLE
         JSUB    TTYOUT(R)           ;COMMAND ERROR, TYPE ?

RPROC    MOVL    R0,'D               ;TYPE CRLF
         JSUB    TTYOUT(R)

REINIT   MOVL    R2,CHRLEN           ;REINITIALIZE; R2 COUNTS THRU
                                      DISPATCH TABLE
         LA      R3,CHRINI(R)        ;R3=ADR INITIAL DISPATCH TABLE

RPROC1   LI      R1,R3               ;MOVE INITIAL TO WORKING
         SM      R1,CHRWRK-CHRINI-2(R3)

BCT     R2,RPROC1
TTY10    MOVL    R0,10               ;RESET #BASE TO 10
         SM      R0,CHRCOM(R)

TTYN0    MOVL    R0,0
         SM      R0,NBR1(R)          ;#=0

SM      R0,NBR2(R)

SM      R0,NFLAG(R)         ;NFLAG=0

TTYEND   EQU     *
         IEND
         LM      R5,THRPNT(R4)       ;R5=NEXT THREAT POINTER

BNZ     *+6                 ;MORE THREATS ON THREAD
         JMPM    IDLE(R)             ;NO MORE THREATS, START OVER

LMB     R0,THRFLG(R5)       ;CHECK FOR THREAT EXPIRATION
```

```
          ANDL    R0,MASACT/'100
          CMPL    R0,CNTEXP/'100    ;EXPIRED?
          BNE     IDLE2B            ;NO
          LM      R0,THRPNT(R5)     ;YES, REMOVE IT FROM THREAD

SM      R0,THRPNT(R4)

JMPM    IDLE2(R)

IDLE2B    LM      R0,THRVEL(R5)     ;MOBILE THREAT?

BZ      **4               ;NO
          JSUB    MOVE(R)

JSUB    RNGPRI(R)         ;COMPUTE (RANGE RATIO)**2

CMPM    R2,THRPRI(R4)     ;HIGHER PRIORITY?

BGE     IDLE4             ;NO
IDLE3     LM      R0,THRPNT(R5)     ;YES, INTERCHANGE THEM

SM      R4,THRPNT(R5)     ;R4 BECOMES NEW NEXT

SM      R0,THRPNT(R4)

SM      R5,THRPNT(R6)     ;PAST POINTS TO NEXT (NEW CURRENT)

MOV     R6,R5             ;PAST=NEXT (NEW CURRENT)
06080     JMPM    IDLE2(R)

06100 IDLE4 MOV   R6,R4             ;ADVANCE TO NEXT THREAT
06120     MOV     R4,R5
06140     JMPM    IDLE2(R)

06160     EJEC
;RNGPRI - CALCULATES RANGE/WEAPONS RANGE PRIORITY
;CALLING SEQUENCE:
;       R5=THREAT POINTER
;       JSUB RNGPRI(R)
;       R0=PRIORITY (DISPLAY RADIUS)
RNGPRI    PUSH    R2,3              ;SAVE REGISTERS
          LA      R4,SACPOS(R)      ;R4=ADR A/C POSITION VECTOR

LI      R0,R4
          SBMR    R0,THRX(R5)

MUL     R0,R0             ;(R0,R1)=XDIF**2
          LI      R2,R4
          SBMR    R2,THRY(R5)

MUL     R2,R2
          DADD    R0,R2             ;(R0,R1)=XDIF**2+YDIF**2
          LI      R2,R4
          SBMR    R2,THRZ(R5)

MUL     R2,R2
          DADD    R0,R2             ;(R0,R1)=RANGE**2
          LM      R2,THRRNG(R5)     ;R2=PREVIOUS RANGE

JSUB    SQRT(R)           ;R2=PRESENT RANGE

SM      R2,THRRNG(R5)
```

```
        LM      R0,THRPRI(R5)       ;R0=CURRENT PRIORITY

MOVL    R4,MASTYP           ;R4=RADAR TYPE MASK
        ANMR    R4,THRFLG(R5)       ;SEARCH RADAR

BZ      RNGP5               ;YES, LEAVE PRIORITY ALONE
        LM      R3,THRWR(R5)        ;R3=EFFECTIVE WEAPONS RANGE

CMP     R2,R3               ;RANGE.GE.WEAPONS RANGE
        BGE     RNGP2               ;YES
        LM      R0,2*RING2-2*RING1(I)    ;NO, COMPUTE INNER RADIUS

MUL     R0,R2               ;R0=2*(RING2-RING1)*RNG/WEAPON
        DIV     R0,R3
        SBMR    R0,RING2-2*RING1(I)      ;R0=R0+2*RING1-RING2

CMPM    R0,RING1(I)         ;RADIUS.GE.RING1?

BGE     RNGP4               ;YES
        LM      R0,RING1(I)         ;NO, CLAMP AT RING1

BR      RNGP4
RNGP2   LM      R0,RING3-RING2(I)        ;COMPUTE OUTER RADIUS

MUL     R0,R2               ;(R0,R1)=(RING3-RING2)*RNG/WEAPON
        DIV     R0,R3
        BNV     *+6                 ;OVERFLOW?
        LM      R0,'7FFF*RING3-2*RING2(I)    ;YES, SET PRIORITY
                                                  TO MAX

SBMR    R0,RING3-2*RING2(I)      ;R0=R0+2*RING2-RING3
RNGP4   SM      R0,THRPRI(R5)       ;UPDATE THREAT PRIORITY

RNGP5   LM      R1,SCNFNB(R)        ;SCNARIO ENABLED?

BM      RNGPX               ;NO, LEAVE LATENTS LATENT
        LMB     R1,THRFLG(R5)       ;LATENT THREAT?

ANDL    R1,MASACT/'100
        CMPL    R1,CNTINT/'100
        BNE     RNGP6               ;NO
        CMPM    R2,THRON(R5)        ;YES, INSIDE TURN ON RANGE?

BGT     RNGPX               ;NO
        LM      R1,-MASACT-1(I)     ;YES, ACTIVATE THREAT

ANRM    R1,THRFLG(R5)

LM      R4,THRVEL(R5)       ;IS THREAT MOBILE?

BZ      RNGPX               ;NO
        LA      R3,SACPOS(R)        ;YES, COMPUTE VELOCITY COMPONENTS

LI      R0,R3
        SBMR    R0,THRX(R5)

MUL     R0,R4
        DIV     R0,R2
        SM      R0,THRVX(R5)
```

```
           LI       R0,R3
           SBMR     R0,THRY(R5)

MUL      R0,R4
           DIV      R0,R2
           SM       R0,THRVY(R5)

L        R0,R3
           SBMR     R0,THRZ(R5)

MUL      R0,R4
           DIV      R0,R2
           SM       R0,THRVZ(R5)

LM       R0,TIME(R)          ;UPDATE THREAT LAST UPDATE TIME
           SM       R0,THRUPD(R5)

LM       R0,THRPRI(R5)
           BR       RNGP7
RNGP6      CMPL     R1,CNTON/'100       ;ACTIVE THREAT?
           BNE      RNGPX               ;NO
RNGP7      LMB      R1,THRFLG(R5)       ;YES, MISSILE LATENT?

ANDL     R1,MASMIS/'100
           CMPL     R1,CNTMLT/'100
           BNE      RNGPX               ;NO
           CMPM     R2,THRMFR(R5)       ;YES, WITHIN LAUNCH RANGE?

BGT      RNGPX               ;NO
           ADDL     R1,CNTMLT/'100      ;YES, SET MISSILE ALERT
           SMB      R1,THRFLG(R5)

LMB      R1,THREVL(R5)       ;INTERCEPT TIME=-EVAL TIME

NEG      R1,R1
           SM       R1,THRINT(R5)

RNGPX      POP      R4,3                ;RESTORE REGISTERS
           JRTS                         ;RETURN
           EJEC
;MOVE - MOVES MOBILE THREAT TO INTERCEPT AIRCRAFT
;      CALCULATION IS AN APPROXIMATION
;CALLING SEQUENCE:
;      R5=THREAT POINTER
;      JSUB     MOVE(R)
;
MOVE       PUSH     R0,12               ;SAVE REGISTERS
           LM       R0,SCNENB(R)        ;SCNARIO ENABLED?

BM       MOVEX1              ;NO, MOVE NOTHING
           LMB      R0,THRFLG(R5)       ;LATENT THREAT?

ANDL     R0,MASACT/'100
           CMPL     R0,CNTINT/'100
           BE       MOVEX1              ;YES, DON'T MOVE IT
           CMPL     R0,CNTOFF/'100      ;THREAT TURNED OFF?
           BE       MOVEX1              ;YES, DON'T MOVE IT
           LM       R0,TIME(R)          ;HAS AT LEAST 1 SEC ELAPSED?
```

```
SBMR    R0,THRUPD(R5)

BGT     *+6                 ;YES
POP     R11,12              ;RESTORE REGISTERS
JRTS                        ;RETURN
LA      R11,SACPOS(R)       ;R11=ADR A/C POSITION VECTOR

LI      R6,R11              ;(R6,R7,R8)=RANGE VECTOR
SBMR    R6,THRX(R5)

LI      R7,R11
SBMR    R7,THRY(R5)

LI      R8,R11
SBMR    R8,THRZ(R5)

LM      R0,THRRNG(R5)       ;(R0,R1)=OLD RANGE (1KM=2**20)

MOVL    R1,0
LA      R4,THRVX(R5)        ;R4=ADR THREAT VELOCITY VECTOR

LI      R9,R4               ;(R9,R10,R11)=THREAT VELOCITY
                            ;                    VECTOR

SBMR    R9,ACVX(R)

LI      R10,R4
SBMR    R10,ACVY(R)

LI      R11,R4
SBMR    R11,ACVZ(R)

MOV     R2,R11              ;(R2,R3)=DOT(RANGE;VELOCITY DIFF)
MUL     R2,R8
MUL     R10,R7
DADD    R2,R10

MUL     R9,R6
DADD    R2,R9
BGT     MOVE1               ;INTERCEPT TIME *?
LM      R2,=MASACT=1        ;DEACTIVATE THREAT

ANRM    R2,THRFLG(R5)

LM      R2,CNTOFF(I)

ORRM    R2,THRFLG(R5)

POP     R11,12              ;RESTORE REGISTERS
JRTS                        ;RETURN
DIV     R2,R0               ;R2=INTERCEPT VELOCITY (1KM/SEC=2**14)
DIV     R0,R2               ;R0=TIME TO INTERCEPT (1 SEC=2**6)
LM      R2,ACVX(R)          ;(R6,R7,R8)=RANGE VECTOR AT INTERCEPT

MUL     R2,R0
ADD     R6,R2
LM      R2,ACVY(R)

MUL     R2,R0
ADD     R7,R2
LM      R2,ACVZ(R)
```

```
MUL     R2,R0
ADD     R8,R2
MOV     R0,R6           ;MOVE THREAT ALONG NEW RANGE VECTOR
MUL     R0,R6
MOV     R3,R7
MUL     R3,R7
DADD    R0,R3
MOV     R3,R8
MUL     R3,R8
DADD    R0,R3
LM      R2,THRRNG(R5)

JSUB    SQRT(R)         ;R2=UPDATED RANGE

LM      R4,TIME(R)

LM      R0,THRUPD(R5)

SM      R4,THRUPD(R5)   ;STORE UPDATE TIME

SUB     R4,R0           ;R0=TIME SINCE LAST UPDATE
SLZ     R4,6            ;1 SEC=2**6
LM      R3,THRVEL(R5)   ;R3=THREAT VELOCITY

MOV     R0,R3           ;UPDATE THREAT VELOCITY VECTOR
MUL     R0,R6
DIV     R0,R2
SM      R0,THRVX(R5)    ;UPDATE THRVX
        MUL     R0,R4
        ADRM    R0,THRX(R5)     ;UPDATE THRX

MOV     R0,R3
        MUL     R0,R7
        DIV     R0,R2
        SM      R0,THRVY(R5)    ;UPDATE THRVY

MUL     R0,R4
        ADRM    R0,THRY(R5)     ;UPDATE THRY

MOV     R0,R3
        MUL     R0,R8
        DIV     R0,R2
        SM      R0,THRVZ(R5)    ;UPDATE THRVZ

MUL     R0,R4
        ADRM    R0,THRZ(R5)     ;UPDATE THRZ

MOVEX   POP     R11,12          ;RESTORE REGISTERS
        JRTS                    ;RETURN
        EJEC
;SQRT - CALCULATES SQRT(R0,R1)
;CALLING SEQUENCE;
;       (R0,R1)=SQUARE
;       R2=SQUARE ROOT ESTIMATE
;       JSUB    SQRT(R)
;       R2=SQUARE ROOT
SQRT    PUSH    R3,2            ;SAVE REGISTERS
        CMPL    R0,0            ;NEGATIVE #?
        BLT     SQRTX           ;YES, EXIT
        CMPL    R2,0            ;ESTIMATED BEFORE?
        BNE     SQRT1           ;YES, USE IT
```

```
           MOV     R2,R0              ;R0=0?
           BZ      SQRT0              ;YES, TRY R1
           ADD     R2,R0              ;ESTIMATE=2*R0*2**12
           LA      R2,'1000(R2)

BR      SQRT1
SQRT0      MOV     R2,R1              ;R1=0?
           BZ      SQRTX              ;YES, EXIT
           SRL     R2,8               ;NO, ESTIMATE=2**(-8)*R1*2**5
           ADDL    R2,'20
SQRT1      NEG     R3,R2              ;(R3,R4)=-ESTIMATE**2
           MUL     R3,R2
           DADD    R3,R0              ;(R3,R4)=A-ESTIMATE**2
           DIV     R3,R2              ;R3=(A-ESTIMATE**2)/(2*ESTIMATE)
           SRA     R3,1
           ADD     R2,R3
           CMPL    R3,0               ;DELTA .GT.0?
           BGT     SQRT1              ;YES, RE-ESTIMATE
           CMPL    R3,-1              ;DELTA .LT. -1?
           BLT     SQRT1              ;YES, RE-ESTIMATE
SQRTX      POP     R4,2               ;NO, RESTORE REGISTERS
           JRTS                       ;RETURN
           EJEC

;BADSRV - SERVICE ROUTINE TO COUNT OCCURRENCES OF LITTON DATA
           ERRORS
BADSRV     PUSH    R14,1
           MOVL    R14,1
           ADRM    R14,BADCNT(R)

POP     R14,1
           RTI
           EJEC

;ALIGN0 - STRAPDOWN SERVICE ROUTINE TO FLUSH PENDING INTERRUPT
ALIGN0     PUSH    R0,1
           LA      R0,ALIGN1(R)       ;RESET SERVICE ROUTINE TO ALIGN1

SM      R0,SRPXFR(A)

POP     R0,1
           RTI
           EJEC

;ALIGN1 - STRAPDOWN SERVICE ROUTINE TO COMPUTE LSQFIT
;          OF GRAVITY VECTOR AS A FUNCTION OF TIME
ALIGN1     PUSH    R0,15              ;SAVE REGISTERS
           JSUB    RDSTRP(R)          ;READ STRAPDOWN DATA

LM      R0,SSRVCT(R)       ;R0=SERVICE COUNT

SM      R0,'FFFC(A)        ;OUTPUT TO DISPLAY PANEL

LCL     R0,1               ;EVEN COUNT?
           BZ      **6                ;YES
           POP     R14,15             ;NO, RESTORE REGISTERS
           RTI                        ;RETURN
           JSUB    COMP(R)            ;COMPENSATE THE RAW INPUT

JSUB    ATTUDE(R)          ;COMPUTE NEW ATTITUDE

JSUB    DVXFM(R)           ;XFORM DELTA VEL
```

```
LM      R0,SSRVCT(R)

ANDL    R0,'7F           ;1 SEC ELAPSED?
BZ      **6              ;YES
POP     R14,15           ;NO, RESTORE REGISTERS
RTI                      ;INTERRUPT RETURN
LA      R13,TIMKNT(R)    ;UPDATE TIMKNT

LI      R0,R13           ;(R0,R1)=TIMKNT
LI      R1,R13
LI      R2,R13           ;(R2,R3)=TIMINC
L       R3,R13

ADDL    R13,-6
DSUB    R0,R2            ;(R0,R1)=TIMKNT-TIMINC
SI      R0,R13

S       R1,R13
MOVL    R10,3            ;R10 COUNTS 3 VECTOR COMPONENTS
LA      R11,SDVT(R)      ;R11=ADR SUM(-VEL*T)

LA      R12,SDV(R)       ;R12=ADR SUM(VEL)

LA      R14,DACVEL(R)    ;R14=ADR DELTA VELOCITY IN REF FRAME

MOVL    R8,0             ;(R8,R9) ACCUMULATES 2**14*DACVEL**2
MOVL    R9,0
LA      R13,ALNGN(R)     ;R13=ADR 1./(N*G)

LI      R0,R12           ;(R0,R1)=SDV(I)
L       R1,R12
ADDL    R12,-2
JSUB    DMUL30(R)        ;(R0,R1)=(R0,R1)+VEL(I)/(G*N)

SI      R0,R12
SI      R1,R12
LI      R0,R11           ;(R0,R1)=SDVT(I)
L       R1,R11
ADDL    R11,-2
LA      R13,TIMKNT(R)

JSUB    DMUL30(R)        ;(R0,R1)=(R0,R1)+
                         ; VEL(I)*6*(-T)/(8*G*N*(N-1))
SI      R0,R11
SI      R1,R11
LI      R0,R14           ;(R0,R1)=DACVEL(I)
L       R1,R14
ADDL    R14,-2
DSLA    R0,7
MUL     R0,R0
DSLA    R0,2
DADD    R8,R0
MOVL    R0,0             ;ZERO DELTA VELOCITY IN REF FRAME
SI      R0,R14
SI      R0,R14
BCT     R10,AL12
LA      R13,GEST(R)      ;R13=ADR GRAVITY ESTIMATE

LI      R0,R13           ;(R0,R1)=2**14*G**2
L       R1,R13
ADDL    R13,-2
DSUB    R8,R0            ;LOW PASS FILTER
DSRA    R8,6
DADD    R0,R8
```

```
          SI     R0,R13            ;UPDATE 2**14*G**2
          S      R1,R13
          LM     R0,SSRVCT(R)      ;256 SECONDS ELAPSED?

BP     ALIX              ;NO, KEEP THIS SERVICE ROUTINE
          LA     R0,ALIGN2(R)      ;CHANGE TO HOLDING SERVICE ROUTINE

SM     R0,SRPXFR(A)

MOVL   R2,1
          SM     R2,AFLG(R)        ;AFLG=1
ALIX      POP    R14,15            ;RESTORE REGISTERS
          RTI                      ;RETURN
          EJEC
;ALIGN2 - SERVICES STRAPDOWN INTERRUPT WHILE BACKGROUND
;         PROCESSING COMPUTES EARTH'S SPIN VECTOR
ALIGN2    PUSH   R0,15             ;SAVE REGISTERS
          JSUB   RDSTRP(R)

LM     R0,SSRVCT(R)      ;R0=SERVICE COUNT

LCL    R0,1              ;COUNT EVEN?
          BNZ    **10              ;NO
          JSUB   COMP(R)           ;YES, COMPENSATE

JSUB   ATTUDE(R)         ;UPDATE ATTITUDE

POP    R14,15            ;RESTORE REGISTERS
          RTI                      ;RETURN
          EJEC
;STRAP - STRAPDOWN SERVICE ROUTINE
;
STRAP     PUSH   R0,15             ;SAVE REGISTERS
          JSUB   RDSTRP(R)         ;READ STRAPDOWN

LM     R0,SSRVCT(R)      ;R0=SERVICE COUNT

LCL    R0,1              ;EVEN COUNT?
          BZ     STRAP0            ;YES, DO COMPENSATION & ATTITUDE
STRAPX    POP    R14,15            ;RESTORE REGISTERS
          RTI                      ;RETURN
STRAP0    JSUB   COMP(R)           ;COMPENSATE RAW DATA FOR ERRORS

JSUB   VERT(R)           ;ALIGN TO VERTICAL

JSUB   ATTUDE(R)         ;COMPUTE NEW ATTITUDE

JSUB   DVXFM(R)          ;XFORM DELTA V TO REFERENCE FRAME

JSUB   GRAV(R)           ;PERFORM GRAVITY CALCULATION

JSUB   NAV(R)            ;XFORM REFERENCE DATA INTO SCENARIO
                                   ;FRAME

BR     STRAPX            ;EXIT
          EJEC
```

```
;RDSTRP - READS STRAPDOWN INPUTS
;CALLING SEQUENCE;
;       JSUB   RDSTRP(R)
RDSTRP  LA     R14,RAWDO(R)      ;R14=ADR RAW DEL ANGLE
        LA     R13,RAWDOM(R)     ;R13=ADR RAW DEL ANGLE MAGNITUDE
        MOVL   R12,0             ;R12 COUNTS 3 ANGLES
RDS1    LMB    R2,STROP(R12)     ;R2=+ANGLE COUNT
        LMB    R3,STROM(R12)     ;R3=-ANGLE COUNT
        L      R0,R14            ;R0=RAWDO(I)
        L      R1,R13            ;R1=RAWDOM(I)
        ADD    R0,R2             ;R0=RAWDO(I)+NET PULSE COUNT
        SUB    R0,R3
        SI     R0,R14
        ADD    R1,R2             ;R1=RAWDOM(I)+TOTAL PULSE COUNT
        ADD    R1,R3
        SI     R1,R13
        ADDL   R12,2             ;NEXT ANGLE
        CMPL   R12,2*3           ;MORE ANGLES?
        BLT    RDS1              ;YES
        LA     R14,RAWDV(R)      ;R14=ADR RAW DEL VEL
        LA     R13,RAWDVM(R)     ;R13=ADR RAW DEL VEL MAGNITUDE
        LMB    R2,STRVXP(R)      ;R2=+DELTA VX PULSE COUNT
        LMB    R3,STRVXM(R)      ;R3=-DELTA VX PULSE COUNT
        L      R0,R14            ;R0=RAWDVX
        L      R1,R13            ;R1=RAWDVXM
        ADD    R0,R2             ;R0=RAWDVX+NET COUNT
        SUB    R0,R3
        SI     R0,R14
        ADD    R1,R2             ;R1=RAWDVXM+TOTAL COUNT
        ADD    R1,R3
        SI     R1,R13
        MOVL   R12,0
RDS2    LMB    R2,STRVYP(R12)    ;R2=+DELTA VEL PULSE COUNT
        LMB    R3,STRVYM(R12)    ;R3=-DELTA VEL PULSE COUNT
        L      R0,R14            ;R0=RAWDV
        L      R1,R13            ;R1=RAWDVM
        ADD    R0,R2             ;R0=RAWDV+NET COUNT
        SUB    R0,R3
        SI     R0,R14
        ADD    R1,R2             ;R1=RAWDVM+TOTAL COUNT
        ADD    R1,R3
        SI     R1,R13
        ADDL   R12,2             ;NEXT VELOCITY
        CMPL   R12,2*2           ;MORE VELOCITIES?
        BLT    RDS2              ;YES
        MOVL   R1,1              ;INCREMENT SERVICE COUNT
        ADRM   R1,SSRVCT(R)
        JRTS                     ;RETURN
        EJEC
```

```
;COMP = COMPENSATES RAW STRAPDOWN INPUTS FOR KNOWN ERRORS
;CALLING SEQUENCE:
;        JSUB     COMP(R)
;
COMP     LA       R14,ABR(R)        ;R14=ACCEL BIAS ADR

LI       R3,R14            ;(R2,R3)=ABB(1)
         SEXE     R2,R3
         LI       R5,R14            ;(R4,R5)=ABB(2)
         SEXE     R4,R5
         LI       R7,R14            ;(R6,R7)=ABB(3)
         SEXE     R6,R7
         LA       R14,RAWDV(R)      ;R14=RAW DELTA VEL ADR

LI       R8,R14            ;R8=DVA(1)
         LI       R9,R14            ;R9=DVA(2)
         LI       R10,R14           ;R10=DVA(3)
         LA       R14,CAB(R)        ;R14=CAB ADR

LI       R0,R14            ;R0=CAB(1,1)
         MUL      R0,R8             ;(R2,R3)=ABB(1)+CAB(1,1)*DVA(1)
         DADD     R2,R0
         LI       R11,R14           ;R11=CAB(1,2)=CAB(2,1)
         MOV      R0,R11

MUL      R0,R9
         DADD     R2,R0             ;(R2,R3)=(R2,R3)+CAB(1,2)*DVA(2)
         MOV      R0,R11

MUL      R0,R8
         DADD     R4,R0             ;(R4,R5)=ABB(2)+CAB(2,1)*DVA(1)
         LI       R11,R14           ;R11=CAB(1,3)=CAB(3,1)
         MOV      R0,R11
         MUL      R0,R10
         DADD     R2,R0             ;(R2,R3)=(R2,R3)+CAB(1,3)*DVA(3)
         MOV      R0,R11
         MUL      R0,R8
         DADD     R6,R0             ;(R6,R7)=ABB(3)+CAB(3,1)*DVA(1)
         LI       R0,R14            ;R0=CAB(2,2)
         MUL      R0,R9
         DADD     R4,R0             ;(R4,R5)=(R4,R5)+CAB(2,2)*DVA(2)
         LI       R11,R14           ;R11=CAB(2,3)=CAB(3,2)
         MOV      R0,R11
         MUL      R0,R10
         DADD     R4,R0             ;(R4,R5)=(R4,R5)+CAB(2,3)*DVA(3)
         MOV      R0,R11
         MUL      R0,R9
         DADD     R6,R0             ;(R6,R7)=(R6,R7)+CAB(3,2)*DVA(2)
         LI       R0,R14
         MUL      R0,R10            ;R0=CAB(3,3)
         DADD     R6,R0             ;(R6,R7)=(R6,R7)+CAB(3,3)*DVA(3)
         LA       R14,CABUBA(R)     ;R14=CAB*UBA ADR

LA       R13,RAWDVM(R)     ;R13=RAW DEL VELOCITY MAGNITUDE ADR

LI       R0,R14
         LI       R1,R13
         MUL      R0,R1
         DSUB     R2,R0             ;(R2,R3)=(R2,R3)-CAB*UBA(1,1)*DVAM(1)
         LI       R0,R14
         LI       R1,R13
         MUL      R0,R1
         DSUB     R4,R0             ;(R4,R5)=(R4,R5)-CAB*UBA(2,2)*DVAM(2)
         LI       R0,R14
```

```
     LI       R1,R13
     MUL      R0,R1
     DSUB     R6,R0         ;(R6,R7)=(R6,R7)-CAB*UBA(3,3)*CVAM(3)
     LA       R14,CDV(R)    ;R14=COMPENSATED DEL VELOCITY ADR
     SI       R2,R14        ;UPDATE COMPENSATED DEL VELOCITY
     SI       R3,R14
     SI       R4,R14
     SI       R5,R14
     SI       R6,R14
     SI       R7,R14

COMPENSATE ANGLES

LA       R14,GBB(R)    ;R14=ANGLE BIAS ADR

LI       R3,R14        ;(R2,R3)=GBB(1)
     SEXE     R2,R3
     LI       R5,R14        ;(R4,R5)=GBB(2)
     SEXE     R4,R5
     LI       R7,R14        ;(R6,R7)=GBB(3)
     SEXE     R6,R7
     LA       R14,CGB(R)    ;R14=CGB(1,1) ADR

LA       R13,RAWDO(R)  ;R13=DTG(1) ADR

JSUB     SNGDBL(R)     ;(R0,R1)=CGB(1,1)*DTG(1)

DADD     R2,R0         ;(R2,R3)=GBB(1)+CGB(1,1)*DTG(1)
     ADDL     R14,4         ;R14=CGB(1,2) ADR
     ADDL     R13,2         ;R13=DTG(2) ADR
     LI       R0,R14
     LI       R1,R13
     MUL      R0,R1
     DADD     R2,R0         ;(R2,R3)=(R2,R3)+CGB(1,2)*DTG(2)
     LI       R0,R14
     LI       R1,R13
     MUL      R0,R1
     DADD     R2,R0         ;(R2,R3)=(R2,R3)+CGB(1,3)*DTG(3)
     ADDL     R13,-6        ;R13=DTG(1) ADR
     LI       R0,R14
     LI       R1,R13
     MUL      R0,R1
     DADD     R4,R0         ;(R4,R5)=GBB(2)+CGB(2,1)*DTG(1)
     JSUB     SNGDBL(R)

DADD     R4,R0         ;(R4,R5)=(R4,R5)+CGB(2,2)*DTG(2)
     ADDL     R14,4         ;R14=CGB(2,3) ADR
     ADDL     R13,2         ;R13=DTG(2) ADR
     LI       R0,R14
     LI       R1,R13
     MUL      R0,R1
     DADD     R4,R0         ;(R4,R5)=(R4,R5)+CGB(2,3)*DTG(3)
     ADDL     R13,-6        ;R13=DTG(1) ADR
     LI       R0,R14
     LI       R1,R13
     MUL      R0,R1
     DADD     R6,R0         ;(R6,R7)=GBB(3)+CGB(3,1)*DTG(1)
     LI       R0,R14
     LI       R1,R13
     MUL      R0,R1
     DADD     R6,R0         ;(R6,R7)=(R6,R7)+CGB(3,2)*DTG(2)
     JSUB     SNGDBL(R)
```

```
DADD    R6,R0           ;(R6,R7)=(R6,R7)+CGB(3,3)*DTG(3)
LA      R14,CGBUBG(R)   ;R14=CGB*UBG(1,1) ADR

LA      R13,RAWDOM(R)   ;R13=DTGM(1) ADR

LI      R0,R14
LI      R1,R13
MUL     R0,R1
DSUB    R2,R0           ;(R2,R3)=(R2,R3)-CGB*UBG(1,1)*DTGM(1)
LI      R0,R14
LI      R1,R13
MUL     R0,R1
DSUB    R4,R0           ;(R4,R5)=(R4,R5)-CGB*UBG(2,2)*DTGM(2)
LI      R0,R14
LI      R1,R13
MUL     R0,R1
DSUB    R6,R0           ;(R6,R7)=(R6,R7)-CGB*UBG(3,3)*DTGM(3)
LA      R14,CGBMU(R)    ;R14=CGB*MU(1,1) ADR

LA      R13,CDV(R)      ;R13=COMPENSATED DV ADR

JSUB    MURWCD(R)

DSUB    R2,R0           ;(R2,R3)=(R2,R3)-(CGB*MU(1,K)*CDV(K))
JSUB    MURWCD(R)

DSUB    R4,R0           ;(R4,R5)=(R4,R5)-(CGB*MU(2,K)*CDV(K))
JSUB    MURWCD(R)

DSUB    R6,R0           ;(R6,R7)=(R6,R7)-(CGB*MU(3,K)*CDV(K))
LA      R14,OLDOX(R)    ;R14=ADR OLDOX

MOV     R8,R2           ;(R8,R9)=CURRENT OX
MOV     R9,R3

MOV     R10,R6          ;(R10,R11)=CURRENT OZ
MOV     R11,R7
L       R0,R14          ;(R0,R1)=OLDOX
SI      R8,R14          ;UPDATE OLDOX
L       R1,R14
SI      R9,R14
DSUB    R8,R0           ;(R8,R9)=OXDIFF
L       R0,R14          ;(R0,R1)=OLDOZ
SI      R10,R14         ;UPDATE OLDOZ
L       R1,R14
SI      R11,R14
DSUB    R10,R0          ;(R10,R11)=OZDIFF
SI      R8,R14          ;STORE OXDIFF
SI      R9,R14
SI      R10,R14         ;STORE OZDIFF
S       R11,R14
ADDL    R14,-6          ;R14=OXDIF ADR
LA      R13,KFAC(R)

JSUB    DZML30(R)

DADD    R6,R0           ;(R6,R7)=(R6,R7)+KFAC*OXDIF
ADDL    R14,4
JSUB    DZML30(R)

DADD    R2,R0           ;(R2,R3)=(R2,R3)+KFAC*OZDIF
DADD    R4,R0           ;(R4,R5)=(R4,R5)+KFAC*OZDIF
LA      R14,CDO(R)      ;R14=COMPENSATED ANGLE ADR
```

```
         L      R0,R14           ;(R0,R1)=PREVIOUS CDOX
         SI     R2,R14           ;UPDATE CDOX
         L      R1,R14
         SI     R3,R14
         L      R8,R14           ;(R8,R9)=PREVIOUS CDOY
         SI     R4,R14           ;UPDATE CDOY
         L      R9,R14
         SI     R5,R14
         L      R10,R14          ;(R10,R11)=PREVIOUS CDOZ
         SI     R6,R14           ;UPDATE CDOZ
         L      R11,R14
         SI     R7,R14
         LA     R14,PCDO(R)      ;UPDATE PCDO

SI     R0,R14
         SI     R1,R14
         SI     R8,R14
         SI     R9,R14
         SI     R10,R14
         SI     R11,R14
;
;CORRECT DEL VELOCITY FOR SAMPLING LAG
;
         LM     R2,CDOX(R)       ;(R2,R3)=CDOX
LM       R3,CDOX+2(R)

DSLA     R2,4                    ;CDO=2**4*CDO
DSLA     R4,4
DSLA     R6,4
MOV      R8,R2                   ;(R8,R9,R10)=2**4*CDO MSW
MOV      R9,R4
MOV      R10,R6
LA       R14,CDV(R)              ;R14=CDV ADR

LI       R11,R14
LI       R12,R14
DSLA     R11,8                   ;R11=CDVX*2**8
LI       R12,R14
LI       R13,R14
DSLA     R12,8                   ;R12=CDVY*2**8
LI       R13,R14
L        R14,R14
DSLA     R13,8                   ;R13=CDVZ*2**8
LA       R14,CDV(R)              ;R14=CDV ADR

MUL      R6,R12                  ;(R6,R7)=CDO(3)*CDV(2)
MOV      R0,R9
MUL      R0,R13
DSUB     R6,R0                   ;(R6,R7)=CDO(3)*CDV(2)-CDO(2)*CDV(3)
MUL      R2,R13                  ;(R2,R3)=CDO(1)*CDV(3)
MOV      R0,R10
MUL      R0,R11
DSUB     R2,R0                   ;(R2,R3)=CDO(1)*CDV(3)-CDO(3)*CDV(1)
MUL      R4,R11                  ;(R4,R5)=CDO(2)*CDV(1)
MOV      R0,R8
MUL      R0,R12
DSUB     R4,R0                   ;(R4,R5)=CDO(2)*CDV(1)-CDO(1)*CDV(2)
SEXE     R1,R2                   ;RESCALE TO HALF THE CROSS PRODUCT (1=2**30)
DSLZ     R2,5
SEXE     R3,R4
DSLZ     R4,5
```

```
        SEXE    R5,R6
        DSLZ    R6,5
        LI      R10,R14         ;UPDATE CDV
        L       R11,R14
        ADDL    R14,-2
        DADD    R10,R5
        SI      R10,R14
        SI      R11,R14
        LI      R10,R14
        L       R11,R14
        ADDL    R14,-2
        DADD    R10,R1
        SI      R10,R14
        SI      R11,R14
        LI      R10,R14
        L       R11,R14
        ADDL    R14,-2
        DADD    R10,R3
        SI      R10,R14
        S       R11,R14
;
;ZERO RAW DATA ACCUMULATORS
;
        MOVL    R0,0
        LA      R14,RAWDV(R)
        MOVL    R1,12
COMP3   SI      R0,R14
        BGT     R1,COMP3
        JRTS                    ;RETURN
        EJEC
;RDSTRP - READS LITTON STRAPDOWN INPUTS
;CALLING SEQUENCE:
;       JSUB RDSTRP(R)
RDSTRP  LA      R14,RAWDO(R)    ;R14=ADR RAW ANGLE RATES
        LM      R13,STROX(A)    ;READ ANGLE RATE
        SI      R13,R14
        LM      R13,STROY(A)
        SI      R13,R14
        LM      R13,STROZ(A)
        SI      R13,R14
        LA      R14,RAWDV(R)    ;READ DELTA VELOCITIES
        LM      R13,STRVX(A)
        SI      R13,R14
        LM      R13,STRVY(A)
        SI      R13,R14
        LM      R13,STRVZ(A)
        NEG     R13,R13         ;CORRECTION FOR SIGN INVERSION
        SI      R13,R14
        MOVL    R1,2            ;INCREMENT SERVICE COUNT
        ADRM    R1,SSRVCT(R)
        JRTS                    ;RETURN
        EJEC
```

```
;COMP - SCALES LITTON INPUTS
;CALLING SEQUENCE:
;        JSUB    COMP(R)
COMP     LA      R14,CDO(R)        ;R14=ADR COMPENSATED ANGLE

LA      R13,RAWDO(R)      ;R13=ADR RAW ANGLE RATE

MOVL    R12,3             ;R12 COUNTS 3 COMPONENTS
         LA      R11,PCDO(R)       ;R11=ADR PREVIOUS COMP ANGLES

COMP1    LI      R0,R13            ;(R0,R1)=RAW ANGLE RATE
         MOVL    R1,0
         DSRA    R0,5              ;(R0,R1)=
                                   (ANGLE/2**13)*2**(-6)*2**30
         L       R2,R14            ;(R2,R3)=PREVIOUS ANGLE
         SI      R0,R14            ;UPDATE ANGLE
         L       R3,R14
         SI      R1,R14
         SI      R2,R11            ;UPDATE PREVIOUS ANGLE
         SI      R3,R11
         BCT     R12,COMP1
         LA      R14,CDV(R)        ;R14=ADR COMPENSATED DELTA VELOCITY

LA      R13,RAWDV(R)      ;R13=ADR RAW DELTA VELOCITY

MOVL    R12,3             ;R12 COUNTS 3 COMPONENTS
         LM      R3,'4FE7'(I)      ;R3=SCALE FACTOR

COMP2    LI      R0,R13
         MUL     R0,R3
         DSRA    R0,7
         SI      R0,R14
         SI      R1,R14
         BCT     R12,COMP2
         JRTS
         EJEC
;ATTUDE - ROTATES QUATERNION VECTOR, COMPUTES RESULTANT
;         DIRECTION COSINE MATRIX & PERIODICALLY NORMALIZES
;         QUATERNIONS
;CALLING SEQUENCE:
;        JSUB    ATTUDE(R)
ATTUDE   LM      R0,SSRVCT(R)      ;R0=AND('F,SERVICE COUNT)

ANDL    R0,'1F
         CMPL    R0,4              ;TIME TO NORMALIZE QUATERNIONS?
         BNE     *+6               ;NO
         JSUB    ENRM(R)           ;YES

JSUB    ROTATE(R)         ;COMPUTE ROTATION MATRIX

JSUB    ERQT(R)           ;ROTATE QUATERNIONS

JSUB    SRDCM(R)          ;COMPUTE DIRECTION COSINE
                                   (STRAP TO REF)
         JRTS                      ;RETURN
         EJEC
```

```
;DVXFM - XFORMS COMPENSATED DELTA VELOCITY INTO
;       REFERENCE FRAME VELOCITY
;CALLING SEQUENCE:
;       JSUB    DVXFM(R)
DVXFM   LA      R14,STORMT(R)   ;R14=ADR OF STRAPDOWN TO REF DCM

LA      R13,CDV(R)      ;R13=ADR COMPENSATED VELOCITY
                                  VECTOR

LA      R12,DAEVEL(R)   ;R12=ADR REFERENCE DELTA VELOCITY
                                  VECTOR

MOVL    R11,3           ;R11 COUNTS 3 VECTOR COMPONENTS
DVXFM1  LI      R2,R12          ;(R2,R3)=DELTA VELOCITY COMPONENT
        LI      R3,R12
        JSUB    ROWVC3(R)       ;(R0,R1)=
                                  SUM(STORMT(I,K)*CDV(K),K=1,3)
        ADDL    R12,-4
        DADD    R2,R0           ;(R2,R3)=UPDATED DELTA VELOCITY
        SI      R2,R12          ;UPDATE DELTA VELOCITY
        SI      R3,R12
        BCT     R11,DVXFM1
        JRTS                    ;RETURN
        EJEC

;ENRM - NORMALIZES QUATERNIONS (E1,E2,E3,E4)
;CALLING SEQUENCE:
;       JSUB    ENRM(R)
ENRM    LA      R13,E1(R)       ;R13=E1 ADR

MOV     R14,R13         ;R14=E1 ADR
        JSUB    DZML30(R)       ;(R0,R1)=E1**2

ADDL    R13,4
        ADDL    R14,4
        JSUB    DMUL30(R)       ;(R0,R1)=E1**2+E2**2

ADDL    R13,4
        ADDL    R14,4
        JSUB    DMUL30(R)       ;(R2,R3)=E1**2+E2**2+E3**2

ADDL    R13,4
        ADDL    R14,4
        JSUB    DMUL30(R)       ;(R0,R1)=E1**2+E2**2+E3**2+E4**2

DSRA    R0,1            ;(R0,R1)=(R0,R1)/2
        LM      R4,'6000(I)     ;(R4,R5)=K=1.5-(R0,R1)

MOVL    R5,0
        DSUB    R4,R0
        LA      R14,ENRMK(R)    ;R14=K ADR

SI      R4,R14
        S       R5,R14
        ADDL    R14,-2
        ADDL    R13,-3*4        ;R13=E1 ADR
        JSUB    DZML30(R)       ;(R0,R1)=K*E1

SI      R0,R13          ;UPDATE E1
        SI      R1,R13
        JSUB    DZML30(R)       ;(R0,R1)=K*E2
```

```
          SI      R0,R13              !UPDATE E2
          SI      R1,R13
          JSUB    DZML30(R)           !(R0,R1)=K*E3

SI      R0,R13              !UPDATE E3
          SI      R1,R13
          JSUB    DZML30(R)           !(R0,R1)=K*E4

SI      R0,R13              !UPDATE E4
          SI      R1,R13
          JRTS
ENRMK     DATA    0,0                 !NORMALIZATION SCALE FACTOR

EJEC
!ROTATE - SETS UP QUATERNION ROTATION MATRIX
!CALLING SEQUENCE!
!         JSUB    ROTATE(R)
ROTATE    LA      R14,CDO(R)          !R14=ADR COMPENSATED ANGLE VECTOR

LM      R2,'4000(I)         !(R2,R3)=ROT(1,1)=1

MOVL    R3,0
          MOVL    R4,0                !(R4,R5)=ROT(1,2)
          MOVL    R5,0
          MOVL    R6,0                !(R6,R7)=ROT(1,3)
          MOVL    R7,0
          MOVL    R8,0                !(R8,R9)=ROT(1,4)
          MOVL    R9,0
          LI      R0,R14
          LI      R1,14
          DSRA    R0,1
          DSUB    R4,R0               !(R4,R5)=-CDOX/2=W2X
          LI      R0,R14
          LI      R1,R14
          DSRA    R0,1
          DSUB    R6,R0               !(R6,R7)=-CDOY/2=W2Y
          LI      R0,R14
          LI      R1,R14
          DSRA    R0,1
          DSUB    R8,R0               !(R8,R9)=-CDOZ/2=W2Z
          ADDL    R14,-12             !R14=ADR COMP ANGLE VECTOR
          MOV     R13,R14
          JSUB    DZML30(R)           !(R0,R1)=-4*W2**2

ADDL    R14,4
          ADDL    R13,4
          JSUB    DMUL30(R)

ADDL    R14,4
          ADDL    R13,4
          JSUB    DMUL30(R)

LA      R14,OSQ(R)          !R14=ADR OSQ=-4*W2**2

SI      R0,R14
          S       R1,R14
          ADDL    R14,-2
          DSRA    R0,3
          DSUB    R2,R0               !(R2,R3)=1,-W2**2/2
          LA      R13,SIXTH(R)        !R13=ADR SIXTH

JSUB    DZML30(R)
```

```
            SI      R0,R14              ;OSQ=OSQ/6
            S       R1,R14
            ADDL    R14,-2
            LA      R13,CD0(R)          ;R13=ADR -2*W2 VECTOR (CD0)
            JSUB    DZML30(R)

DSRA    R0,3
            DADD    R4,R0               ;(R4,R5)=(R4,R5)*W2**3/6
            ADDL    R13,4
            JSUB    DZML30(R)

DSRA    R0,3
            DADD    R6,R0               ;(R6,R7)=(R6,R7)*W2**3/6
            ADDL    R13,4
            JSUB    DZML30(R)

DSRA    R0,3
            DADD    R8,R0               ;(R8,R9)=(R8,R9)*W2**3/6
            LA      R14,ROTMT(R)        ;SAVE ROTATION MATRIX

SI      R2,R14
            SI      R3,R14
            SI      R4,R14
            SI      R5,R14
            SI      R6,R14
            SI      R7,R14
            SI      R8,R14
            SI      R9,R14
            JRTS                        ;RETURN
W1SQM       DATA    0,0                 ;=4*W1**2

OSQ         DATA    0,0

SIXTH       DATA    'AAA,'AAAB          ;2**30/6

EJEC
;EROT = ROTATES QUATERNIONS (E1,E2,E3,E4)
;CALLING SEQUENCE:
;           JSUB    EROT(R)
EROT        LA      R14,ROTMT(R)        ;R14=ADR ROT(1,1)

LA      R13,EVEC(R)         ;R13=ADR E VECTOR

JSUB    DZML30(R)

MOV     R2,R0               ;(R2,R3)=E1'=ROT(1,1)*E1
            MOV     R3,R1
            ADDL    R13,4
            JSUB    DZML30(R)

MOV     R4,R0               ;(R4,R5)=E2'=ROT(1,1)*E2
            MOV     R5,R1
            ADDL    R13,4
            JSUB    DZML30(R)

MOV     R6,R0               ;(R6,R7)=E3'=ROT(1,1)*E3
            MOV     R7,R1
            ADDL    R13,4
            JSUB    DZML30(R)

MOV     R8,R0               ;(R8,R9)=E4'=ROT(1,1)*E4
```

```
        MOV     R9,R1
        ADDL    R14,4           ;R14=ADR ROT(1,2)
        ADDL    R13,-8          ;R13=ADR E2
        JSUB    DZML30(R)

DADD    R2,R0           ;(R2,R3)=(R2,R3)+ROT(1,2)*E2
        ADDL    R13,-4          ;R13=ADR E1
        JSUB    DZML30(R)

DSUB    R4,R0           ;(R4,R5)=(R4,R5)-ROT(1,2)*E1
        ADDL    R13,12          ;R13=ADR E4
        JSUB    DZML30(R)

DSUB    R6,R0           ;(R6,R7)=(R6,R7)-ROT(1,2)*E4
        ADDL    R13,-4          ;R13=ADR E3
        JSUB    DZML30(R)

DADD    R8,R0           ;(R8,R9)=(R8,R9)+ROT(1,2)*E3
        ADDL    R14,4           ;R14=ADR ROT(1,3)
        JSUB    DZML30(R)

DADD    R2,R0           ;(R2,R3)=(R2,R3)+ROT(1,3)*E3
        ADDL    R13,4           ;R13=ADR E4
        JSUB    DZML30(R)

DADD    R4,R0           ;(R4,R5)=(R4,R5)+ROT(1,3)*E4
        ADDL    R13,-12         ;R13=ADR E1
        JSUB    DZML30(R)
        DSUB    R6,R0           ;(R6,R7)=(R6,R7)-ROT(1,3)*E1
        ADDL    R13,4           ;R13=ADR E2
        JSUB    DZML30(R)

DSUB    R8,R0           ;(R8,R9)=(R8,R9)-ROT(1,3)*E2
        ADDL    R14,4           ;R14=ADR ROT(1,4)
        ADDL    R13,8           ;R13=ADR E4
        JSUB    DZML30(R)

DADD    R2,R0           ;(R2,R3)=(R2,R3)+ROT(1,4)*E4
        ADDL    R13,-4          ;R13=ADR E3
        JSUB    DZML30(R)

DSUB    R4,R0           ;(R4,R5)=(R4,R5)-ROT(1,4)*E3
        ADDL    R13,-4          ;R13=ADR E2
        JSUB    DZML30(R)

DADD    R6,R0           ;(R6,R7)=(R6,R7)+ROT(1,4)*E2
        ADDL    R13,-4          ;R13=ADR E1
        JSUB    DZML30(R)

DSUB    R8,R0           ;(R8,R9)=(R8,R9)-ROT(1,4)*E1
        SI      R2,R13          ;UPDATE E1
        SI      R3,R13
        SI      R4,R13          ;UPDATE E2
        SI      R5,R13
        SI      R6,R13          ;UPDATE E3
        SI      R7,R13
        SI      R8,R13          ;UPDATE E4
        SI      R9,R13
        JRTS                    ;RETURN
        EJEC
```

```
!SRDCM - DERIVES DIRECTION COSINE MATRIX (STRAPDOWN TO REFERENCE)
!        FROM QUATERNIONS (E1,E2,E3,E4)
!CALLING SEQUENCE!
!          JSUB     DIRCOS(R)
SRDCM      LA       R13,E1(R)              !(R2,R3)=E1**2

MOV      R14,R13
           JSUB     DZML30(R)

MOV      R2,R0
           MOV      R3,R1
           ADDL     R13,4                  !(R4,R5)=E2**2
           ADDL     R14,4
           JSUB     DZML30(R)

MOV      R4,R0
           MOV      R5,R1
           ADDL     R13,4                  !(R6,R7)=E3**2
           ADDL     R14,4
           JSUB     DZML30(R)

MOV      R6,R0
           MOV      R7,R1
           ADDL     R13,4                  !(R0,R1)=E4**2
           ADDL     R14,4
           JSUB     DZML30(R)

MOV      R8,R2                  !(R8,R9)=STOR11=E1**2
           MOV      R9,R3                  !  +E2**2-E3**2-E4**2
           DADD     R8,R4
           DSUB     R8,R6
           DSUB     R8,R0
           SM       R8,STOR11(R)

SM       R9,STOR11+2(R)

MOV      R8,R2                  !(R8,R9)=STOR22=E1**2
           MOV      R9,R3                  !  -E2**2+E3**2-E4**2
           DSUB     R8,R4
           DADD     R8,R6
           DSUB     R8,R0
           SM       R8,STOR22(R)

SM       R9,STOR22+2(R)

DSUB     R2,R4                  !(R2,R3)=STOR33=E1**2
           DSUB     R2,R6                  !  -E2**2-E3**2+E4**2
           DADD     R2,R0
           SM       R2,STOR33(R)

SM       R3,STOR33+2(R)

LA       R13,E1(R)              !(R2,R3)=E1*E2
           LA       R14,E2(R)

JSUB     DZML30(R)

MOV      R2,R0
           MOV      R3,R1
           ADDL     R13,8                  !(R0,R1)=2*E3*E4
           ADDL     R14,8
           JSUB     DZML30(R)
```

```
DADD    R0,R0
DADD    R2,R2           ;(R2,R3)=2*E1*E2
MOV     R4,R0           ;(R4,R5)=2*E3*E4=(R0,R1)
MOV     R5,R1
DADD    R0,R2           ;(R0,R1)=STOR32=2*(E1*E2+E3*E4)
DSUB    R4,R2           ;(R4,R5)=STOR23=2*(E3*E4-E1*E2)
SM      R0,STOR32(R)

SM      R1,STOR32+2(R)

SM      R4,STOR23(R)

SM      R5,STOR23+2(R)

ADDL    R13,-4          ;(R2,R3)=E2*E4
JSUB    DZML30(R)

MOV     R2,R0
MOV     R3,R1
ADDL    R13,-4          ;(R0,R1)=E1*E3
ADDL    R14,-4
JSUB    DZML30(R)

DADD    R2,R2           ;(R2,R3)=2*E2*E4
DADD    R0,R0           ;(R0,R1)=2*E1*E3
MOV     R4,R2           ;(R4,R5)=2*E2*E4=(R2,R3)
MOV     R5,R3
DSUB    R2,R0           ;(R2,R3)=STOR31=2*(E2*E4-E1*E3)
DADD    R4,R0           ;(R4,R5)=STOR13=2*(E2*E4+E1*E3)
SM      R2,STOR31(R)

SM      R3,STOR31+2(R)

SM      R4,STOR13(R)

SM      R5,STOR13+2(R)

ADDL    R14,4           ;(R2,R3)=E1*E4
JSUB    DZML30(R)

MOV     R2,R0
MOV     R3,R1
ADDL    R13,4           ;(R0,R1)=2*E2*E3
ADDL    R14,-4
JSUB    DZML30(R)

DADD    R0,R0
DADD    R2,R2           ;(R2,R3)=2*E1*E4
MOV     R4,R0           ;(R4,R5)=2*E2*E3=(R0,R1)
MOV     R5,R1
DADD    R0,R2           ;(R0,R1)=STOR21=2*(E2*E3+E1*E4)
DSUB    R4,R2           ;(R4,R5)=STOR12=2*(E2*E3-E1*E4)
SM      R0,STOR21(R)

SM      R1,STOR21+2(R)

SM      R4,STOR12(R)

SM      R5,STOR12+2(R)

JRTS                    ;RETURN
EJEC
```

```
;LSQALI - BACKGROUND ROUTINE TO LSQFIT GRAVITY VECTOR AS
;          A FUNCTION OF TIME & TO ALIGN STRAPDOWN FRAME
;          TO EARTH'S SPIN AXIS FROM THE DERIVED VELOCITY VECTOR
;CALLING SEQUENCE:
;         JSUB    LSQALI(R)
LSQALI    MOVL    R9,3             ;R9 COUNTS 3 VECTOR COMPONENTS
          LA      R10,SDVT(R)      ;R10=ADR SUM(VEL*T)

LA      R11,G256(R)      ;R11=ADR 256 SEC GRAVITY VECTOR

LA      R12,G0(R)        ;R12=ADR 0 SEC GRAVITY VECTOR

LA      R14,SDV(R)       ;R14=ADR SUM(VEL)

LSQA1     LI      R0,R10           ;(R0,R1)=SDVT(I)
          LI      R1,R10
          LA      R13,LSQK1(R)     ;R13=ADR (4*N+2)/(8*(N-1))

JSUB    DMUL30(R)        ;(R0,R1)=
                                   ; SDV(I)*(4*N+2)/(8*(N-1))=SDVT(I)

DSLA    R0,3             ;(R0,R1)=G0(I)=A(I)
          SI      R0,R12
          SI      R1,R12
          LI      R2,R14           ;(R2,R3)=SDV(I)
          LI      R3,R14
          DSUB    R2,R0            ;(R2,R3)=SDV(I)-G0(I)
          SI      R2,R11
          S       R3,R11
          ADDL    R11,-2
          MOV     R2,R0            ;(R2,R3)=G0(I)
          MOV     R3,R1
          LA      R14,LSQK2(R)     ;R14=ADR 256*2/(N+1)

MOV     R13,R11
          JSUB    DZML30(R)        ;(R0,R1)=256*B(I)

DADD    R0,R2            ;(R0,R1)=G256(I)=A(I)+256*B(I)
          SI      R0,R11
          SI      R1,R11
          LA      R14,SDV-SDVT(R10) ;R14=ADR NEXT SDV

BCT     R9,LSQA1
          LA      R14,G0(R)        ;NORMALIZE G0 VECTOR

JSUB    V3NRM(R)

LA      R14,G256(R)      ;NORMALIZE G256 VECTOR

JSUB    V3NRM(R)

LA      R0,-14,20(I)     ;USE DOT PRODUCT TO OBTAIN
                                   ; COS(LAT)**2
          MOVL    R1,0             ;(R0,R1)=-1
          LA      R13,G0(R)        ;R13=ADR G0 VECTOR

MOVL    R12,3            ;R12 COUNTS 3 VECTOR COMPONENTS
          JSUB    DMUL30(R)        ;(R0,R1)=SUM(G0(I)*G256(I))-1
```

```
ADDL    R14,4
ADDL    R13,4
BCT     R12,**8
LA      R13,COSPH2(R)        ;R13=ADR COSPH2

SI      R0,R13
S       R1,R13
ADDL    R13,-2
LA      R14,LSQK3(R)         ;R14=ADR COS(WE*N)**1

JSUB    DDIV30(R)            ;(R0,R1)=COS(PHI)**2

LM      R6,'4000(I)          ;(R6,R7)=SIN(PHI)**2=1-COS(PHI)**2

MOVL    R7,0
DSUB    R6,R0
MOVL    R2,0                 ;ESTIMATE=0
JSUB    DSQRT(R)             ;(R2,R3)=COS(PHI)

SI      R0,R13
SI      R1,R13
SI      R2,R13
SI      R3,R13
SI      R6,R13               ;SAVE SIN(PHI)**2
S       R7,R13
ADDL    R13,-2               ;R13=ADR SIN(PHI)**2
ADDL    R14,LSQKPH-LSQK3     ;R14=ADR (1-K)**2=(1-RE*WE*WE/G)**2
MOV     R4,R0                ;(R4,R5)=COS(PHI)**2
MOV     R5,R1
JSUB    DZML30(R)            ;(R0,R1)=(1-K)**2*SIN(PHI)**2

DADD    R0,R4
MOV     R2,R0
MOV     R3,R1
PUSH    R2,6
JSUB    DDIV(R)

POP     R7,6
MOV     R4,R0                ;(R4,R5)=COS(LAT)**2
MOV     R5,R1
ADDL    R13,SINPHI-SINPH2    ;R13=ADR SIN(PHI)
MOV     R0,R6
MOV     R1,R7
MOVL    R2,0                 ;ESTIMATE=0
JSUB    DSQRT(R)             ;(R2,R3)=SIN(PHI)

SI      R2,R13
SI      R3,R13
SI      R4,R13               ;UPDATE COS(LAT)**2
SI      R5,R13
MOV     R0,R4
MOV     R1,R5
MOVL    R2,0                 ;ESTIMATE=0
JSUB    DSQRT(R)             ;(R2,R3)=COS(LAT)

SI      R2,R13
SI      R3,R13
LM      R0,'4000(I)

MOVL    R1,0
DSUB    R0,R4                ;(R0,R1)=SIN(LAT)**2
SI      R0,R13
```

```
SI      R1,R13
MOVL    R2,0
JSUB    DSQRT(R)            ;(R2,R3)=SIN(LAT)

SI      R2,R13
SI      R3,R13
JSUB    STEP1(R)            ;BALANCE Z GRAVITY COMPONENTS

JSUB    STEP2(R)            ;BALANCE X GRAVITY COMPONENTS

JSUB    STEP3(R)            ;Z GRAVITY COMPONENTS=SIN(PHI)

JSUB    INIROT(R)           ;SETUP CURRENT QUATERNIONS

JSUB    INIPOS(R)           ;INITIALIZE POSITION

LA      R13,GEST(R)         ;R13=ADR GRAVITY ESTIMATE

LI      R0,R13              ;(R0,R1)=2**14*G**2
L       R1,R13
ADDL    R13,G7MAG-GEST-2    ;R13=ADR G7MAG
MOVL    R2,0                ;ESTIMATE=0
JSUB    DSQRT(R)            ;(R2,R3)=2**7*GRAVITY

SI      R2,R13
S       R3,R13
ADDL    R13,GINT-G7MAG-2    ;R13=ADR GINT
DSRA    R2,7                ;(R2,R3)=GRAVITY
SI      R2,R13              ;INIT GRAVITY INTEGRATOR
S       R3,R13
ADDL    R13,VGINT-GINT-2    ;R13=ADR VGINT
SI      R2,R13              ;INIT VERTICAL GRAVITY INTEGRATOR
SI      R3,R13
LA      R14,COSLT2(R)       ;R14=ADR COS(LAT)**2

LA      R13,COSLAT(R)       ;R13=ADR COS(LAT)

JSUB    DZML30(R)           ;(R0,R1)=VERT CENTRIPEDAL FORCE

LA      R13,CNTFR(R)        ; =COS(LAT)**3*WE**2*RE
SI      R0,R13
S       R1,R13
ADDL    R13,-2              ;R13=ADR CNTFR
ADDL    R14,WE2RE-COSLT2    ;R14=ADR WE2RE
JSUB    DZML30(R)

DADD    R2,R0               ;(R2,R3)=GMAG=GINT+CNTFR
DSLA    R0,6                ;ADJUST FOR INTEGRATOR SCALE
SI      R0,R13              ;UPDATE CENTRIPEDAL FORCE
SI      R1,R13
SI      R2,R13              ;UPDATE GMAG
S       R3,R13
ADDL    R13,-2              ;R13=ADR GMAG
LA      R14,COSLAT(R)       ;R14=ADR COS(LAT)

LA      R12,GREF(R)         ;R12=ADR GREF VECTOR

JSUB    DZML30(R)           ;(R0,R1)=GREF(1)

DSRA    R0,3
SI      R0,R12              ;UPDATE GREF(1)
SI      R1,R12
```

```
         MOVL    R0,0
         SI      R0,R12              ;UPDATE GREF(2)
         SI      R0,R12
         ADDL    R14,SINLAT-COSLAT   ;R14=ADR SIN(LAT)
         JSUB    DZML30(R)           ;(R0,R1)=GREF(3)

DSRA    R0,3
         SI      R0,R12              ;UPDATE GREF(3)
         S       R1,R12
         LM      R2,'4000(I)

LA      R14,COSWT(R)

MOVL    R0,0
         SI      R2,R14              ;COSWT=1
         SI      R0,R14
         SI      R0,R14              ;SINWT=0
         SI      R0,R14
         JSUB    SCNINI(R)           ;INIT SCNARIO DATA

JRTS                        ;RETURN
LSQK1    DATA    '2030,'3030         ;(4*N*2)/(8*(N-1))

LSQK2    DATA    '7F80,'7F80         ;2*N/(N+1)

LSQK3    DATA    'FFFD,'2531         ;COS(WE*N)=1

LSQKPH   DATA    '3F8E,'0E8A         ;(1-RE*WE*WE/G)**2

EJEC
;STEP1 = ROTATION ABOUT X-AXIS SUCH THAT G0!(3)=G256!(3) ,GE.0
;CALLING SEQUENCE:
;        JSUB    STEP1(R)
STEP1    LA      R10,XCOS(R)         ;R10=ADR XCOS

LM      R4,'4000(I)         ;(R4,R5)=XCOS=1

MOVL    R5,0
         MOVL    R6,0                ;(R6,R7)=XSIN=0
         MOVL    R7,0
         LA      R14,G3DIFF(R)       ;R14=ADR G3DIFF

LA      R11,G0Z(R)          ;R11=ADR G0(3)

LA      R12,G256Z(R)        ;R12=ADR G256(3)

LI      R2,R11              ;(R2,R3)=G0(3)
         L       R3,R11
         ADDL    R11,-6              ;R11=ADR G0(2)
         LI      R0,R12              ;(R0,R1)=G256(3)
         L       R1,R12
         ADDL    R12,-6              ;R12=ADR G256(2)
         DSUB    R2,R0               ;(R2,R3)=G0(3)-G256(3)
         BZ      STEP1B
         SI      R2,R14              ;G3DIFF=G0(3)-G256(3)
         S       R3,R14
         ADDL    R14,-6              ;R14=ADR G2DIFF
         LI      R2,R11              ;(R2,R3)=G0(2)
         L       R3,R11
         ADDL    R11,-2              ;R11=ADR G0(2)
         LI      R0,R12              ;(R0,R1)=G256(2)
```

```
            L       R1,R12
            ADDL    R12,-2
            DSUB    R2,R0                  ;(R2,R3)=G0(2)=G256(2)
            SI      R2,R14                 ;G2DIFF=G0(2)-G256(2)
            S       R3,R14
            ADDL    R14,-2                 ;R14=ADR G2DIFF
            MOV     R13,R14                ;R13=ADR G2DIFF
            JSUB    DZML30(R)              ;(R0,R1)=G2DIFF**2+G3DIFF**2

ADDL    R13,4
            ADDL    R14,4
            JSUB    DMUL30(R)

ADDL    R14,4                  ;R14=ADR GSQRT
            MOVL    R2,0                   ;ESTIMATE=0
            JSUB    DSQRT(R)               ;GSQRT=SQRT(G2DIFF**2+G3DIFF**2)

SI      R2,R14
            S       R3,R14
            ADDL    R14,-2
            ADDL    R13,-4                 ;R13=ADR G1DIFF
            JSUB    DDIV30(R)              ;(R0,R1)=G2DIFF/GSQRT

..      ..,R10
            MOV     R4,R0                  ;(R4,R5)=XCOS
            MOV     R5,R1
            ADDL    R13,4                  ;R13=ADR G3DIFF
            JSUB    DDIV30(R)              ;(R0,R1)=G3DIFF/GSQRT

SI      R0,R10                 ;=XSIN=G3DIFF/GSQRT
            S       R1,R10
            ADDL    R10,-6
            MOV     R6,R0                  ;(R6,R7)=-XSIN
            MOV     R7,R1
STEP1B      LA      R13,XSIN(R)            ;R13=ADR XSIN

LA      R14,G0'(R)             ;R14=ADR G0(2)

JSUB    DZML30(R)              ;(R0,R1)=G0(2)*XSIN

COM     R0,R0
            NEG     R1,R1
            BNZ     *+4
            ADDL    R0,1
            ADDL    R13,-4                 ;R13=ADR XCOS
            ADDL    R14,4                  ;R14=ADR G0(3)
            JSUB    DMUL30(R)              ;(R0,R1)=G0(2)*XSIN+G0(3)*XCOS

CMPL    R0,0                   ;G0'(3).GE.0?
            BP      STEP1D                 ;YES
            COM     R0,R0                  ;NO, NEGATE G0'(3)
            NEG     R1,R1
            BNZ     *+4
            ADDL    R0,1
            COM     R4,R4                  ;NEGATE COS
            NEG     R5,R5
            BNZ     *+4
            ADDL    R4,1
            COM     R6,R6                  ;NEGATE SIN
            NEG     R7,R7
            BNZ     *+4
            ADDL    R6,1
```

```
STEP1D   SI     R4,R10              ;UPDATE XCOS
         SI     R5,R10
         SI     R6,R10              ;UPDATE XSIN
         S      R7,R10
         MOV    R2,R0               ;(R2,R3)=G0'(3)=G256'(3)
         MOV    R3,R1
         ADDL   R14,-4              ;R14=ADR G0(2)
         JSUB   DZML30(R)           ;(R0,R1)=G0(2)*XCOS

ADDL   R13,4               ;R13=ADR XSIN
         ADDL   R14,4               ;R14=ADR G0(3)
         JSUB   DMUL30(R)           ;(R0,R1)=G0(2)*XCOS-G0(3)*XSIN
         SI     R2,R11              ;UPDATE G0(2)
         SI     R1,R11
         SI     R2,R11              ;UPDATE G0(3)
         SI     R3,R11
         ADDL   R13,-4              ;R13=ADR XCOS
         MOV    R14,R12             ;R14=ADR G256(2)
         JSUB   DZML30(R)           ;(R0,R1)=G256(2)*XCOS

ADDL   R13,4               ;R13=ADR XSIN
         ADDL   R14,4               ;R14=ADR G256(3)
         JSUB   DMUL30(R)           ;(R0,R1)=G256(2)*XCOS-G256(3)*XSIN

SI     R0,R12              ;UPDATE G256(2)
         SI     R1,R12
         SI     R2,R12              ;UPDATE G256(3)
         S      R3,R12
         LM     R0,'2000(I)         ;(R0,R1)=(1+COS)/2

MOVL   R1,0
         DSRA   R4,1                ;(R4,R5)=COS/2
         DADD   R0,R4
         MOVL   R2,0                ;ESTIMATE=0
         LA     R14,XE1(R)          ;R14=ADR XE1

JSUB   DSQRT(R)

SI     R2,R14              ;XE1=SQRT((1+COS)/2)
         SI     R3,R14
         LM     R0,'2000(I)         ;(R0,R1)=(1-COS)/2

MOVL   R1,0
         DSUB   R0,R4
         MOVL   R2,0                ;ESTIMATE=0
         JSUB   DSQRT(R)

CMPL   R6,0                ;*SIN,LE,0 ?
         BLE    STEP1F              ;YES
         COM    R2,R2               ;NO, XE2=-XE2
         NEG    R3,R3
         BNZ    *+4
         ADDL   R2,1
STEP1F   SI     R2,R14              ;XE2=SQRT((1-COS)/2)
         S      R3,R14
         JRTS                       ;RETURN
         EJEC
```

```
;STEP2 = ROTATION ABOUT Z-AXIS SUCH THAT G0'(1)=G256(1)
;         & G0'(2).LT.0
;CALLING SEQUENCE:
;      JSUB  STEP2(R)
STEP2  LA    R10,ZCOS(R)      ;R10=ADR ZCOS
       LM    R4,=4000(1)      ;(R4,R5)=ZCOS=1
       MOVL  R5,0
       MOVL  R6,0             ;(R6,R7)=ZSIN=0
       MOVL  R7,0
       LA    R14,G1DIFF(R)    ;R14=ADR G1DIFF
       LA    R11,G0X(R)       ;R11=ADR G0(1)
       LA    R12,G256X(R)     ;R12=ADR G256(1)
       LI    R2,R11           ;(R2,R3)=G0(1)
       LI    R3,R11
       LI    R0,R12           ;(R0,R1)=G256(1)
       LI    R1,R12
       DSUB  R2,R0            ;(R2,R3)=G0(1)-G256(1)
       BZ    STEP2B
       SI    R2,R14           ;G1DIFF=G0(1)-G256(1)
       SI    R3,R14
       LI    R2,R11           ;(R2,R3)=G0(2)
       L     R3,R11
       ADDL  R11,=6           ;R11=ADR G0(1)
       LI    R0,R12           ;(R0,R1)=G256(2)
       L     R1,R12
       ADDL  R12,=6           ;R12=ADR G256(1)
       DSUB  R2,R0            ;(R2,R3)=G0(2)-G256(2)
       SI    R2,R14
       S     R3,R14
       ADDL  R14,=6           ;R14=ADR G1DIFF
       MOV   R13,R14          ;R13=ADR G1DIFF
       JSUB  DZML30(R)        ;(R0,R1)=G1DIFF**2+G2DIFF**2
       ADDL  R13,4
       ADDL  R14,4
       JSUB  DMUL30(R)
       ADDL  R14,8            ;R14=ADR GSQRT
       MOVL  R2,0             ;ESTIMATE=0
       JSUB  DSQRT(R)         ;GSQRT=SQRT(G1DIFF**2+G2DIFF**2)
       SI    R2,R14
       S     R3,R14
       ADDL  R14,=2
       JSUB  DDIV30(R)        ;(R0,R1)=G2DIFF/GSQRT
       SI    R0,R10           ;ZCOS=G2DIFF/GSQRT
       SI    R1,R10
       MOV   R4,R0            ;(R4,R5)=ZCOS
       MOV   R5,R1
       ADDL  R13,=4           ;R13=ADR G1DIFF
       JSUB  DDIV30(R)        ;(R0,R1)=G1DIFF/GSQRT
       SI    R0,R10           ;ZSIN=G1DIFF/GSQRT
       S     R1,R10
```

|        | ADDL  | R10,-6           |                                  |
|--------|-------|------------------|----------------------------------|
|        | MOV   | R6,R0            | ;(R6,R7)=ZSIN                    |
|        | MOV   | R7,R1            |                                  |
| STEP2B | LA    | R13,ZSIN(R)      | ;R13=ADR ZSIN                    |
|        | LA    | R14,G0X(R)       | ;R14=ADR G0(1)                   |
|        | JSUB  | DZML30(R)        | ;(R0,R1)=G0(1)*ZSIN              |
|        | ADDL  | R13,ZCOS-ZSIN    | ;R13=ADR ZCOS                    |
|        | ADDL  | R14,G0Y-G0X      | ;R14=ADR G0(2)                   |
|        | JSUB  | DMUL30(R)        | ;(R0,R1)=G0(1)*ZSIN+G0(2)*ZCOS   |
|        | CMPL  | R0,0             | ;G0'(2),LT,0?                    |
|        | BM    | STEP2D           | ;YES                             |
|        | COM   | R0,R0            | ;NO, G0'(2)=-G0'(2)              |
|        | NEG   | R1,R1            |                                  |
|        | BNZ   | *+4              |                                  |
|        | ADDL  | R0,1             |                                  |
|        | COM   | R4,R4            | ;NEGATE COS                      |
|        | NEG   | R5,R5            |                                  |
|        | BNZ   | *+4              |                                  |
|        | ADDL  | R4,1             |                                  |
|        | COM   | R6,R6            | ;SIN=-SIN                        |
|        | NEG   | R7,R7            |                                  |
|        | BNZ   | *+4              |                                  |
|        | ADDL  | R6,1             |                                  |
| STEP2D | SI    | R4,R10           | ;UPDATE ZCOS                     |
|        | SI    | R5,R10           |                                  |
|        | SI    | R6,R10           | ;UPDATE ZSIN                     |
|        | S     | R7,R10           |                                  |
|        | MOV   | R2,R0            | ;(R2,R3)=G0'(2)                  |
|        | MOV   | R3,R1            |                                  |
|        | ADDL  | R13,ZSIN-ZCOS    | ;R13=ADR ZSIN                    |
|        | JSUB  | DZML30(R)        | ;(R0,R1)=-G0(2)*ZSIN             |
|        | COM   | R0,R0            |                                  |
|        | NEG   | R1,R1            |                                  |
|        | BNZ   | *+4              |                                  |
|        | ADDL  | R0,1             |                                  |
|        | ADDL  | R13,ZCOS-ZSIN    | ;R13=ADR ZCOS                    |
|        | ADDL  | R14,G0X-G0Y      | ;R14=ADR G0(1)                   |
|        | JSUB  | DMUL30(R)        | ;(R0,R1)=G0(1)*ZCOS-G0(2)*ZSIN   |
|        | SI    | R0,R11           | ;UPDATE G0(1)                    |
|        | SI    | R1,R11           |                                  |
|        | SI    | R2,R11           | ;UPDATE G0(2)                    |
|        | SI    | R3,R11           |                                  |
|        | LM    | R0,'2000(I)      | ;(R0,R1)=(1+COS)/2               |
|        | MOVL  | R1,0             |                                  |
|        | DSRA  | R4,1             | ;(R4,R5)=COS/2                   |
|        | DADD  | R0,R4            |                                  |
|        | MOVL  | R2,0             | ;ESTIMATE=0                      |
|        | LA    | R14,ZE1(R)       | ;R14=ADR ZE1                     |
|        | JSUB  | DSQRT(R)         |                                  |
|        | SI    | R2,R14           | ;ZE1=SQRT((1+COS)/2)             |
|        | SI    | R3,R14           |                                  |
|        | LM    | R0,'2000(I)      | ;(R0,R1)=(1-COS)/2               |

```
        MOVL    R1,0
        DSUB    R0,R4
        MOVL    R2,0                    ;ESTIMATE=0
        JSUB    DSQRT(R)

CMPL    R6,0                    ;SIN.GE.0 ?
        BP      STEP2F                  ;YES
        COM     R2,R2                   ;NO, ZE4=-ZE4
        NEG     R3,R3
        BNZ     *+4
        ADDL    R2,1
STEP2F  SI      R2,R14                  ;ZE4=SQRT((1-COS)/2)
        S       R3,R14
        JRYS                            ;RETURN
        EJEC
;STEP3 - ROTATION ABOUT Y-AXIS SUCH THAT G0'(3)=SIN(PHI)
;CALLING SEQUENCE:
;       JSUB STEP3(R)
STEP3   LA      R14,G0(R)               ;R14=ADR G0(1)

MOV     R13,R14                 ;R13=ADR G0(1)
        JSUB    DZML30(R)               ;(R0,R1)=G0(1)**2*G0(3)**2

ADDL    R14,8                   ;R14=ADR G0(3)
        ADDL    R13,8                   ;R13=ADR G0(3)
        JSUB    DMUL30(R)

LA      R12,YGSQ(R)             ;R12=ADR GSQ

SI      R0,R12                  ;GSQ=G0(1)**2*G0(3)**2
        S       R1,R12
        ADDL    R12,-2
        ADDL    R14,-4                  ;R14=ADR G0(2)
        ADDL    R13,-4                  ;R13=ADR G0(2)
        JSUB    DZML30(R)               ;(R0,R1)=-G0(2)**2

COM     R0,R0
        NEG     R1,R1
        BNZ     *+4
        ADDL    R0,1
        LA      R14,COSPH2(R)           ;R14=ADR COS(PHI)**2

LI      R2,R14                  ;(R2,R3)=COS(PHI)**2
        L       R3,R14
        ADDL    R14,RAD-COSPH2-2        ;R14=ADR RAD
        DADD    R0,R2
        MOVL    R2,0
        JSUB    DSQRT(R)

SI      R2,R14                  ;RAD=SQRT(COS(PHI)**2-G0(2)**2)
        S       R3,R14
        ADDL    R14,-2
        ADDL    R13,-4                  ;R13=ADR G0(1)
        JSUB    DZML30(R)

ADDL    R14,SINPHI-RAD          ;R14=ADR SIN(PHI)
        ADDL    R13,8                   ;R13=ADR G0(3)
        JSUB    DMUL30(R)               ;(R0,R1)=G0(3)*SIN(PHI)*G0(1)*RAD

LA      R13,YCOS(R)             ;R13=ADR YCOS
```

```
         SI      R0,R13              ;YCOS=(R0,R1)
         S       R1,R13
         ADDL    R13,-2
         MOV     R14,R12             ;R14=ADR GSQ
         JSUB    DDIV30(R)

MOV     R4,R0               ;(R4,R5)=YCOS
         MOV     R5,R1
         LA      R13,G02(R)          ;R13=ADR G0(3)

LA      R14,SINPHI(R)       ;R14=ADR SINPHI

JSUB    DZML30(R)           ;(R6,R7)=G0(3)*SINPHI

MOV     R6,R0
         MOV     R7,R1
         ADDL    R13,-8              ;R13=ADR G0(1)
         ADDL    R14,RAD-SINPHI      ;R14=ADR RAD
         JSUB    DZML30(R)

DSUB    R6,R0               ;(R6,R7)=G0(3)*SINPHI-G0(1)*RAD
         LM      R0,'2000(I)         ;(R0,R1)=(1+COS)/2

MOVL    R1,0
         DSRA    R4,1                ;(R4,R5)=COS/2
         DADD    R0,R4
         MOVL    R2,0                ;ESTIMATE=0
         LA      R12,YE1(R)          ;R12=ADR YE1

JSUB    DSQRT(R)

SI      R2,R12              ;YE1=SQRT((1+COS)/2)
         SI      R3,R12
         LM      R0,'2000(I)         ;(R0,R1)=(1-COS)/2

MOVL    R1,0
         DSUB    R0,R4
         MOVL    R2,0                ;ESTIMATE=0
         JSUB    DSQRT(R)

CMPL    R6,0                ;SIN.GE.0 ?
         BP      STEP3B              ;YES
         COM     R2,R2               ;NO,YE3=-YE3
         NEG     R3,R3
         BNZ     **4
         ADDL    R2,1
STEP3B   SI      R2,R12              ;YE3=SQRT((1-COS)/2)
         S       R3,R12
         JRTS                        ;RETURN
YGSQ     DATA    0,0                 ;G0(2)**2
```

;INIROT - SETS UP INITIAL QLATERNIONS FROM XE1,XE2,ZE1,ZE4,YE1,YE3
;CALLING SEQUENCE:
;        JSUB INIROT(R)

```
INIROT   LA      R10,XE1(R)          ;R10=ADR XE1

LI      R2,R10              ;(R2,R3)=E1=XE1
         LI      R3,R10
         LI      R4,R10              ;(R4,R5)=E2=XE2
         LI      R5,R10
         MOVL    R6,0                ;(R6,R7)=E3=0
         MOVL    R7,0
```

```
            MOVL     R8,0              ;(R8,R9)=E4=0
            MOVL     R9,0
            JSUB     INRSRV(R)         ;DO STEP1 ROTATION

LI       R2,R10            ;(R2,R3)=E1=ZE1
            LI       R3,R10
            MOVL     R4,0              ;(R4,R5)=E2=0
            MOVL     R5,0
            MOVL     R6,0              ;(R6,R7)=E3=0
            MOVL     R7,0
            LI       R8,R10            ;(R9,R10)=E4=ZE4
            LI       R9,R10
            JSUB     INRSRV(R)         ;DO STEP2 ROTATION

LI       R2,R10            ;(R2,R3)=E1=YE1
            LI       R3,R10
            MOVL     R4,0              ;(R4,R5)=E2=0
            MOVL     R5,0
            LI       R6,R10            ;(R6,R7)=E3=YE3
            LI       R7,R10
            MOVL     R8,0              ;(R8,R9)=E4=0
            MOVL     R9,0
            JSUB     INRSRV(R)         ;DO STEP3 ROTATION

LI       R2,R10            ;(R2,R3)=E1=INITIAL ZE1
            LI       R3,R10
            MOVL     R4,0              ;(R4,R5)=E2=0
            MOVL     R5,0
            MOVL     R6,0              ;(R6,R7)=E3=0
            MOVL     R7,0
            LI       R8,R10            ;(R8,R9)=E4=INITIAL ZE4
            LI       R9,R10
            JSUB     INRSRV(R)         ;DO BISECTION ROTATION

JRTS                       ;RETURN
            EJEC
;INRSRV - USES OLD QUATERNIONS TO ROTATE NEW QUATERNIONS
;          SERVICES INIROT ROUTINE
;CALLING SEQUENCE:
;         (R2,R3)=NEW E1
;         (R4,R5)=NEW E2
;         (R6,R7)=NEW E3
;         (R8,R9)=NEW E4
;         JSUB INRSRV(R)
INRSRV      LA       R11,ROTMT(R)      ;R11=ADR ROTATION MATRIX

LA       R12,FVFC(R)       ;R12=ADR QUATERNION VECTOR

SSR      R0                ;GET STATUS
            PUSH     R0,1              ;SAVE STATUS ON STACK
            LM       R0,'F0(1)         ;TURN OFF INTERRUPTS

LSR      R0
            LI       R0,R12            ;ROT(1,1)=E1
            L        R1,R12
            ADDL     R12,-2
            SI       R0,R11
            SI       R1,R11
            SI       R2,R12            ;E1=E1'
            SI       R3,R12
            MOVL     R0,0              ;ROT(1,2)=-E2
```

```
            MOV     R14,R12             ;R14=ADR RDIST
            SI      R2,R12              ;UPDATE RDIST
            SI      R3,R12
            ADDL    R13,-8              ;R13=ADR ACPOSX
            MOVL    R10,3               ;R10 COUNTS 3 COMPONENTS
GRAV0       JSUB    DDIV30(R)           ;COMPUTE UNIT VECT

SI      R0,R12
            SI      R1,R12
            ADDL    R13,4
            BCT     R10,GRAV0
            ADDL    R14,UVRTX-RDIST     ;R14=ADR VERT UNIT VECTOR
            LA      R13,ACVEL(R)        ;R13=ADR A/C VELOCITY VECTOR

MOVL    R0,0                ;(R0,R1)=DOT(ACVEL,UVRT)
            MOVL    R1,0
            MOVL    R10,3               ;R10 COUNTS 3 COMPONENTS
GRAV0A      JSUB    DMUL30(R)

ADDL    R13,4
            ADDL    R14,4
            BCT     R10,GRAV0A
            L       R2,R12              ;(R2,R3)=OLD VERT VELOCITY
            SI      R0,R12              ;UPDATE VERT VELOCITY
            L       R3,R12
            SI      R1,R12
            DSUB    R0,R2               ;(R0,R1)=VERT ACCEL
            SI      R0,R12
            SI      R1,R12
            LA      R13,GSCND(R)        ;R13=ADR GSCND

MOVL    R10,3               ;R10 COUNTS 3 COMPONENTS
            MOVL    R0,0                ;(R0,R1)=2**14*GSCND**2
            MOVL    R1,0
            SM      R0,CRSFNB(R)        ;DISABLE AT REST BRANCH IN VERTICAL
                                                                 ROUTINE
GRAV1       LI      R2,R13              ;(R2,R3)=GSCND(I)
            LI      R3,R13
            DSLA    R2,7                ;(R2,R3)=2**7*GSCND(I)
            BNV     *+6                 ;OVERFLOW?
            JMPM    GRAV5(R)            ;YES, FORGET INTEGRATOR

MUL     R2,R2               ;(R2,R3)=2**14*GSCND(I)**2
            DADD    R0,R2
            BCT     R10,GRAV1
            DSLA    R0,2                ;ADJUST SCALING (2**30=1)
            L       R2,R12
            JSUB    DSQRT(R)            ;(R2,R3)=2**7*GSCND

SI      R2,R12              ;UPDATE G7MAG
            S       R3,R12
            DSRA    R2,7                ;(R2,R3)=GSCND MAG
            ADDL    R14,GEST-UVRTX-12   ;R14=ADR GEST
            SI      R2,R14              ;UPDATE GSCND MAGNITUDE
            SI      R3,R14
            LI      R0,R14              ;(R0,R1)=INTEGRATED GSCND MAGNITUDE
            L       R1,R14
            ADDL    R14,-2              ;R14=ADR GSCND MAGNITUDE INTEGRATOR
            DSUB    R2,R0               ;(R2,R3)=ESTIMATE-CURRENT VALUE
            MOVL    R4,15*MILLG/'20000  ;(R4,R5)=7.5MG
            LM      R5,15*MILLG/2*15*MILLG/'20000*'10000(I)
```

```
            MOVL    R1,0
            LI      R2,R12
            L       R3,R12
            ADDL    R12,-2
            DSUB    R0,R2
            SI      R0,R11
            SI      R1,R11
            SI      R4,R12          ;E2=E2'
            SI      R5,R12
            MOVL    R0,0            ;ROT(1,3)=-E3
            MOVL    R1,0
            LI      R2,R12
            L       R3,R12
            ADDL    R12,-2
            DSUB    R0,R2
            SI      R0,R11
            SI      R1,R11
            SI      R6,R12          ;E3=E3'
            SI      R7,R12
            MOVL    R0,0            ;ROT(1,4)=-E4
            MOVL    R1,0
            LI      R2,R12
            L       R3,R12
            ADDL    R12,-2
            DSUB    R0,R2
            SI      R0,R11
            S       R1,R11
            SI      R8,R12          ;E4=E4'
            SI      R9,R12
            JSUB    EROT(R)         ;ROTATE NEW BY OLD

POP     R0,1            ;RECOVER STATUS
            LSR     R0
            JRTS                    ;RETURN
            EJEC
;GRAV - COMPUTES GRAVITY VECTOR COMPONENTS
;CALLING SEQUENCE:
;           JSUB GRAV(R)
GRAV        LM      R0,SSRVCT(R)    ;R0=AND('7F,SERVICE COUNT)

ANDL    R0,'7F
            CMPL    R0,8            ;TIME TO UPDATE GRAVITY COMPONENTS?
            BE      GRAVB           ;YES
            JRTS                    ;NO, RETURN
GRAVB       LA      R12,RDIST(R)    ;R12=ADR A/C DIST FROM EARTH'S
                                    ;                     CENTER
            LA      R13,ACPOS(R)    ;R13=ADR A/C POSITION VECTOR

MOV     R14,R13         ;R14=ADR A/C POSITION VECTOR
            JSUB    DZML30(R)       ;(R0,R1)=R**2

ADDL    R13,4
            ADDL    R14,4
            JSUB    DMUL30(R)

ADDL    R13,4
            ADDL    R14,4
            JSUB    DMUL30(R)

L       R2,R12
            JSUB    DSQRT(R)        ;(R2,R3)=RDIST
```

```
        DSUB    R2,R4                   ;GT UPPER LIMIT?
        BGT     GRAV5                   ;YES, SKIP THE INTEGRATOR
        DADD    R2,R4
        DADD    R2,R4                   ;LT LOWER LIMIT?
        BLT     GRAV5                   ;YES, SKIP THE INTEGRATOR
        DSUB    R2,R4                   ;(R2,R3)=ESTIMATE-CURRENT VALUE
        DSRA    R2,6                    ;GSCND MAGNITUDE INTEGRATOR=
        DADD    R2,R0                   ;  GINT+(ESTIMATE-GINT)/2**6
        SI      R2,R14                  ;UPDATE GSCND MAGNITUDE INTEGRATOR
        S       R3,R14
        SM      R2,CRSFNB(R)            ;ENABLE AT REST BRANCH IN VERT
                                                ROUTINE
        ADDL    R14,UVRTX-GINT-2        ;R14=ADR UVRTX
        ADDL    R13,-12                 ;R13=ADR GSCND
        ADDL    R12,VGFST-G7MAG-2       ;R12=ADR VGEST
        MOVL    R10,3                   ;R10 COUNTS 3 COMPONENTS
        MOVL    R0,0                    ;(R0,R1)=DOT(UVRT,GSCND)
        MOVL    R1,0

ADDL    R13,4
        ADDL    R14,4
        BCT     R10,GRAV1E
        SI      R0,R12                  ;UPDATE VERT GSCND
        SI      R1,R12
        LI      R2,R12                  ;(R2,R3)=VERT GSCND INTEGRATOR
        L       R3,R12
        ADDL    R12,-2
        DSUB    R0,R2                   ;VERT GSCND INTEGRATOR=
        DSRA    R0,6                    ;  VGINT+(ESTIMATE-VGINT)/2**6
        DADD    R2,R0
        SI      R2,R12
        SI      R3,R12
        ADDL    R14,CNTFR-UVRTX-12      ;R14=ADR CNTFR
        ADDL    R12,VRTA-VGINT-4        ;R12=ADR VERT ACCEL
        LI      R2,R12                  ;(R2,R3)=VERT ACCEL
        L       R3,R12
        MOVL    R0,4*MILLG/'10000       ;(R0,R1)=4MG
        LM      R1,4*MILLG-4*MILLG/'10000*'10000

DSUB    R0,R2
        BLT     GRAV5                   ;CENTRIPEDAL FORCE TOO LARGE
        DADD    R0,R2
        DADD    R0,R2
        BLT     GRAV5                   ;CENTRIPEDAL FORCE TOO SMALL
        LI      R0,R14                  ;(R0,R1)=CENTRIPEDAL FORCE*2**6
        L       R1,R14
        ADDL    R14,-2
        DADD    R0,R2
        SI      R0,R14                  ;UPDATE CENTRIPEDAL FORCE
                                                INTEGRATOR
        S       R1,R14
        ADDL    R14,UVRT-CNTFR-2        ;R14=ADR VERT UNIT VECTOR
        LA      R13,VRTV(R)             ;R13=ADR VERT VEL

LI      R0,R13                  ;(R0,R1)=PRESENT VERT VEL
        LI      R1,R13
        LI      R2,R13                  ;(R2,R3)=VERT ACC
        L       R3,R13
        ADDL    R13,VRTV-VRTA-2
        DSUB    R0,R2                   ;RECOVER OLD VERT VEL
        SI      R0,R13
```

```
         SI      R1,R13             ;R13=ADR VERT ACCEL
         LA      R12,ACVEL(R)       ;R12=ADR REFERENCE VELOCITY

MOVL    R10,3              ;R12 COUNTS 3 COMPONENTS
GRAV3    JSUB    DZML30(R)

LI      R2,R12
         L       R3,R12             ;(R2,R3)=REF VEL(I)
         ADDL    R12,-2
         DSUB    R2,R0              ;RESTORE OLD VEL(I)
         SI      R2,R12
         SI      R3,R12
         ADDL    R14,4
         BCT     R10,GRAV3
GRAV5    LA      R13,GINT(R)        ;R13=ADR GINT

LI      R0,R13             ;(R0,R1)=GSCND INTEGRATOR
         L       R1,R13
         ADDL    R13,CNTFR-GINT-2   ;R13=ADR CNTFR
         LI      R2,R13             ;(R2,R3)=CENTRIPEDAL FORCE*2**6
         LI      R3,R13
         DSRA    R2,6
         DADD    R0,R2              ;(R0,R1)=GRAVITY ESTIMATE
         SI      R0,R13
         S       R1,R13
         ADDL    R13,-2             ;R13=ADR GRAVITY ESTIMATE
         LA      R14,UVRT(R)        ;R14=ADR VERTICAL UNIT VECTOR

LA      R12,GREF(R)        ;R12=ADR GRAVITY VECTOR

MOVL    R7,0
         LA      R9,GSCND(R)        ;R9=GSCND ADR

MOVL    R10,3              ;R10 COUNTS 3 COMPONENTS
GRAV7    JSUB    DZML30(R)          ;(R0,R1)=GREF(I)

DSRA    R0,3               ;ADJUST FOR 1/8 SEC
         SI      R0,R12             ;UPDATE GREF(I)
         SI      R1,R12
         ADDL    R14,4
         SI      R7,R9              ;GSCND(I)=0
         SI      R7,R9
         BCT     R10,GRAV7
         JRTS                       ;RETURN
RDIST    DATA    0,0                ;DISTANCE FROM EARTH'S CENTER TO A/C

UVRT     EQU     *                  ;VERTICAL UNIT VECTOR
UVRTX    DATA    0,0

UVRTY    DATA    0,0

UVRTZ    DATA    0,0

VRTV     DATA    0,0                ;VERTICAL VELOCITY

VRTA     DATA    0,0                ;VERTICAL ACCELERATION

G7MAG    DATA    0,0                ;SQRT(2**14*GSCND**2)

GEST     DATA    0,0                ;GRAVITY ESTIMATE
```

```
GINT        DATA    0,0                 ;GRAVITY INTEGRATOR

VGEST       DATA    0,0                 ;DOT(GSCND,VERT) ESTIMATE
VGINT       DATA    0,0                 ;DOT(GSCND,VERT) INTEGRATOR

CNTFR       DATA    0,0                 ;CENTRIPEDAL FORCE

GMAG        DATA    0,0                 ;GRAVITY MAGNITUDE

CRSENB      DATA    0                   ;0/NOT ZERO =GSCND OVERFLOW/NO
                                                          OVERFLOW
MILLG       EQU     '2022               ;LSB OF 1MG (2**30=1KM/SEC)
            EJEC
;VERT - ROTATES QUATERNIONS TO FORCE CROSS PRODUCT TOWARD ZERO
;CALLING SEQUENCE:
;           JSUB    VERT(R)
VERT        LM      R0,SSRVCT(R)        ;TIME TO ALIGN TO VERTICAL?

ANDL    R0,'7F
            CMPL    R0,10
            BE      VERT1               ;YES
            JRTS                        ;NO, RETURN
;
;COMPUTE EAST & NORTH VECTOR OF TANGENT PLANE
;
VERT1       LA      R13,UVRTZ(R)        ;R13=ADR UVRTZ

MOV     R14,R13             ;R14=ADR UVRTZ
            JSUB    DZML30(R)           ;(R0,R1)=UVRTZ**2=SIN(LAT)**2

LA      R12,UEAST(R)        ;R12=ADR EAST UNIT VECTOR

LI      R4,R12              ;(R4,R5)=UEASTX=-SIN(LONG)
            LI      R5,R12
            LI      R6,R12              ;(R6,R7)=UEASTY=COS(LONG)
            L       R7,R12
            ADDL    R12,-6              ;R12=ADR UEASTX
            LM      R2,'4000(I)

MOVL    R3,0
            DSUB    R2,R0               ;(R2,R3)=COS(LAT)**2
            BZ      VERT2               ;NORTH OR SOUTH POLE?
            MOV     R0,R2               ;NO
            MOV     R1,R3
            MOVL    R2,0
            JSUB    DSQRT(R)            ;(R2,R3)=COS(LAT)

LA      R14,UNORTZ(R)       ;R14=ADR UNORTZ

SI      R2,R14
            S       R3,R14
            ADDL    R14,-2
            ADDL    R13,UVRTX-UVRTZ     ;R13=ADR UVRTX
            JSUB    DDIV30(R)           ;(R0,R1)=COS(LONG)

MOV     R6,R0               ;(R6,R7)=UEASTY=COS(LONG)
            MOV     R7,R1
            ADDL    R13,UVRTY-UVRTX     ;R13=ADR UVRTY
            JSUB    DDIV30(R)           ;(R0,R1)=SIN(LONG)
```

```
              MOVL    R4,0                    ;(R4,R5)=UEASTX=-SIN(LONG)
              MOVL    R5,0
              DSUB    R4,R0
VERT2         SI      R4,R12                  ;UPDATE UEASTX
              SI      R5,R12
              SI      R6,R12                  ;UPDATE UEASTY
              S       R7,R12
              ADDL    R12,UNORTZ-UEASTY*2     ;R12=ADR UNORTZ
              SI      R2,R12                  ;UPDATE UNORTZ
              S       R3,R12
              ADDL    R12,UNORTX-UNORTZ*2     ;R12=ADR UNORTX
              LA      R13,UVRTZ(R)            ;R13=ADR UVRTZ

LA      R14,UEASTY(R)           ;R14=ADR UEASTY

JSUB    DZML30(R)               ;(R0,R1)=SIN(LAT)*COS(LONG)

MOVL    R2,0
              MOVL    R3,0
              DSUB    R2,R0                   ;(R2,R3)=UNORTX=-SIN(LAT)*COS(LONG)
              SI      R2,R12                  ;UPDATE UNORTX
              SI      R3,R12
              ADDL    R14,UEASTX-UEASTY       ;R14=ADR UEASTX
              JSUB    DZML30(R)               ;(R0,R1)=-SIN(LAT)*SIN(LONG)

SI      R0,R12                  ;UPDATE UNORTY
              S       R1,R12
              ADDL    R12,AEASTV-UNORTY*2     ;R12=ADR A/C EAST VELOCITY
;
;COMPUTE EAST VELOCITY
;
              LA      R13,ACVEL(R)            ;R13=A/C VELOCITY VECTOR

MOVL    R11,2                   ;R11 COUNTS 2 COMPONENTS
              MOVL    R0,0
              MOVL    R1,0
VERT3         JSUB    DMUL30(R)               ;(R0,R1)=DOT(UEAST,ACVEL)

ADDL    R13,4
              ADDL    R14,4
              BCT     R11,VERT3
              LM      R2,EASTV(R)             ;(R2,R3)=EARTH EAST VELOCITY

LM      R3,EASTV+2(R)

DSUB    R2,R2                   ;(R0,R1)=EAST VEL REL TO EARTH
              L       R2,R12                  ;(R2,R3)=OLD EAST VELOCITY
              SI      R0,R12                  ;UPDATE EAST VELOCITY
              L       R3,R12
              SI      R1,R12
              DSUB    R2,R0                   ;(R2,R3)=-A/C EAST ACCEL
              SI      R2,R12                  ;UPDATE -A/C EAST ACCEL
              SI      R3,R12
;
;COMPUTE NORTH VELOCITY
;
              ADDL    R13,-8                  ;R13=ADR A/C VELOCITY VECTOR
              MOVL    R11,3                   ;R11 COUNTS 3 COMPONENTS
              MOVL    R0,0
              MOVL    R1,0
```

```
VERT4    JSUB    DMUL30(R)           ;(R0,R1)=DOT(UNORT,ACVEL)

ADDL    R13,4
         ADDL    R14,4
         BCT     R11,VERT4
         L       R4,R12              ;(R4,R5)=OLD NORTH VELOCITY
         SI      R0,R12              ;UPDATE NORTH VELOCITY
         L       R5,R12
         SI      R1,R12
         DSUB    R4,R0               ;(R4,R5)=-A/C NORTH ACCEL
         SI      R4,R12              ;UPDATE -A/C NORTH ACCEL
         SI      R5,R12
         LM      R0,TIME(R)          ;HAS AT LEAST 1 SEC ELAPSED?

CMPL    R0,1
         BHI     **+4                ;YES, ACCELERATIONS ARE INITIALIZED
         JRTS                        ;NO, WAIT FOR INITIALIZATION
         LM      R0,CRSENB(R)        ;OVERFLOW ON GSCND?

BZ      VERTA1              ;YES, SKIP AT REST CHECK
         LA      R13,GEST(R)         ;R13=ADR GEST

LI      R0,R13              ;(R0,R1)=GEST
         LI      R1,R13
         LI      R6,R13              ;(R6,R7)=GINT
         LI      R7,R13
         DSUB    R0,R6               ;(R0,R1)=GEST-GINT
         LI      R6,R13              ;(R6,R7)=VGEST
         LI      R7,R13
         DSUB    R0,R6               ;(R0,R1)=VGEST-VGINT-GEST
         LI      R6,R13              ;(R6,R7)=VGINT
         L       R7,R13
         DADD    R0,R6               ;(R0,R1)=VGEST-VGINT-(GEST-GINT)
         MOVL    R6,0                ;(R6,R7)=.1MG
         LM      R7,MILLG/10

DSUB    R0,R6               ;SENSED ACCEL TOO LARGE?
         BGT     VERTA1              ;YES, CHECK ACCELERATION
         DADD    R0,R6
         DADD    R0,R6               ;SENSED ACCELERATION TOO SMALL?
         BGT     VERT40              ;NO, ASSUME AT REST & RESTORE
                                     ;VERTICAL
VERTA1   LM      R0,20*MILLG/'10000       ;(R0,R1)=20MG

LM      R1,20*MILLG-20*MILLG/'10000*'10000

DSUB    R2,R0               ;EAST ACCEL .LT. -20MG?
         BLE     **+4                ;NO
         JRTS                        ;YES, DON'T RESTORE VERTICAL
         DADD    R2,R0
         DADD    R2,R0               ;EAST ACCEL .GT. 20MG?
         BGE     **+4                ;NO
         JRTS                        ;YES, DON'T RESTORE VERTICAL
         DSUB    R4,R0               ;NORTH ACCEL .LT. -20MG?
         BLE     **+4                ;NO
```

```
         JRTS                              ;YES, DON'T RESTORE VERTICAL
         DADD     R4,R0
         DADD     R4,R0                    ;NORTH ACCEL .GT. 20 MG?
         BGE      **4                      ;NO
         JRTS                              ;YES, DON'T RESTORE VERTICAL
;
;COMPUTE NEGATIVE ACCEL VECTOR IN REF FRAME
;
VERT40   LA       R13,AEASTV(R)            ;COMPUTE VELOCITY UNIT VECTOR

MOV      R14,R13                  ;R13=R14=ADR EAST VEL
         JSUB     DZML30(R)

ADDL     R13,ANORTV-AEASTV        ;R13=ADR NORTH VEL
         ADDL     R14,ANORTV-AEASTV        ;R14=ADR NORTH VEL
         JSUB     DMUL30(R)                ;(R0,R1)=VEL**2

L        R2,R12                   ;R2=VELOCITY ESTIMATE
         JSUB     DSQRT(R)                 ;(R2,R3)=VELOCITY MAGNITUDE

SI       R2,R12                   ;UPDATE VEL MAGNITUDE
         SI       R3,R12
         CMPL     R2,0                     ;ZERO VELOCITY?
         BNE      **8                      ;NO
         CMPL     R3,0
         BNE      **4                      ;NO
         JRTS                              ;YES, RETURN
         ADDL     R14,TVMAG-ANORTV         ;R14=ADR TANGENTIAL VEL MAG
         ADDL     R13,AEASTV-ANORTV        ;R13=ADR EAST VELOCITY
         JSUB     DDIV30(R)

SI       R0,R12                   ;EAST UNIT VELOCITY COMPONENT
         SI       R1,R12
         ADDL     R13,ANORTV-AEASTV        ;R13=ADR NORTH VEL
         JSUB     DDIV30(R)

SI       R0,R12                   ;NORTH UNIT VEL COMPONENT
         SI       R1,R12
         ADDL     R13,NEASTA-ANORTV        ;R13=ADR =A/C EAST ACCEL
         ADDL     R14,TUEAST-TVMAG         ;R14=ADR EAST UNIT VEL
                                                  COMPONENT
         JSUB     DZML30(R)

ADDL     R13,NNORTA-NEASTA        ;R13=ADR =A/C NORTH ACCEL
         ADDL     R14,TUNORT-TUEAST        ;R14=ADR NOR UNIT VEL
                                                  COMPONENT
         JSUB     DMUL30(R)                ;(R0,R1)==ACCEL ALONG VEL VECTOR

SI       R0,R12
         SI       R1,R12
         CMPL     R0,0                     ;DECELERATION?
         BM       VERT4A                   ;NO, REMOVE ACCEL ALONG VEL VECTOR
         ADDL     R13,NDFCEL-ANCRTA        ;R13=ADR =ACCEL ALONG VEL
                                                  VECTOR
         ADDL     R14,TUEAST-TUNORT        ;R14=ADR EAST VEL UNIT
         LA       R11,NEASTA(R)            ;R11==A/C EAST COMPONENT
```

```
           LI      R2,R11     ;(R2,R3)==A/C EAST ACCEL
           L       R3,R11
           ADDL    R11,-2
           JSUB    DZML30(R)            ;(R0,R1)VEL DECELERATION EAST
                                                  COMPONENT

DSUB    R2,R0      ;SUBTRACT EAST DECELERATION
                                         COMPONENT
           SI      R2,R11     ;UPDATE =A/C EAST ACCEL
           S       R3,R11
           ADDL    R11,NNORTA-NEASTA-2
           ADDL    R14,TUNORT-TUEAST
           LI      R2,R11     ;(R2,R3)==A/C NORTH ACCEL
           L       R3,R11
           ADDL    R11,-2
           JSUB    DZML30(R)            ;(R0,R1)=VELOCITY DECELERATION
                                                  NORTH COMPONENT

DSUB    R2,R0      ;SUBTRACT DECELERATION COMPONENT
           SI      R2,R11     ;STORE UPDATED =A/C NORTH ACCEL
           S       R3,R11
VERT4A     LA      R13,NEASTA(R)        ;R13=ADR =A/C EAST ACCEL

LA      R14,UEAST(R)         ;R14=ADR EAST UNIT VECTOR

MOVL    R11,2                ;R11 COUNTS 2 COMPONENTS
VERT5      JSUB    DZML30(R)

ADDL    R13,NNORTA-NEASTA
           ADDL    R14,UNORT-UEAST
           JSUB    DMUL30(R)

SI      R0,R12
           SI      R1,R12
           ADDL    R13,NEASTA-NNORTA
           ADDL    R14,UEASTY-UNORT
           BCT     R11,VERT5
           ADDL    R13,NNORTA-NEASTA    ;R13=ADR =A/C NORTH ACCEL
           ADDL    R14,UNORTZ-UEASTY-4  ;R14=ADR UNORTZ
           JSUB    DZML30(R)

SI      R0,R12
           SI      R1,R12
;
;CROSS VERTICAL WITH NEGATIVE ACCELERATION
;
           LA      R13,UVRT(R)     ;R13=ADR VERTICAL UNIT VECTOR

ADDL    R14,NACELY-UNORTZ    ;R14=ADR NACELY
           JSUB    DZML30(R)

MOV     R8,R0      ;(R8,R9)=CROSSZ
           MOV     R9,R1
           ADDL    R13,UVRTY-UVRTX ;R13=ADR UVRTY
           ADDL    R14,NACELZ-NACELY    ;R14=ADR NACELZ
           JSUB    DZML30(R)
```

```
            MOV     R4,R0                   !(R4,R5)=CROSSX
            MOV     R5,R1
            ADDL    R13,UVRTZ-UVRTY  !R13=ADR UVRTZ
            ADDL    R14,NACELX-NACELZ       !R14=ADR NACELX
            JSUB    DZML30(R)

MOV     R6,R0                   !(R6,R7)=CROSSY
            MOV     R7,R1
            ADDL    R14,NACELY-NACELX       !R14=ADR NACELY
            JSUB    DZML30(R)

DSUB    R4,R0
            ADDL    R13,UVRTY-UVRTZ  !R13=ADR UVRTY
            ADDL    R14,NACELX-NACELY       !R14=ADR NACELX
            JSUB    DZML30(R)

DSUB    R8,R0
            ADDL    R13,UVRTX-UVRTY  !R13=ADR UVRTX
            ADDL    R14,NACELZ-NACELX       !R14=ADR NACELZ
            JSUB    DZML30(R)

DSUB    R6,R0
            LM      R2,'4000(I)             !(R2,R3)=E1=1

MOVL    R3,0
!ASSUME 1/G APPROX 2**6
            DSLA    R4,2            !(R4,R5)=E2=K*(CROSSX/G)/2! K=1/2**3
            DSLA    R6,2            !(R6,R7)=E3=K*(CROSSY/G)/2! K=1/2**3
            DSLA    R8,2            !(R8,R9)=E4=K*(CROSSZ/G)/2! K=1/2**3
            LM      R0,CNTFR(R)     !CENTRIPEDAL FORCE NEGATIVE?

BP      VERT7           !NO
            DSLA    R4,2            !YES, DECREASE TIME CONSTANT
            DSLA    R6,2            !   K=1/2
            DSLA    R8,2
VERT7       JSUB    INRSRV(R)       !UPDATE QUATERNIONS

JRTS                    !RETURN
!
!
UEAST       EQU     *               !EAST UNIT VECTOR
UEASTX      DATA    0,0

UEASTY      DATA    0,0

UNORT       EQU     *               !NORTH UNIT VECTOR
UNORTX      DATA    0,0

UNORTY      DATA    0,0

UNORTZ      DATA    0,0

AEASTV      DATA    0,0             !A/C EAST VELOCITY
```

```
NEASTA   DATA    0,0              ;=A/C EAST ACCELERATION

ANORTV   DATA    0,0              ;A/C NORTH VELOCITY

NNORTA   DATA    0,0              ;=A/C NORTH ACCELERATION

TVMAG    DATA    0,0              ;TANGENTIAL VELOCITY MAGNITUDE

TVEAST   DATA    0,0              ;UNIT VELOCITY EAST COMPONENT

TVNORT   DATA    0,0              ;UNIT VELOCITY NORTH COMPONENT

NDECEL   DATA    0,0              ;=DECELERATION ALONG VELOCITY VECTOR

NACEL    EQU     *                ;NEGATIVE TANGENTIAL ACCELERATION
                                                VECTOR
NACELX   DATA    0,0

NACELY   DATA    0,0

NACELZ   DATA    0,0

;NAV - UPDATES POSITION IN REFERENCE FRAMS
;      UPDATES ORIENTATION OF SCNARIO FRAME
;      COMPUTES POSITION AND VELOCITY RELATIVE TO SCNARIO FRAME
;CALLING SEQUENCE:
;        JSUB NAV(R)
NAV      LM      R12,SSRVCT(R)    ;R12=STRAPDOWN SERVICE COUNT

ANDL    R12,'7F
         CMPL    R12,'20*10       ;TIME TO UPDATE SCNARIO FRAME?
         BNE     NAV1             ;NO
         LA      R14,COSWE(R)     ;YES, R14=ADR COSWE

LA      R13,COSWT(R)     ;R13=ADR COSWT

JSUB    DZML30(R)        ;(R0,R1)=COSWT*COSWE-SINWT*SINWE

ADDL    R14,SINWEM=COSWE       ;R14=ADR =SINWE
         ADDL    R13,SINWT=CCSWT  ;R13=ADR SINWT
         JSUB    DMUL30(R)

MOV     R2,R0            ;(R2,R3)=COSWT!
         MOV     R3,R1
         ADDL    R14,COSWE=SINWEM ;R14=ADR COSWE
         JSUB    DZML30(R)        ;(R0,R1)=COSWE*SINWT+SINWE*COSWT

ADDL    R14,SINWE=CCSWE  ;R14=ADR SINWE
         ADDL    R13,COSWT=SINWT  ;R13=ADR COSWT
         JSUB    DMUL30(R)

SI      R2,R13           ;UPDATE COSWT
         SI      R3,R13
         SI      R0,R13           ;UPDATE SINWT
         S       R1,R13
         ADDL    R13,SXY=SINWT=2
;NAV0 - ALTERNATE ENTRY POINT TO INIT PORTION OF SCNARIO DATA
;CALLING SEQUENCE:
;        R0=SINWT
;        R2=COSWT
```

```
                R13=ADR SXY
        JSUB    NAV0(R)
NAV0    LI      R4,R13          ;R4=4*SORG*COS(LAT)
        MOV     R5,R2           ;R5=COSWT;
        MOV     R7,R0           ;R7=SINWT;
        MUL     R2,R4           ;(R2,R3)=SORG*COS(LAT)*CCSWT
        SI      R2,R13          ;UPDATE SORGX
        SI      R3,R13
        MUL     R0,R4           ;(R0,R1)=SORG*COS(LAT)*SINWT
        SI      R0,R13          ;UPDATE SORGY
        S       R1,R13
        ADDL    R13,SDCOS-SORGY-2   ;R13=ADR SCENARIO D-COSINE
                                                MATRIX
        NEG     R0,R7
        SI      R0,R13
        S       R5,R13
        ADDL    R13,SDCS21-SDCS12
        LM      R9,SINLAT(R)    ;R9=SIN(LAT)
        NEG     R0,R9
        MUL     R0,R5           ;(R0,R1)=-SIN(LAT)*COSWT
        DSLA    R0,2
        SI      R0,R13
        NEG     R0,R9
        MUL     R0,R7           ;(R0,R1)=-SIN(LAT)*SINWT
        DSLA    R0,2
        S       R0,R13
        ADDL    R13,SDCS31-SDCS22
        LM      R0,COSLAT(R)    ;R0=COS(LAT)
        MUL     R5,R0           ;(R5,R6)=COS(LAT)*COSWT
        DSLA    R5,2
        SI      R5,R13
        MUL     R7,R0           ;(R7,R8)=COS(LAT)*SINWT
        DSLA    R7,2
        SI      R7,R13
        JRTS                    ;RETURN
NAV1    ANDL    R12,'F          ;TIME TO UPDATE REF POSITION?
        BZ      NAV3            ;YES
        JRTS                    ;NO, RETURN
NAV3    LA      R14,ACPOS(R)    ;R14=ADR POSITION VECTOR
        LA      R13,ACVEL(R)    ;R13=ADR CURRENT VELOCITY
        LA      R12,DACVEL(R)   ;R12=ADR DELTA VELOCITY
        LA      R11,GREF(R)     ;R11=ADR GRAVITY COMPONENT
        LA      R10,GSEND(R)    ;R12=ADR GRAVITY ACCUMULATOR
        MOVL    R9,3            ;R9 COUNTS 3 COMPONENTS
        MOVL    R8,0            ;R8=0
NAV5    LI      R0,R12          ;(R0,R1)=DELTA VELOCITY
        L       R1,R12
        ADDL    R12,-2
        SI      R8,R12          ;ZERO DELTA VELOCITY
        SI      R8,R12
        LI      R2,R10          ;(R2,R3)=GRAVITY ACCUMULATOR
        L       R3,R10
        ADDL    R10,-2
        DADD    R2,R0
```

```
        SI      R2,R10          ;UPDATE GRAVITY ACCUMULATOR
        SI      R3,R10
        LI      R2,R11          ;(R2,R3)=GRAVITY COMPONENT
        LI      R3,R11
        DSUB    R0,R2           ;SUBTRACT OUT GRAVITY COMPONENT
        LI      R2,R13          ;(R2,R3)=CURRENT VELOCITY
        L       R3,R13
        ADDL    R13,-2
        DADD    R2,R0
        SI      R2,R13          ;UPDATE CURRENT VELOCITY
        SI      R3,R13
        DSRA    R0,1            ;(R0,R1)=.5*DELTA VELOCITY
        DSUB    R2,R0           ;(R2,R3)=AVERAGE VELOCITY
        LI      R4,R14          ;(R4,R5)=CURRENT POSITION
        L       R5,R14
        ADDL    R14,-2
        SRA     R2,1            ;(R1,R2)=VEL*(1/8 SEC) SCALED
                                        1KM=2**16
        SEXE    R1,R2
        DADD    R4,R1
        SI      R4,R14          ;UPDATE POSITION
        SI      R5,R14
        BCT     R9,NAV6
        LM      R12,SSRVCT(R)   ;R12=STRAPDOWN SERVICE COUNT
        ANDL    R12,'3F         ;TIME TO UPDATE POSITION IN SCNARIO
                                        FRAME?
        BZ      *+4             ;YES
        JRTS                    ;NO, RETURN
        LA      R14,ACROS(R)    ;R14=RORG ADR

LA      R13,SORG(R)

LI      R2,R14          ;R2=XDIFF*2**6
        LI      R3,R14
        LI      R0,R13
        LI      R1,R13
        DSUB    R2,R0
        DSLA    R2,6
        LI      R3,R14          ;R3=YDIFF*2**6
        LI      R4,R14
        LI      R0,R13
        LI      R1,R13
        DSUB    R3,R0
        DSLA    R3,6
        LI      R4,R14          ;R4=ZDIFF*2**6
        LI      R5,R14
        LI      R0,R13
        LI      R1,R13
        DSUB    R4,R0
        DSLA    R4,6
        LA      R12,SDCOS(R)    ;R12=ADR SCNARIO D-COSINE

LA      R11,SACPOS(R)   ;R11=ADR SCNARIO POSITION

MOVL    R10,2           ;2 COMPONENTS
NAV7    LI      R0,R12          ;(R0,R1)=XDIFF*AXIS X
        MUL     R0,R2
        LI      R8,R12
        MUL     R8,R3           ;(R8,R9)=YDIFF*AXIS Y
```

```
        DADD    R0,R8
        LI      R8,R12
        BZ      *+6
        MUL     R8,R4           ;(R8,R9)=ZDIFF*AXIS Z
        DADD    R0,R8
        SI      R0,R11          ;UPDATE SCNARIO POSITION
        BCT     R10,NAV7
        LA      R14,RDIST(R)    ;R14=ADR RDIST

LI      R0,R14          ;(R0,R1)=RDIST
        L       R1,R14
        LA      R13,SORGR(R)

LI      R2,R13
        LI      R3,R13
        DSUB    R0,R2           ;WILL ALTITUDE BE +?
        BP      *+6
        MOVL    R0,0            ;NO, PIN IT TO ZERO
        MOVL    R1,0
        DSLA    R0,4            ;ADJUST SCALING (1KM=2**4)
        SI      R0,R11          ;UPDATE ALTITUDE
        ADDL    R12,-12         ;R12=ADR SCNARIO D-COSINE
        LM      R2,ACVELX(R)    ;(R2,R3,R4)=REF VEL

LM      R3,ACVELY(R)

LM      R4,ACVELZ(R)

MOVL    R10,3           ;R10 COUNTS 3 COMPONENTS
NAV9    LI      R0,R12          ;(R0,R1)=DOT(VEL,AXIS)
        MUL     R0,R2
        LI      R5,R12
        MUL     R5,R3
        DADD    R0,R5
        LI      R5,R12
        BZ      *+6
        MUL     R5,R4
        DADD    R0,R5
        DSLA    R0,2
        CMPL    R10,3
        BNE     NAV10
        LM      R5,EASTV(R)     ;SUBTRACT EARTH'S EAST VELOCITY

LM      R6,EASTV+2(R)

DSUB    R0,R5
NAV10   SI      R0,R11          ;UPDATE VELOCITY
        BCT     R10,NAV9
        JRTS                    ;RETURN
        EJEC
;INIPOS - CALCULATES INITIAL EARTH RADIUS & A/C POSITION
;CALLING SEQUENCE;
;       JSUB    INIVEL(R)
INIPOS  LA      R14,ERE(R)      ;R14=ADR -ECCEN*RE

LA      R13,SINLT2(R)   ;R13=ADR SIN(LAT)**2

LM      R0,RE(R)        ;(R0,R1)=EARTH'S EQUATORIAL RADIUS

LM      R1,RE+2(R)
```

```
        JSUB    DMUL30(R)           ;(R0,R1)=CURRENT RADIUS

ADDL    R14,SORGR=ERE       ;R14=ADR DISTANCE TO SCNARIO ORIGIN
        SI      R0,R14              ;UPDATE ORIGIN DISTANCE
        S       R1,R14
        ADDL    R14,=2
        ADDL    R13,COSLAT=SINLT2   ;R13=ADR COSLAT
        LA      R12,ACPOSX(R)       ;R12=ADR ACPOSX

JSUB    DZML30(R)           ;(R0,R1)=RADIUS*COS(LAT)

SI      R0,R12              ;UPDATE ACPOSX
        S       R1,R12
        ADDL    R12,ACPOSZ=ACPOSX=2 ;R12=ADR ACPOSZ
        ADDL    R13,SINLAT=COSLAT
        JSUB    DZML30(R)           ;(R0,R1)=RADIUS*SIN(LAT)

SI      R0,R12
        S       R1,R12
        JRTS                        ;RETURN
        DATA    '18EA,'2A37         ;EARTH'S EQUATORIAL RADIUS

;CPSRV = CONTROL PANEL SERVICE ROUTINE
;
CPSRV   PUSH    R0,15               ;SAVE REGISTERS
        LM      R12,CPREAD(A)       ;R12=CURRENT STATUS

LM      R11,CPOLD(R)        ;R11=PREVIOUS STATUS

SM      R12,CPOLD(R)        ;UPDATE PREVIOUS STATUS

XOR     R11,R12             ;R11=CHANGE IN CONTROL PANEL STATUS
        BNZ     **6                 ;THERE WAS SOME CHANGE
CPSRX1  POP     R14,15              ;NO CHANGE, SPURIOUS INTERRUPT
        RTI                         ;RETURN
        LCL     R11,7               ;CHANGE IN MODE SWITCH?
        BZ      CPHAND              ;NO, CHECK HANDOFF
        MOVL    R0,=1               ;YES, ASSUME NO IR
        SM      R0,DISIR(R)

SM      R0,DISBND(R)        ;ASSUME NO BAND RESTRICTION

SM      R0,DISSCH(R)        ;ASSUME NO SEARCH

MOVL    R0,MAXTHR           ;ASSUME NO PRI/OPEN
        SM      R0,DISNUM(R)

LM      R0,=LMPPRI=LMPOPN=1(I)  ;TURN PRI/OPEN LAMPS OFF

ANMR    R0,LMPWRD(R)

SM      R0,LMPWRD(R)

LM      R1,TSTLMP(R)        ;TEST LAMP ENABLED?

BZ      **6                 ;YES
        SM      R0,CPWRT(R)         ;NO, UPDATE LAMPS

MOV     R3,R12
        ANDL    R3,MSKMOD
        ADD     R3,R3               ;R3=2*MODE SWITCH
        JIND    MODTAB(R3)          ;SET MODE
```

```
CPIRS    MOVL    R0:0              ;MODE=IRS
         SM      R0:DISIR(R)

BR      CPHAND
CPIRT    MOVL    R0:1              ;MODE=IRT
         SM      R0:DISIR(R)

BR      CPHAND
CPNUSD   BR      CPHAND             ;NOT USED
CPBND    MOV     R0:R12             ;SET BAND
         ANDL    R0,MSKMOD
         ADDL    R0:-1
         SM      R0:DISBND(R)

BR      CPHAND
CPSCH    MOVL    R0:0              ;SET SEARCH MODE
         SM      R0:DISSCH(R)

BR      CPHAND
CPPRI    MOVL    R0:5              ;DISPLAY 5 THREATS
         SM      R0:DISNUM(R)

LM      R0:LMPPRI(I)      ;TURN PRI LAMP ON

ORMR    R0:LMPWRD(R)

SM      R0:LMPWRD(R)      ;SAVE LAMP WORD

LM      R1:TSTLMP(R)      ;TEST LAMP ENABLED?

BZ      ..6               ;YES
         SM      R0: CPWRT(A)      ;NO, TURN ON LAMP

CPHAND   LCL     R11,MSKHNC        ;HANDOFF CHANGE?
         BZ      CPALT             ;NO, CHECK ALTITUDE
         MOVL    R10,MSKHNC        ;R10=HANDOFF STATE
         AND     R10,R12
         LM      R0:LMPWRD(R)      ;R0=LAMP WORD

ANDL    R0:-LMPHNC-1      ;TURN OFF HANDOFF LAMP
         SM      R0:LMPWRD(R)

LM      R1:TSTLMP(R)      ;TEST LAMP ENABLED?

BZ      ..6               ;YES
         SM      R0:CPWRT(A)       ;NO, TURN ON LAMP

LM      R1:DISDMD(R)      ;R1=CURRENT DIAMOND THREAT

CMPL    R10,HANDS         ;SHORT PUSH?
         BNE     CPHND1            ;NO
         LM      R0:DISLOK(R)      ;YES, ALREADY LOCKED?

BZ      CPHND2            ;NO, LOCK ON CURRENT
         LM      R0:LMPWRD(R)      ;YES, REVERT TO FLOAT

ORL     R0:LMPHND
         SM      R0:LMPWRD(R)

SM      R0:CPWRT(R)
```

```
                MOVL    R0,0
                SM      R0,DISLOK(R)

BR      CPALT
CPHND1          SM      R10,DISLNG(R)   ;SET LONG HANDOFF PUSH STATE
                CMPL    R12,HANDL       ;LONG PUSH?
                BNE     CPALT           ;NO, CHECK ALTITUDE
CPHND2          SM      R1,DISLOK(R)    ;YES, LOCK ON THREAT

CPALT           LCL     R11,MSKALT      ;CHANGE IN ALTITUDE PRIORITY?
                BZ      CPMSLN          ;NO, CHECK MISSILE LAUNCH
                MOVL    R1,MSKALT
                AND     R1,R12
                MOVL    R0,1            ;YES, ASSUME HI
                CMPL    R1,KNTLO        ;LO ALTITUDE?
                BNE     *+4             ;NO
                MOVL    R0,-1           ;YES
                CMPL    R1,KNTAUT       ;AUTO?
                BNE     *+4             ;NO
                MOVL    R0,0            ;YES
                SM      R0,DISPRI(R)    ;SET PRIORITY

CPMSLN          SRZ     R12,7           ;SHIFT BITS DOWN
                SRZ     R11,7
                LCL     R11,BITLN/'80   ;MISSILE LAUNCH BIT?
                BZ      CPTST           ;NO, CHECK TEST SWITCH
                LM      R3,CPREAD(R)

ANDL    R3,MSKMOD
                CMPL    R3,5            ;SCENARIO INITIALIZATION?
                BE      CPMSL2          ;YES
                LM      R0,DSPENB(R)    ;NO, DISPLAY ENABLED?

BM      CPTST           ;NO
                MOVL    R0,-1           ;YES, COMPLEMENT TRAINING FLAG
                XRRM    R0,DISTRN(R)

BP      CPMSL1          ;TRAINING
                LM      R14,TRNLOC(R)   ;NOT TRAINING, REMOVE "T"

JSUB    DPPUSH(R)

BR      CPTST
CPMSL1          JSUB    DPPOP(R)        ;R14=AVAILABLE DISPLAY ADR

SM      R14,TRNLOC(R)

LM      R0,TCHR(R)      ;DISPLAY "T"

LM      R1,TCHRXY(R)

SM      R0,DISBUF(R14)

SM      R1,DISBUF+2(R14)

SRZ     R14,1
                SM      R0,DSPCHR(R14)
```

```
             SM       R1,DSPXY(R14)

BR       CPTST
CPMSL2       JSUB     SCNPOS(R)          ;COMPUTE SCNARIO ORIGIN

JSUB     SCNINI(R)          ;INITIALIZE SCNARIO DATA AREA

LM       R0,8*RFINT(I)      ;WAIT 4 SECS TO REFRESH DISPLAY

ADMR     R0,SSRVCT(R)

SM       R0,REFRSH(R)

MOVL     R0,0
             SM       R0,DISLOK(R)       ;FLOAT THE DIAMOND

SM       R0,DSPENB(R)       ;ENABLE THREAT DISPLAY

SM       R0,SCNENB(R)       ;ENABLE SCNARIO

SM       R0,ACTTHR(R)       ;ZERO THREATS CURRENTLY DISPLAYED

SM       R0,DISDMD(R)       ;DELETE DIAMOND THREAT ADR

LM       R14,DMDADR(R)      ;HAS DIAMOND DISPLAY ADR BEEN
                                                ASSIGNED?

BNM      CPTST              ;YES
             JSUB     DPPOP(R)           ;NO, ASSIGN ONE

SM       R14,DMDADR(R)

LM       R8,PRIREG(R)       ;R8=ADR FIRST THREAT
CPMSL3       LMB      R10,THRFLG(R8)     ;R10=THREAT FLAG

ANDL     R10,-MASMIS/'100-1    ;SET MISSILE INACTIVE
             LM       R9,THRMFR(R8)      ;DOES MISSILE RANGE EXIST?

BZ       *+4                ;NO
             ORL      R10,CNTMLT/'100    ;YES, SET MISSILE LATENT
             SMB      R10,THRFLG(R8)

LMB      R10,THRIMS(R8)     ;SET UP ARMED MISSILE COUNT

ANDL     R10,'7F
             SMB      R10,THRCMS(R8)

L        R8,R8              ;ADVANCE TO NEXT THREAT
             BNZ      CPMSL3             ;LIST NOT EXHAUSTED
CPTST        LCL      R11,MSKTST/'82     ;CHANGE IN TEST?
             BZ       CPGATE             ;NO, CHECK GATE
             LM       R0,LMPWRD(R)       ;YES, RESTORE LAMP CONDITIONS

MOVL     R0,-1              ;DISABLE TEST LAMP MODE
             SM       R0,TSTLMP(R)

MOV      R0,R12
             ANDL     R0,MSKTST/'80
             LA       R14,DISBUF(R)      ;RESTORE THREAT DISPLAY

JSUB     DSPDMP(R)
```

```
          LM     R14,SCNENB(R)      ;DISPLAY ENABLE=SCENARIO ENABLE

SM     R14,DSPENB(R)

CMPL   R0,KNTSYS/'80      ;SYSTEM TEST?
          BNE    CPTST5             ;NO
;
;;INSERT SYSTEM TEST
;
CPTST5    CMPL   R0,KNTDSP/'80      ;DISPLAY TEST?
          BNE    CPTST9             ;NO
          MOVL   R14,-1             ;DISABLE DISPLAY
          SM     R14,DSPENB(R)

LA     R14,TSTDIS(R)      ;DISPLAY TEST PATTERN

JSUB   DSPDMP(R)

CPTST9    CMPL   R0,KNTLMP/'80      ;LAMP TEST?
          BNE    CPGATE             ;NO
          LM     R0,'FF(I)          ;YES, TURN ON THE LAMPS

SM     R0,CPWRT(A)

MOVL   R0,0               ;ENABLE TEST LAMP MODE
          SM     R0,TSTLMP(R)

CPGATE    LCL    R11,MSKGAT/'80     ;CHANGE IN GATE?
          BZ     CPOPEN             ;NO, CHECK PRI/OPEN
;
;;INSERT GATE FUNCTIONS WHENEVER WE FIND OUT WHAT THEY ARE
;
CPOPEN    LCL    R11,BITOPN/'80     ;CHANGE IN PRI OPEN?
          BZ     CPUNK              ;NO, CHECK UNKNOWN
          LCL    R12,BITOPN/'80     ;YES, IS OPEN ON?
          BZ     CPUNK              ;NO, CHECK UNKNOWN
          LM     R0,CPREAD(A)       ;YES, ARE WE IN PRIORITY MODE?

ANDL   R0,MSKMOD
          BNZ    CPUNK              ;NO, IGNORE THIS CHANGE
          MOVL   R1,16+5            ;YES, SWITCH THREAT MAXIMUMS
          SBMR   R1,DISNUM(R)

SM     R1,DISNUM(R)
          MOVL   R3,-LMPOPN-1       ;ASSUME NOT OPEN
          ANMR   R3,LMPWRD(R)

CMPL   R1,5               ;REALLY NOT OPEN?
          BE     **4                ;YES
          ORL    R3,LMPOPN          ;NO, IT IS OPEN
          SM     R3,LMPWRD(R)       ;UPDATE LAMP WORD

LM     R1,TSTLMP(R)       ;TEST LAMP ENABLED?

BZ     **6                ;YES
          SM     R3,CPWRT(A)        ;NO, UPDATE LAMPS

CPUNK     LCL    R11,BITUNK/'80     ;CHANGE IN UNKNOWN?
          BZ     CPTRGT             ;NO, CHECK TARGET
          MOVL   R0,-1              ;ASSUME DISABLED
          LCL    R12,BITUNK/'80     ;REALLY DISABLED?
          BZ     **4                ;YES
```

```
            MOVL    R0,0                    ;NO, SET ENABLE
            SM      R0,DISUNK(R)            ;UPDATE UNKNOWN TAG

CPTRGT      SRZ     R11,2                   ;SHIFT BITS DOWN
            SRZ     R12,2
            LCL     R11,BITTGT/'200         ;CHANGE IN TARGET?
            BZ      CPAAA                   ;NO, CHECK AAA
            MOVL    R1,LMPSPR+LMPTGT        ;R1=LAMP WORD
            ORMR    R1,LMPWRD(R)            ;ASSUME BOTH LAMPS OFF

MOVL    R0,-1                   ;ASSUME SEPARATE
            ANDL    R1,-LMPSPR-1
            LCL     R12,BITTGT/'200         ;REALLY SEPARATE?
            BNZ     *+8                     ;YES
            MOVL    R0,0                    ;NO, SET TARGET INSTEAD
            ORL     R1,LMPSPR               ;TURN OFF SEPARATE
            ANDL    R1,-LMPTGT-1            ;TURN TARGET ON
            SM      R1,LMPWRD(R)            ;UPDATE LAMP WORD

LM      R2,TSTLMP(R)            ;TEST LAMP ENABLED?

BZ      *+6                     ;YES
            SM      R1,CPWRT(A)             ;NO, UPDATE LIGHTS

SM      R0,DISTGT(R)            ;UPDATE TARGET TAG

CPAAA       LCL     R11,BITAAA/'200         ;CHANGE IN AAA?
            BZ      CPSRX2                  ;NO, EXIT
            MOVL    R0,-1                   ;ASSUME DEFEATED
            LCL     R12,BITAAA/'200         ;REALLY DEFEATED?
            BNZ     *+4                     ;YES
            MOVL    R0,0                    ;NO
            SM      R0,DISAAA(R)            ;UPDATE AAAA TAG

CPSRX2      POP     R14,15                  ;RESTORE REGISTERS
            RTI                             ;RETURN
MODTAB      EQU     *                       ;MODE XFER TABLE
            DATA    CPPRI
            DATA    CPSCH
            DATA    CPAND
            DATA    CPAND
            DATA    CPAND
            DATA    CPNUSD
            DATA    CPIRT
            DATA    CPIRS
            EJEC
;SCNPOS - COMPUTES SCNARIO ORIGIN (LAT, REL LONG) FROM CURRENT
;                                                         HEADING
;CALLING SEQUENCE:
;       JSUB    SCNPOS(R)
SCNPOS      PUSH    R0,15                   ;SAVE REGISTERS
            LA      R13,ACPOS(R)            ;R13=ADR ACPOS

MOV     R14,R13                 ;R14=ADR ACPOS
            JSUB    DZML30(R)               ;(R0,R1)=ACPOSX**2+ACPOSY**2

ADDL    R13,4
            ADDL    R14,4
            JSUB    DMUL30(R)
```

```
        LA      R12,SX2Y2(R)        ;R12=ADR SQRT(ACPOSX**2+ACPOSY**2)

MOVL    R2,0                ;ESTIMATE=0
        JSUB    DSQRT(R)

ST      R2,R12
        ST      R3,R12
        MOV     R4,R2               ;(R4,R5)=SQRT(ACPOSX**2+ACPOSY**2)
        MOV     R5,R3
        ADDL    R13,4               ;R13=ADR ACPOSZ
        ADDL    R14,4
        JSUB    DMUL30(R)           ;(R0,R1)=SUM(ACPOS(I)**2)

JSUB    DSQRT(R)

ST      R2,R12              ;(R2,R3)=SQRT(SUM(ACPOS(I)**2))
        ST      R3,R12
        JSUB    DDIV(R)             ;(R0,R1)=COS(PRESENT LAT)

ST      R0,R12
        ST      R1,R12
        LA      R14,RMAG(R)         ;R14=ADR RADIAL MAGNITUDE

JSUB    DDIV30(R)           ;(R0,R1)=Z/RMAG=SIN(PRESENT LAT)

ST      R0,R12
        ST      R1,R12
        ADDL    R13,ACPOSX=ACPOSZ   ;R13=ADR ACPOSX
        ADDL    R14,SX2Y2=RMAG      ;R14=ADR SX2Y2
        JSUB    DDIV30(R)           ;(R0,R1)=COS(REL LONG)

ST      R0,R12
        ST      R1,R12
        ADDL    R13,ACPOSY=ACPOSX   ;R13=ADR ACPOSY
        JSUB    DDIV30(R)           ;(R0,R1)=SIN(REL LONG)

ST      R0,R12
        ST      R1,R12
        ADDL    R14,SINLTN=SX2Y2    ;R14=ADR SIN(PRESENT LAT)
        MOV     R13,R14             ;R13=ADR SIN(PRESENT LAT)
        JSUB    DZML30(R)           ;(R0,R1)=SINLTN**2

ST      R0,R12
        ST      R1,R12
        LI      R0,R12              ;(R0,R1)=WE*RE
        LI      R1,R12
        IFE     LASTST

COMPUTE HEADING FROM VELOCITY VECTOR

ADDL    R14,SNLTN2=SINLTN   ;R14=ADR SNLTN2
        ADDL    R13,EWERE=SINLTN    ;R13=ADR =E*WE*RE
        JSUB    DMUL30(R)           ;(R0,R1)=EAST VELOCITY=
                                    ; WE*RE*(1=E*SINLTN**2)*COSLTN
        ST      R0,R12
        S       R1,R12
        ADDL    R12,=2              ;R12=ADR AVE
        ADDL    R13,COSLTN=EWERE    ;R13=ADR COSLTN
        MOV     R14,R12             ;R14=ADR AVE
        JSUB    DZML30(R)
        MOV     R2,R0               ;(R2,R3)=WE*RE*COSLTN*(1=E*SINLTN**2)
```

```
        MOV     R3,R1
        LA      R13,ACVELC(R)    ;R13=ADR ACVELOX
        ADDL    R14,SINLNN=AVE   ;R14=ADR SINLNN
        JSUB    DZML30(R)
        COM     R0,R0
        NEG     R1,R1
        BNZ     **4
        ADDL    R0,1
        DSUB    R0,R2
        ADDL    R14,COSLNN=SINLNN    ;R14=ADR COSLNN
        ADDL    R13,4            ;R13=ADR ACVELOY
        JSUB    DMUL30(R)        ;(R0,R1)=RELATIVE EAST VELOCITY
        SI      R0,R12
        SI      R1,R12
        ADDL    R13,-4           ;R13=ADR ACVELOX
        JSUB    DZML30(R)
        ADDL    R13,4            ;R13=ADR ACVELOY
        ADDL    R14,SINLNN=COSLNN    ;R14=ADR SINLNN
        JSUB    DMUL30(R)
        COM     R0,R0
        NEG     R1,R1
        BNZ     **4
        ADDL    R0,1
        SI      R0,R12
        S       R1,R12
        ADDL    R12,-2           ;R12=ADR AVN
        ADDL    R14,SINLTA=SINLNN    ;R14=ADR SINLTN
        MOV     R13,R12          ;R13=ADR AVN
        JSUB    DZML30(R)
        LA      R13,ACVELC+8(R)  ;R13=ADR ACVELOZ
        ADDL    R14,COSLTA=SINLTN    ;R14=ADR COSLTN
        JSUB    DMUL30(R)
        SI      R0,R12
        SI      R1,R12
        ADDL    R14,AVN=CCSLTA   ;R14=ADR AVN
        IEND
        IFN     LABTST
;COMPUTE HEADING FROM X-AXIS POSITION RATHER THAN VELOCITY VECTOR
        LM      R8,STOR11(R)     ;(R8,R9,R10)=STRAPDOWN X-AXIS IN
                                              REF COORDINATES
        LM      R9,STOR21(R)
        LM      R10,STOR31(R)
        LM      R0,COSLNN(R)     ;(R0,R1)=DOT(X-AXIS,EAST)
        MUL     R0,R9
        LM      R2,SINLNN(R)
        MUL     R2,R8
        DSUB    R0,R2
        DSLA    R0,2             ;ADJUST SCALING (2**14=1)
        SI      R0,R12
        SI      R1,R12
        LM      R0,COSLNN(R)     ;(R2,R3)=DOT(X-AXIS,NORTH)
        MUL     R0,R8
        LM      R2,SINLNN(R)
```

```
MUL      R2,R9
DADD     R0,R2
DSLA     R0,2                 ;ADJUST SCALING (2**14=1)
LM       R2,SINLTN(R)

MUL      R0,R2
LM       R2,COSLTN(R)

MUL      R2,R10
DSUB     R2,R0
DSLA     R2,2                 ;ADJUST SCALING (2**14=1)
SI       R2,R12
SI       R3,R12
LA       R14,AVN(R)

IEND
MOV      R13,R14              ;R13=ADR AVN
JSUB     DZML30(R)

ADDL     R14,AVE-AVN          ;R14=ADR AVE
ADDL     R13,AVE-AVN          ;R13=ADR AVE
JSUB     DMUL30(R)

MOVL     R2,0
JSUB     DSQRT(R)             ;(R2,R3)=SQRT(AVE**2+AVN**2)

SI       R2,R12
SI       R3,R12
ADDL     R14,SVNVE-AVE        ;R14=ADR SQRT(AVN**2+AVE**2)
JSUB     DDIV30(R)            ;(R0,R1)=COS(HEADING)

SI       R0,R12               ;COSHED=AVE/SQRT(AVN**2+AVE**2)
SI       R1,R12
ADDL     R13,AVN-AVE          ;R13=ADR AVN
JSUB     DDIV30(R)            ;(R0,R1)=SIN(HEADING)

SI       R0,R12
SI       R1,R12
LA       R11,SINLAT(R)        ;R11=ADR SINLAT

LA       R14,SINDRE(R)        ;R14=ADR SIN(D/RE)

ADDL     R13,SINHD-AVN        ;R13=SIN(HEADING)
JSUB     DZML30(R)            ;(R0,R1)=SIN(D/RE)*SIN(HEADING)

SI       R0,R11
S        R1,R11
ADDL     R11,-2               ;R11=ADR SIN(LAT ORIGIN)
ADDL     R13,COSLTN-SINHD     ;R13=ADR COS(LAT NOW)
LA       R14,SINLAT(R)        ;R14=ADR SIN(LAT ORIGIN)

JSUB     DZML30(R)            ;(R0,R1)=SIN(D/RE)*SIN(HEAD)*COS(LATN)

ADDL     R14,SINLTN-SINLAT    ;R14=ADR SIN(LAT NOW)
LA       R13,COSDRE(R)        ;R13=ADR COS(D/RE)

JSUB     DMUL30(R)            ;(R0,R1)=SIN(ORIGIN LAT)

SI       R0,R11               ;UPDATE SIN(ORIGIN LAT)
S        R1,R11
ADDL     R11,SINLT2-SINLAT-2  ;R11=ADR SIN(LAT)**2
```

```
ADDL    R14,SINLAT=SINLTN       ;R14=ADR SIN(ORIGIN LAT)
MOV     R13,R14                 ;R13=ADR SIN(ORIGIN LAT)
JSUB    DZML30(R)

SI      R0,R11
S       R1,R11
ADDL    R11,COSLT2=SINLT2=2     ;R11=ADR COS(LAT)**2
MOV     R2,R0                   ;(R0,R1)=1-SIN(ORIGIN LAT)**2
MOV     R3,R1
LM      R0,'4000(I)

MOVL    R1,0
DSUB    R0,R2
SI      R0,R11                  ;UPDATE COS(LAT)**2
SI      R1,R11
MOVL    R2,0
JSUB    DSQRT(R)                ;(R2,R3)=COS(LAT ORIGIN)

SI      R2,R11
SI      R3,R11
ADDL    R13,COSHD=SINLAT        ;R13=ADR COS(HEAD)
LA      R14,SINDRE(R)           ;R14=ADR SIN(D/RE)

JSUB    DZML30(R)

SI      R0,R12
S       R1,R12
ADDL    R12,-2                  ;R12=ADR SIN(DEL LONG)
ADDL    R13,SINDLN=COSHD        ;R13=ADR SIN(DEL LONG)
LA      R14,COSLAT(R)           ;R14=ADR COS(LAT)

JSUB    DDIV30(R)               ;(R0,R1)=SIN(DEL LONG)

SI      R0,R12
SI      R1,R12
LM      R2,'4000(I)             ;(R2,R3)=1

MOVL    R3,0
MOV     R14,R13                 ;R14=ADR SIN(DEL LONG)
JSUB    DZML30(R)               ;(R0,R1)=SIN(DEL LONG)**2

DSUB    R2,R0
MOV     R0,R2                   ;(R0,R1)=1-SIN(DEL LONG)**2
MOV     R1,R3
MOVL    R2,0
JSUB    DSQRT(R)                ;(R2,R3)=COS(DEL LONG)

SI      R2,R12
SI      R3,R12
LM      R0,RE(R)

LM      R1,RE+2(R)

ADDL    R13,ERF=SINDLN          ;R13=ADR -ECCENTRICITY*RE
ADDL    R14,SINLT2=SINDLN
JSUB    DMUL30(R)               ;(R0,R1)=R=DIST TO SCNARIO ORIGIN

SM      R0,SORGR(R)

SM      R1,SORGR+2(R)
```

```
        ADDL    R14,COSLNN-SINLT2       !R14=ADR COSLNN
        ADDL    R13,COSDLN-ERE          !R13=ADR COSDLN
        JSUB    DZML30(R)

MOV     R2,R0                   !(R2,R3)=COSLNN*COSDLN
        MOV     R3,R1
        ADDL    R14,SINLNN-COSLNN       !R14=ADR SINLNN
        ADDL    R13,SINDLN-COSDLN       !R13=ADR SINDLN
        JSUB    DZML30(R)               !(R0,R1)=SINLNN*SINDLN

DSUB    R2,R0                   !(R2,R3)=COSWT=COS(ORIGIN LONGITUDE)
        ADDL    R13,COSDLN-SINDLN       !R13=ADR COSDLN
        JSUB    DZML30(R)
        ADDL    R14,COSLNN-SINLNN       !R14=ADR COSLNN
        ADDL    R13,SINDLN-COSDLN       !R13=ADR SINDLN
        JSUB    DMUL30(R)               !(R0,R1)=SINWT=SIN(ORIGIN LONGITUDE)

LM      R11,IFm(I)              !DISABLE INTERRUPTS

LSR     R11
        ADDL    R14,COSWT-CCSLNN        !R14=ADR COSWT
        SI      R2,R14                  !UPDATE COSWT
        SI      R3,R14
        SI      R0,R14                  !UPDATE SINWT
        SI      R1,R14
        MOVL    R11,15?                 !REENABLE INTERRUPTS
        LSR     R11
        POP     R14,15                  !RESTORE REGISTERS
        JRTS                            !RETURN
        EJEC
!SCNINI - INITIALIZES SCNARIO DATA AREA
!CALLING SEQUENCE!
!       JSUB SCNINI(R)
SCNINI  PUSH    R0,15                   !SAVE REGISTERS
        LA      R14,SORGR(R)            !R14=ADR DIST TO SCNARIO ORIGIN
        LA      R13,COSLAT(R)           !R13=ADR COS(ORIGIN LAT)

JSUB    DZML30(R)               !(R0,R1)=4*SORGR*COS(LAT)

DSLA    R0,2
        SM      R0,SXY(R)

LM      R1,WE(R)

MUL     R0,R1                   !(R0,R1)=WE*R*COS(LAT)=EASTV
        SM      R0,EASTV(R)

SM      R1,EASTV+2(R)

L       R0,R13                  !R0=COS(LAT)
        SM      R0,SDCS23(R)

ADDL    R13,SINLAT-COSLAT       !R13=ADR SINLAT
        JSUB    DZML30(R)               !(R0,R1)=R*SIN(LAT)

SM      R0,SORGZ(R)

SM      R1,SORGZ+2(R)

L       R0,R13                  !SDCS33=SIN(LAT)
        SM      R0,SDCS33(R)
```

```
        LM      R2,COSWT(R)

LM      R0,SINWT(R)

LA      R13,SXY(R)

JSUB    NAV0(R)

POP     R14,15          ;RESTORE REGISTERS
        JRTS                    ;RETURN
        EJEC
;RTCSRV - SERVICES REAL TIME CLOCK INTERRUPT
;
RTCSRV  PUSH    R0,15           ;SAVE REGISTERS
        LMB     R0,RTS(A)       ;WAS IT THE RTC?

BM      **6             ;YES
RTCSX1  POP     R14,15          ;NO, RESTORE REGISTERS
        RTI                     ;RETURN
        LM      R0,SSRVCT(R)    ;YES, R0=STRAPDOWN SERVICE COUNT

CMPM    R0,SECUPD(R)    ;HAS 1 SEC ELAPSED?

BM      RTC1            ;NO
        MOVL    R1,1            ;YES, INCREMENT MISSION TIME
        ADRM    R1,TIME(R)

LM      R1,'80'(I)      ;UPDATE NEXT UPDATE TIME

ADRM    R1,SECUPD(R)

RTC1    CMPM    R0,REFRSH(R)    ;TIME TO REFRESH DISPLAY?

BM      RTCSX1          ;NO, EXIT
        MOVL    R1,RFINT        ;R1=REFRESH INTERVAL
        ADRM    R1,REFRSH(R)    ;UPDATE NEXT REFRESH TIME

LM      R0,DSPENB(R)    ;IS DISPLAY ENABLED?

BM      RTCSX1          ;NO, EXIT
        MOVL    R0,0            ;ZERO FIRST THREAT ADR DISPLAYED
        SM      R0,DSPTST(R)

SM      R0,DSPMSL(R)    ;ZERO MISSILE ALERT STATUS

JSUB    SCNSTP(R)       ;COMPUTE SCNARIO TO STRAPDOWN XFORM
                                        MATRIX

JSUB    SCNDIS(R)       ;COMPUTE SCNARIO TO DISPLAY XFORM
                                        MATRIX

LM      R13,DISTGT(R)   ;TARGET SEPARATE ACTIVE?

BZ      RTC2            ;NO
        MOVL    R14,RING1       ;YES, INIT SPOKES
        LA      R13,SPOKES(R)

MOVL    R12,32
        SI      R14,R13
        BCT     R12,**2
RTC2    LA      R13,ACTTHR(R)   ;R13=ADR ACTIVE THREAT COUNT
```

```
        MOVL    R14,0
        L       R12,R13         ;R12=ACTIVE THREAT COUNT
        SM      R14,R13         ;ZERO ACTIVE THREAT COUNT
        SM      R12,R13         ;UPDATE START OF PASS THREAT COUNT
        SM      R14,R13         ;ZERO THREATS PROCESSED THIS PASS
        LM      R12,PRIBEG(R)   ;R12=ADR HIGHEST PRIORITY THREAT

RTC3    MOVL    R13,2*RING3-RING2  THREAT PAST 3*WEAPON'S RANGE?
        CMPM    R13,THRPRI(R12)

BLT     RTC6            ;YES, ELIMINATE REMAINING SYMBOLS
        LM      R13,THRFLG(R12) ;NO, CONTINUE TO PROCESS THREATS

MOV     R11,R13
        ANDL    R13,MASTYP      ;R13=THREAT TYPE
        ADD     R13,R13
        ANMB    R11,MASACT(I)   ;THREAT ACTIVE?

BNZ     **6
        JIND    TYPTAB(R13)     ;PROCESS THREAT

CMPM    R11,CNTLNT(I)   ;LATENT THREAT?

BE      **10            ;YES
        LM      R11,CNTEXP(I)   ;NO, REMOVE FROM THREAT LIST

ORRM    R11,THRFLG(R12)

JSUB    RMVTHR(R)       ;REMOVE SYMBOL FROM DISPLAY

BR      RTC4E
RTC4    LMB     R13,THRFLG(R12) ;MISSILE ACTIVE?

ANDL    R13,MASMIS/'120
        BZ      RTC4E           ;NO
        CMPL    R13,CNTMLT/'120 ;YES, MISSILE LATENT?
        BE      RTC4E           ;YES
        MOVL    R0,-1           ;NO, SET MISSILE ALERT STATUS
        CMPL    R13,CNTMAT/'120 ;ALERT?
        BNE     RTC4A           ;NO, A LAUNCH
        SMB     R0,DSPMSL+1(R)  ;YES, SET ALERT STATUS

BR      RTC4B
RTC4A   SMB     R0,DSPMSL(R)    ;SET LAUNCH STATUS

RTC4B   JSUB    DSPOCT(R)       ;DISPLAY OCTAGON

LM      R0,TIME(R)      ;1 SEC ELAPSED?

CMPM    R0,DMDTIM(R)

BE      RTC4E           ;NO
        LM      R1,THRINT(R12)  ;EVALULATING?

BP      RTC4C           ;NO, INTERCEPTING
        ADDL    R1,1            ;UPDATE EVALUATION TIME
        SM      R1,THRINT(R12)
        BNZ     RTC4E           ;STILL EVALUATING?
        ORL     R13,CNTMLA/'120 ;JUST LAUNCHED, SET LAUNCH FLAG
        SMB     R13,THRFLG(R12)

JSUB    MISINT(R)       ;R0=TIME TO INTERCEPT
```

```
         SM     R0,THRINT(R12)

LM     R0,'FF00(I)         ;DECREMENT CURRENT MISSILE COUNT

ADRM   R0,THRMS(R12)

BR     RTC4E
RTC4C    ADDL   R1,-1               ;DECREMENT INTERCEPT TIME
         SM     R1,THRINT(R12)      ;STILL INTERCEPTING?

BNZ    RTC4E               ;YES
         LMB    R1,THRMS(R12)       ;NO, SWITCH TO EVALUATION

BZ     RTC4D               ;NO MISSILES AVAILABLE
         LMB    R0,THREVL(R12)      ;RESET EVALUATION TIME

NEG    R0,R0
         SM     R0,THRINT(R12)

BR     RTC4E
RTC4D    LM     R0,-MASMIS-1(I)     ;SET MISSILE INACTIVE

ANRM   R0,THRFLG(R12)

LMB    R14,THROCT(R12)     ;GIVE UP OCTAGON ADR

JSUB   OPPUSH(R)

MOVL   R14,-1
         SMB    R14,THROCT(R12)

RTC4E    LM     R13,ACTTHR(R)       ;EXCEEDING MAX THREAT LIMIT?

CMPM   R13,DISNUM(R)

BGE    RTC6                ;YES
         L      R12,R13             ;R12=ADR NEXT THREAT
         BNZ    RTC3                ;THREAT LIST IS NOT EXHAUSTED
RTC5     LM     R13,DISPRC(R)       ;R13=# OLD THREATS PROCESSED

CMPM   R13,DISCUR(R)       ;PROCESSED THEM ALL?

BGE    RTCX2               ;YES
         L      R12,R13             ;NO, TURN OFF LEFT OVERS
         BZ     RTCX2               ;END OF LIST
RTC6     JSUB   RMVTHR(R)           ;REMOVE THREAT, IF ON

BR     RTC5
RTCX2    MOVL   R0,'FC              ;SET MISSILE LAMPS
         ANRM   R0,LMPWRD(R)

MOVL   R0,1                ;ASSUME MISSILE LAUNCH
         LM     R1,DSPMSL(R)

BZ     RTCX2A              ;NO MISSILE ACTIVITY
         BM     *+4                 ;MISSILE LAUNCH?
         MOVL   R0,2                ;NO, MISSILE ALERT
         ORRM   R0,LMPWRD(R)        ;SET MISSILE STATUS

RTCX2A   LM     R14,DMDADR(R)       ;R14=DIAMOND DISPLAY BUFFER ADR

LM     R13,DMDSYM(I)       ;R13=DIAMOND SYMBOL
```

```
         LM      R12,TIME(R)       ;R12=MISSION TIME
         CMPM    R12,DMATIM(R)     ;1 SEC ELAPSED FOR HANDOFF?
         BE      RTCX2B            ;NO
         SM      R12,DMATIM(R)     ;YES, UPDATE HANDOFF TIME
         LM      R11,DSPNXT(R)     ;R11=NEXT DIAMOND THREAT
         BNZ     **6               ;THERE IS A NEXT
         LM      R11,DSP1ST(R)     ;NO NEXT, R11=FIRST THREAT
         LM      R12,DISLNG(R)     ;LONG PUSH ON HANDOFF?
         CMPL    R12,HANDL
         BE      **6               ;YES
RTCX2B   LM      R11,DISDMC(R)     ;NO, R11=CURRENT DIAMOND THREAT
         LM      R12,DISLOK(R)     ;DIAMOND FLOATING?
         BNZ     **6               ;NO
         LM      R11,DSP1ST(R)     ;YES, MOVE DIAMOND TO FIRST THREAT
         CMPL    R11,0             ;IS THIS A VALID THREAT?
         BZ      RTCX4             ;NO, REMOVE DIAMOND
         SM      R11,DISDMC(R)     ;UPDATE DIAMOND THREAT ADR
         LMB     R12,THRADR(R11)   ;YES, R12=THREAT DISPLAY ADR
         LM      R10,DISBUF+2(R12) ;R10=THREAT DISPLAY X,Y
         SM      R10,DISBUF+2(R14) ;UPDATE DISPLAY BUFFER
         SM      R13,DISBUF(R14)   ;UPDATE DISPLAY DIAMOND
         SRZ     R14,1             ;UPDATE DISPLAY
         SM      R13,DSPCHR(R14)
         SM      R10,DSPXY(R14)
         LM      R0,'FF'(I)        ;UPDATE AUDIO
         ANRM    R0,LMPWRD(R)
         COM     R0,R0
         ANMR    R0,THRBRF(R11)
         ORMR    R0,LMPWRD(R)
RTCX2D   SM      R0,LMPWRD(R)      ;UPDATE LMPWRD
         LM      R1,TSTLMP(R)      ;TEST LAMP ENABLED?
         BZ      RTCX3             ;YES
         SM      R2,CPWRT(A)       ;NO, UPDATE AUDIO
RTCX3    POP     R14,15            ;RESTORE REGISTERS
         RTI                       ;RETURN
RTCX4    MOVL    R13,0             ;TURN OFF DIAMOND
         SM      R13,DISBUF(R14)   ;IN BUFFER
         SRZ     R14,1
         SM      R13,DSPCHR(R14)   ;ON DISPLAY
```

```
          LM      R0,'FF(I)           ;TURN OFF AUDIO

ANMR    R0,LMPWRD(R)

BR      RTCX2D
;
;THREAT DISPLAY PROCESSING TABLE
;
TYPTAB    DATA    SRCRDR              ;SEARCH RADAR
          DATA    UNKRDR              ;UNKNOWN RADAR
          DATA    AAARDR              ;AAA RADAR
          DATA    XRDR                ;ALL OTHER RADARS
          DATA    BLKRDR              ;BLANK
          DATA    BLKRDR              ;BLANK
          DATA    BLKRDR              ;BLANK
          DATA    BLKRDR              ;BLANK
          EJEC
;RADAR DISPLAY PROCESSING
;
;SEARCH RADAR
;
SRCRDR    LM      R14,DISSCH(R)       ;SEARCH MODE?

BP      SRCRD1              ;YES
          JSUB    RMVTHR(R)           ;NO, TURN OFF SYMBOL

BR      *+6                 ;PROCESS NEXT THREAT
SRCRD1    JSUB    DSPTHR(R)           ;TURN ON SYMBOL

JMPM    RTC4(R)             ;PROCESS NEXT THREAT

;
;UNKNOWN RADAR
;
UNKRDR    MOVL    R14,LMPUNK          ;TURN ON UNKNOWN LIGHT
          ORMR    R14,LMPWRC(R)

SM      R14,LMPWRC(R)

LM      R13,TSTLMP(R)       ;TEST LAMP ENABLED?

BZ      *+6                 ;YES
          SM      R14,CPWRT(A)        ;NO, TURN ON LAMP

LM      R14,DISUNK(R)       ;UNKNOWNS ENABLED?

BP      UNKRD1              ;YES
UNKRD0    JSUB    RMVTHR(R)           ;NO, TURN OFF SYMBOL

BR      UNKRDX
UNKRD1    LM      R14,DISBNC(R)       ;BAND LIMITED?

BM      UNKRD2              ;NO
          LMB     R13,THRBNC(R12)     ;YES, R13=THREAT BAND

CMP     R14,R13             ;RIGHT BAND?
          BNE     UNKRD0              ;NO, REMOVE THREAT
UNKRD2    JSUB    DSPTHR(R)           ;DISPLAY THE SYMBOL

UNKRDX    JMPM    RTC4(R)             ;PROCESS NEXT THREAT
;
;AAA RADAR (NOT GUNDISH)
```

```
AAARDR   LM      R14,DISAAA(R)    ;ARE AAA'S ENABLED?

BP      AAARD1           ;YES
AAARD0   JSUB    RMVTHR(R)        ;NO, TURN OFF SYMBOL
         BR      AAARDX
AAARD1   LM      R14,DISBNC(R)    ;BAND LIMITED?

BM      AAARD2           ;NO
         LMB     R13,THRBNC(R12)  ;YES, R13=THREAT BAND

CMP     R14,R13          ;RIGHT BAND?
         BNE     AAARD0           ;NO, REMOVE THREAT
AAARD2   JSUB    DSPTHR(R)        ;DISPLAY THE SYMBOL

AAARDX   JMPM    RT04(R)          ;PROCESS NEXT THREAT

;
;OTHER RADARS
;
XRDR     LM      R14,DISBNC(R)    ;BAND LIMITED?

BM      XRDR1            ;NO
         LMB     R13,THRBNC(R12)  ;YES, R13=THREAT BAND

CMP     R14,R13          ;RIGHT BAND?
         BE      XRDR1            ;YES
         JSUB    RMVTHR(R)        ;NO, REMOVE THREAT

BR      XRDX
XRDR1    JSUB    DSPTHR(R)        ;DISPLAY SYMBOL

XRDX     JMPM    RT04(R)          ;PROCESS NEXT THREAT

;
;BLANK RADARS - EXPANSION TYPES
;
BLKRDR   JSUB    RMVTHR(R)        ;REMOVE THREAT

JMPM    RT04(R)          ;PROCESS NEXT THREAT
         EJEC
;RMVTHR - REMOVE THREAT SYMBOL FROM DISPLAY
;CALLING SEQUENCE:
;       R12=THREAT ENTRY ADR
;       JSUB RMVTHR(R)
RMVTHR   LMB     R14,THRADR(R12)  ;IS SYMBOL ACTIVE?

BNM     *+4              ;YES
         JRTS                     ;NO, RETURN
         MOVL    R0,1             ;INCREMENT OLD THREATS PROCESSED
         ADRM    R0,DSPRC(R)

CMPM    R12,DISDMC(R)    ;IS DIAMOND ON THIS THREAT?

BNE     RMVTH1           ;NO
         LM      R11,DMDADR(R)    ;YES, BLANK DIAMOND

MOVL    R13,0
         SM      R13,DISBUF(R11)  ;TURN OFF DIAMOND IN BUFFER

SRZ     R11,1
         SM      R13,DSPCHR(R11)  ;TURN DIAMOND ON DISPLAY
```

```
                SM       R13,DISDMC(R)     ;ZERO DIAMOND THREAT ADR

SM       R13,DISLOK(R)     ;REVERT TO FLOAT

RMVTH1          JSUB     DPPUSH(R)         ;TURN OFF SYMBOL & RELINQUISH ADR

LMB      R14,THROCT(R12)   ;OCTAGON ACTIVE?

BM       *+6               ;NO
                JSUB     DPPUSH(R)         ;TURN OFF OCTAGON & RELINQUISH ADR

MOVL     R0,-1             ;DELETE THREAT DISPLAY ADR
                SM       R0,THRACT(R12)

JRTS                       ;RETURN
                EJEC
;DSPTHR - PLACES THREAT SYMBOL ON DISPLAY
;CALLING SEQUENCE:
;       R12=THREAT ENTRY ADR
;       JSUB DSPTHR(R)
DSPTHR          LM       R0,ACTTHR(R)      ;R0=CURRENT DISPLAY THREAT ACTIVITY

BNZ      *+6               ;THIS IS NOT FIRST THREAT
                SM       R12,DSP1ST(R)     ;UPDATE FIRST THREAT

ADDL     R0,1              ;INCREMENT ACTIVE THREATS
                SM       R0,ACTTHR(R)

LM       R0,DSPNXT(R)      ;IS THIS NEXT AFTER DIAMOND THREAT?

BNZ      *+6               ;NO
                SM       R12,DSPNXT(R)     ;YES

MOVL     R0,0
                CMPM     R12,DISDMC(R)     ;IS THIS THE DIAMOND THREAT?

BNE      *+6               ;YES
                SM       R0,DSPNXT(R)      ;YES, SET UP TO GET NEXT THREAT

LMB      R14,THRADR(R12)   ;ACTIVE SYMBOL?

BM       DSPTH0            ;NO
                MOVL     R0,1
                ADRM     R0,DSPRC(R)       ;YES, INCREMENT OLD THREATS
                                                 PROCESSED

BR       DSPTHA
DSPTH0          JSUB     DPPOP(R)          ;NO, GET A DISPLAY ADR

SMB      R14,THRADR(R12)   ;STORE DISPLAY ADR

LM       R0,THRSYM(R12)    ;GET THREAT SYMBOL

SM       R0,DISBUF(R14)    ;SYMBOL TO DISPLAY BUFFER

SRZ      R14,1
                SM       R0,DSPTHR(R14)    ;SYMBOL TO SYMBOL REGISTER

DSPTHA          LA       R14,THRX(R12)     ;R14=ADR THRX

LA       R13,SACPOS(R)     ;R13=ADR ACX
```

```
        LI      R9,R14          I(R9,R10,R11)=VECTOR FROM A/C TO
                                     THREAT
        LI      R0,R13
        SUB     R9,R0
        LI      R10,R14
        LI      R0,R13
        SUB     R10,R0
        LI      R11,R14
        LI      R0,R13
        SUB     R11,R0
        LA      R14,SCTODS(R)   IR14=ADR SCNARIO TO DISPLAY XFORM
                                     MATRIX

LI      R5,R14          I(R5,R6)=UNSCALED DISPLAY X-COORD
        MUL     R5,R9
        LI      R0,R14
        MUL     R0,R10
        DADD    R5,R0
        LI      R0,R14
        MUL     R0,R11
        DADD    R5,R0
        DSLA    R5,2            IADJUST SCALING
        LI      R7,R14          I(R7,R8)=UNSCALED DISPLAY Y-COORD
        MUL     R7,R9
        LI      R0,R14
        MUL     R0,R10
        DADD    R7,R0
        LI      R0,R14
        MUL     R0,R11
        DADD    R7,R0
        DSLA    R7,2            IADJUST SCALING
        MOV     R0,R5           I(R0,R1)=X**2+Y**2
        MUL     R0,R5
        MOV     R2,R7
        MUL     R2,R7
        DADD    R0,R2
        BZ      DSPTHX          IIF ORIGIN, DON'T TRY TO UPDATE
                                     LOCATION
        MOVL    R2,0
        JSUB    SQRT(R)         IR2=SQRT(X**2+Y**2)

LM      R0,THRPRI(R12)  IR0=THREAT PRIORITY (DISPLAY RADIUS)

CMPL    R0,RING3        IPAST 2*LETHAL RANGE?
        BLE     **4             INO
        MOVL    R0,RING4        IYES, SET RADIUS TO OUTSIDE EDGE
        LM      R6,DISBND(R)    IBAND LIMITED?

BM      DSPTH1          INO
        CMP     R7,R5           IYES, IN FORE SECTOR?
        BGE     **4             IYES
        MOVL    R0,RING4        INO, SET RADIUS TO OUTSIDE EDGE
DSPTH1  LM      R6,DISTGT(R)    ITARGET SEPARATE ACTIVE?

BZ      **6             INO
        JSUB    SEPARO(R)       IYES, CHECK SEPARATION

MUL     R5,R0
        DIV     R5,R2           IR5=SCALED DISPLAY X-COORD
        ADDL    R5,RING0        IADD IN CENTER COORDINATE
        MUL     R7,R0
```

```
              DIV      R7,R2         ;R7=SCALED DISPLAY Y-COORD
              ADDL     R7,RING0
              SLZ      R5,8
              OR       R5,R7         ;R5=DISPLAY LOCATION WORD
              LMB      R14,THRADR(R12) ;R14=DISPLAY ADR

SM       R5,DISBUF*2(R14)   ;LOCATION TO DISPLAY BUFFER

SRZ      R14,1
              SM       R5,DSPXY(R14) ;LOCATION TO LOCATION REGISTER

DSPTHX        JRTS                   ;RETURN
              EJEC

;SEPARO - CHECKS TARGET SEPARATION
;CALLING SEQUENCE:
;      R5=UNSCALED DISPLAY X-COORD
;      R7=UNSCALED DISPLAY Y-COORD
;      R0=DISPLAY RADIUS
;      JSUB SEPAR0(R)
;      R0=UPDATED DISPLAY RADIUS
SEPARO        PUSH     R6,7          ;SAVE REGISTERS
              JSUB     AOARTN(R)     ;R8=ANGLE (2**6=360)

MOV      R7,R8         ;R7=SPOKE ADR
              MOV      R6,R0         ;R6=SPOKE RADIUS
              CMPL     R6,RING2      ;WITHIN INNER ANNULUS?
              BGE      SEPA1         ;NO
              ADDL     R7,4          ;YES, REDUCE SPOKE COUNT
              ANDL     R7,'38        ;FOR INNER ANNULUS
              LM       R6,SPOKES(R7) ;R6=CURRENT RADIUS ON THIS SPOKE

CMPL     R6,RING2      ;STILL WITHIN INNER ANNULUS?
              BLT      SEPA3         ;YES
              MOV      R7,R8         ;NO, TRY SECOND ANNULUS
              MOVL     R0,RING2
              MOVL     R6,RING2
SEPA1         CMPL     R6,RING3      ;WITHIN SECOND ANNULUS?
              BGE      SEPA2         ;NO
              ADDL     R7,2          ;YES, REDUCE SPOKE COUNT
              ANDL     R7,'3C        ;FOR SECOND ANNULUS
              LM       R6,SPOKES(R7) ;R6=CURRENT RADIUS ON THIS SPOKE

CMPL     R6,RING3      ;STILL WITHIN SECOND ANNULUS?
              BLT      SEPA3         ;YES
              MOV      R7,R8         ;NO, TRY OUTER ANNULUS
              MOVL     R0,RING3
SEPA2         ADDL     R7,1
              ANDL     R7,'3E
              LM       R6,SPOKES(R7)

SEPA3         CMP      R0,R6         ;NEW RADIUS .GT. CURRENT SPOKE
                                     ;        RADIUS?
              BGE      *+4           ;YES
              MOV      R0,R6         ;NO, MOVE OUT TO CURRENT SPOKE
                                     ;        RADIUS

MOVL     R6,'10        ;UPDATE CURRENT SPOKE RADIUS
              ADD      R6,R0
              CMPL     R6,RING4      ;EXCEEDING OUTER EDGE?
```

```
         BLE     **4                   ;NO
         MOVL    R6,RING4              ;YES, RESET TO OUTER EDGE
         SM      R6,SPOKES(R7)

POP     R12,7                 ;RESTORE REGISTERS
         JRTS                          ;RETURN
         EJEC
;AOARTN - SIN,COS TO AOA CONVERSION ROUTINE
;CALLING SEQUENCE:
;        R5=COS
;        R7=SIN
;        JSUB AOARTN(R)
;        R8=AOA (2**6=360)
AOARTN   MOV     R12,R7                ;R12=SIN
         MOV     R11,R5                ;R11=COS
         MOV     R10,R12               ;R10=ABS(SIN)
         BNM     **4
         NEG     R10,R12
         MOV     R9,R11                ;R9=ABS(COS)
         BNM     **4
         NEG     R9,R11
         MOV     R7,R9                 ;R7=MIN(R9,R10)
         MOV     R6,R10                ;R6=MAX(R9,R10)
         CMP     R9,R10
         BLT     **6
         MOV     R7,R10
         MOV     R6,R9
         MOVL    R8,ATNLEN-2           ;COMPUTE ATAN TABLE ADR
         MUL     R7,R8
         DIV     R7,R6
         ADDL    R7,1                  ;ROUND UP TO CLOSEST VALUE
         LM      R8,ATNTAB(R7)         ;R8=ANGLE IN 1ST OCTANT

CMP     R6,R9                 ;CONVERT TO 1ST QUADRANT
         BE      **6                   ;WAS IN 1ST OCTANT
         NEG     R8,R8                 ;WAS IN 2ND OCTANT
         ADDL    R8,'10                ;ANGLE=90,-ANGLE
         XOR     R11,R12               ;1ST OR 3RD QUADRANT?
         BM      AOAR2                 ;NO
         CMPL    R12,0                 ;YES, 1ST QUADRANT?
         BNM     AOAR4                 ;YES
         ADDL    R8,'20                ;NO, 3RD QUADRANT
         BR      AOAR4                 ;ANGLE=ANGLE+180,
AOAR2    NEG     R8,R8                 ;ASSUME 2ND QUADRANT?
         ADDL    R8,'20                ;ANGLE=180,-ANGLE
         CMPL    R12,0                 ;2ND QUADRANT?
         BNM     AOAR4                 ;YES
         ADDL    R8,'20                ;4TH QUAD; ANGLE=ANGLE+180,
AOAR4    NEG     R8,R8                 ;CONVERT TO AOA
         ADDL    R8,'18                ;ANGLE=135,-ANGLE
         BNM     **4                   ;ANGLE IS POSITIVE
         ADDL    R8,'40                ;ADD 360 TO NEGATIVE ANGLE
         JRTS                          ;RETURN
ATNTAB   DATA    0                     ;ATAN TABLE
         DATA    1
         DATA    1
         DATA    2
         DATA    2
         DATA    3
         DATA    4
```

```
            DATA    4
            DATA    5
            DATA    5
            DATA    6
            DATA    6
            DATA    7
            DATA    7
            DATA    7
            DATA    8
            DATA    8
ATNLEN      EQU     $-ATNTAB            ;LENGTH OF ATAN TABLE IN BYTES
            EJEC
;MISINT - CALCULATES 1ST ORDER MISSILE INTERCEPT TIME
;CALLING SEQUENCE:
;           R12=THREAT ENTRY ADR
;           JSUB MISINT(R)
;           R0=INTERCEPT TIME (SEC)
MISINT      LA      R13,SACPOS(R)       ;(R9,R10,R11)=-RANGE VECTOR
            LI      R0,R13
            LM      R9,THRX(R12)

SUB     R9,R0
            LI      R0,R13
            LM      R10,THRY(R12)

SUB     R10,R0
            LI      R0,R13
            LM      R11,THRZ(R12)

SUB     R11,R0
            LI      R2,R13              ;(R2,R3)=DOT(ACVEL,-RANGE)
            MUL     R2,R9
            LI      R4,R13
            MUL     R4,R10
            DADD    R2,R4
            LI      R4,R13
            MUL     R4,R11
            DADD    R2,R4
            LM      R0,THRNG(R12)       ;R0=THREAT RANGE (1KM=2**4)

DIV     R2,R0               ;R2=A/C VEL ALONG RANGE VECTOR
            ADMR    R2,THRMV(R12)       ;R2=INTERCEPT VEL (1KM/SEC=2**14)

MOVL    R1,0
            DSRA    R0,6                ;(R0,R1)=RANGE (1KM=2**14)
            DIV     R0,R2               ;R0=INTERCEPT TIME (SEC)
            JRTS                        ;RETURN
            EJEC
;DSPOCT - PLACES MISSILE OCTAGON ABOUT THREAT
;CALLING SEQUENCE:
;           R12=THREAT ENTRY ADR
;           R13=MISSILE STATUS TAG/'100
;           JSUB DSPOCT(R)
DSPOCT      LMB     R14,THRADR(R12)     ;THREAT ON DISPLAY?

BNM     *+4                 ;YES
            JRTS                        ;NO, RETURN
            LMB     R14,THROCT(R12)     ;YES, IS OCTAGON ABOUT THREAT?

BNM     DSPOC2              ;YES
            JSUB    OPROP(R)            ;NO, R14=OCTAGON ADR
```

```
          SMB     R14,THROCT(R12)

LM      R0,'2C80(I)        ;R0=OCTAGON SYMBOL

BR      DSPOC3
DSPOC2    MOVL    R0,0               ;ASSUME ALERT
          CMPL    R13,CNTMAT/'100    ;REALLY ALERT?
          BE      *+6                ;YES
          LM      R0,'80(I)          ;NO, BLINK FOR LAUNCH

XRMR    R0,DISBUF(R14)     ;R0=SYMBOL

DSPOC3    LM      R1,DISBUF+2(R11)   ;R1=THREAT DISPLAY LOCATION

SM      R0,DISBUF(R14)     ;SYMBOL TO DISPLAY BUFFER

SM      R1,DISBUF+2(R14)   ;LOCATION TO DISPLAY BUFFER

SRZ     R14,1
          SM      R0,DSPCHR(R14)     ;SYMBOL TO DISPLAY

SM      R1,DSPXY(R14)      ;LOCATION TO DISPLAY

JRTS                       ;RETURN
          EJEC
;MURWCD - DOT PRODUCT OF COMPENSATED DEL VEL
;         WITH MASS UNBALANCE MATRIX ROW  (2**30=1)
;CALLING SEQUENCE;
;         R14=ADR MU MATRIX ROW
;         R13=ADR COMPENSATED DEL VELOCITY VECTOR
;         JSUB MURWCD(R)
;         R14=ADR NEXT MATRIX ROW
;         (R0,R1)=DOT PRODUCT
MURWCD    LI      R8,R13             ;(R8,R9)=MU(I,1)*CDV(1)
          LI      R9,R13
          DSRA    R8,7
          LI      R8,R14
          MUL     R8,R9
          LI      R0,R13             ;(R0,R1)=MU(I,2)*CDV(2)
          LI      R1,R13
          DSRA    R0,7
          LI      R0,R14
          MUL     R0,R1
          DADD    R8,R0              ;(R8,R9)=SUM(MU(I,K)*CDV(K))
          LI      R0,R13             ;(R0,R1)=MU(I,3)*CDV(3)
          LI      R1,R13
          DSRA    R0,7
          LI      R0,R14
          MUL     R0,R1
          DADD    R8,R0              ;(R8,R9)=SUM(MU(I,K)*CDV(K))
          DSLA    R8,2
          MOV     R1,R8
          SEXE    R0,R8
          ADDL    R13,-12
          JRTS
          EJEC
;DPPOP - POPS AN AVAILABLE DISPLAY ENTRY OFF DISPLAY STACK
;CALLING SEQUENCE;
;         JSUB    DPPOP(R)
;         R14=AVAILABLE ENTRY
DPPOP     PUSH    R13,1              ;SAVE REGISTER
          LM      R13,DISPNT(R)      ;R13=DISPLAY STACK POINTER
```

```
           LI     R14,R13            ;R14=AVAILABLE ENTRY
           SM     R13,DISPNT(R)      ;UPDATE STACK POINTER

POP    R13,1              ;RESTORE REGISTER
           JRTS                      ;RETURN
           EJEC
;DPPUSH - PUSHES AN AVAILABLE DISPLAY ENTRY ONTO DISPLAY STACK
;         AND TURNS CHAR OFF ON DISPLAY
;CALLING SEQUENCE;
;          R14=AVAILABLE ENTRY
;          JSUB   DPPUSH(R)
DPPUSH     PUSH   R13,1              ;SAVE REGISTER
           MOVL   R13,0
           SM     R13,DISBUF(R14)    ;TURN OFF CHAR IN BUFFER

SRZ    R14,1
           SM     R13,DSPCHR(R14)    ;TURN OFF CHAR ON DISPLAY

ADD    R14,R14
           LM     R13,DISPNT(R)      ;R13=DISPLAY STACK POINTER

ADDL   R13,-2
           S      R14,R13            ;PUSH ENTRY ONTO STACK
           SM     R13,DISPNT(R)      ;SAVE DISPLAY STACK POINTER

POP    R13,1              ;RESTORE REGISTER
           JRTS                      ;RETURN
;DSPDMP - DUMPS A DISPLAY BUFFER TO THE DISPLAY
;1ST WORD=CHARACTER (;FF00, IF END OF BUFFER)
;2ND WORD=X-Y
;CALLING SEQUENCE;
;          R14=BUFFER ADR
;          JSUB   DSPDMP(R)
DSPDMP     PUSH   R10,5              ;SAVE REGISTERS
           MOVL   R13,DSPXY/2-DSPCHR/2   ;R13=MAX CHARACTERS
           LA     R12,DSPCHR(A)      ;R12=DISPLAY CHR ADR

MOVL   R11,0              ;R11=CHAR
DSPDM1     CMPL   R11,0              ;PAST END OF BUFFER?
           BM     **6                ;YES
           LI     R11,R14            ;NO, R11=CHAR
           LI     R10,R14            ;R10=X-Y
           SI     R11,R12            ;CHAR TO DISPLAY
           SM     R10,DSPXY-DSPCHR-2(R12) ;X-Y TO DISPLAY

BCT    R13,DSPDM1
           POP    R14,5              ;RESTORE REGISTERS
           JRTS                      ;RETURN
           EJEC
;SCNSTP - COMPUTES SCNARIO TO STRAPDOWN XFORM MATRIX
;          SCTOST=(STORMT)T*(SDCOS)T
;CALLING SEQUENCE;
;          JSUB SCNSTP(R)
SCNSTP     LA     R14,STORMT(R)      ;R14=ADR STRAPDOWN TO REFERENCE
                                                DIRCOS

LA     R12,SCTOST(R)      ;R12=ADR SCNARIO TO STRAPDOWN
                                                DIRCOS

MOVL   R11,3              ;R11 COUNTS 3 ROWS
SCNST1     L      R8,R14             ;(R8,R9,R10)=STORMT ROW
           ADDL   R14,STOR21-STOR11
```

```
                L       R9,R14
                ADDL    R14,STOR31-STOR21
                L       R10,R14
                LA      R13,SDCOS(R)        ;R13=ADR REFERENCE TO SCNARIO
                                                         DIRCOS
                LI      R0,R13
                MUL     R0,R8
                L       R2,R13
                ADDL    R13,SDCS21-SDCS12
                MUL     R2,R9
                DADD    R0,R2
                DSLA    R0,2                ;RESCALE (2**14=1)
                SI      R0,R12              ;STORE 1ST COLUMN ENTRY
                MOVL    R7,2                ;R7 COUNTS LAST 2 COLUMNS
        SCNST2  LI      R0,R13              ;COMPUTE ENTRY FOR CURRENT ROW &
                                                         COLUMN
                MUL     R0,R8
                LI      R2,R13
                MUL     R2,R9
                DADD    R0,R2
                LI      R2,R13
                MUL     R2,R10
                DADD    R0,R2
                DSLA    R0,2
                SI      R0,R12              ;STORE COLUMN ENTRY OF CURRENT ROW
                BCT     R7,SCNST2
                ADDL    R14,STOR12-STOR31
                BCT     R11,SCNST1          ;ADVANCE TO NEXT ROW
                JRTS                        ;RETURN
                EJEC
;SCNDIS - COMPUTES SCNARIO TO DISPLAY XFORM MATRIX
;               SCTODS=STTOCS*SCTOST
;CALLING SEQUENCE;
;               JSUB SCNDIS(R)
        SCNDIS  LA      R14,STTODS(R)       ;R14=ADR STRAPDOWN TO DISPLAY XFORM
                                                         MATRIX

LA      R12,SCTODS(R)       ;R12=ADR SCNARIO TO DISPLAY XFORM
                                                         MATRIX
                MOVL    R1,3                ;R1 COUNTS 3 ROWS
        SCNDI1  LA      R13,SCTOST(R)       ;R13=ADR SCNARIO TO STRAPDOWN XFORM

MOVL    R11,3               ;R11 COUNTS 3 COLUMNS
                MOVL    R5,0                ;(R5,R6)=COLUMN 1 ACCUMULATOR
                MOVL    R6,0
                MOVL    R7,0                ;(R7,R8)=COLUMN 2 ACCUMULATOR
                MOVL    R8,0
                MOVL    R9,0                ;(R9,R10)=COLUMN 3 ACCUMULATOR
                MOVL    R10,0
        SCNDI2  LI      R4,R14              ;R4=STTODS(4=R1,4=R11) ENTRY
                BNZ     **4                 ;NOT ZERO, ACCUMULATE COLUMN SUM
                ADDL    R13,STNS21-STCS11   ;ZERO, SKIP TO NEXT SCTOST
                                                         ROW
                BR      SCNDI3
                LI      R2,R13
                MUL     R2,R4
                DADD    R5,R2
                LI      R2,R13
                MUL     R2,R4
```

```
                DADD    R7,R2
                LI      R2,R13
                MUL     R2,R4
                DADD    R9,R2
SCNDI3          BCT     R1,SCNDI2       ;ADVANCE TO NEXT STTODS COLUMN
                DSLA    R5,2            ;ADJUST SCALING (2**14=1)
                DSLA    R7,2
                DSLA    R9,2
                SI      R5,R12          ;STORE CURRENT ROW
                SI      R7,R12
                SI      R9,R12
                BCT     R1,SCNDI1       ;ADVANCE TO NEXT ROW
                JRTS                    ;RETURN
                EJEC
;ROWVC3 - DOT PRODUCT OF 3-ELEMENT VECTOR WITH A ROW OF 3*3 MATRIX
;CALLING SEQUENCE:
;       R14=ADDRESS OF MATRIX ROW
;       R13=ADDRESS OF VECTOR
;       JSUB ROWVC3(R)
;       (R0,R1)=DOT PRODUCT
;       R14=ADDRESS OF NEXT MATRIX ROW
;       R13=ADDRESS OF VECTOR
ROWVC3          JSUB    DZML30(R)       ;(R0,R1)=MAT(I,1)*VEC(1)

ADDL    R14,4
                ADDL    R13,4
                JSUB    DMUL30(R)       ;(R0,R1)=(R0,R1)+MAT(I,2)*VEC(2)

ADDL    R14,4
                ADDL    R13,4
                JSUB    DMUL30(R)       ;(R0,R1)=(R0,R1)+MAT(I,3)*VEC(3)

ADDL    R14,4
                ADDL    R13,-8
                JRTS                    ;RETURN
                EJEC
;SNGDBL - MULTIPLIES 32-BIT NUMBER BY 16-BIT NUMBER
;CALLING SEQUENCE:
;       R14=ADR 32 BIT NUMBER
;       R13=ADR 16 BIT NUMBER
;       JSUB SNGDBL(R)
;       (R0,R1)=PRODUCT
SNGDBL          PUSH    R2,4            ;SAVE REGISTERS
                MOVL    R2,0            ;(R2,R3)=0
                MOVL    R3,0
                LM      R5,2(R14)       ;(R4,R5)=DBL

L       R4,R14
                BM      SNGDM
                DADD    R2,R4           ;(R2,R3)=ABS(DBL)
                L       R0,R13          ;R0=SNG
                BP      SNGP            ;PRODUCT IS +
                NEG     R0,R0           ;R0=ABS(SNG)
                BR      SNGM            ;PRODUCT IS -
SNGDM           DSUB    R2,R4           ;(R2,R3)=ABS(DBL)
                L       R0,R13          ;R0=SNG
                BP      SNGM            ;PRODUCT IS -
                NEG     R0,R0
SNGM            MOV     R4,R3           ;NEGATIVE PRODUCT
                SRZ     R4,1            ;REMOVE SIGN BIT
                MUL     R4,R0
                DADD    R4,R4           ;RESTORE SIGN BIT
```

```
              LCL     R3,1                  ;WAS ONE BIT LOST?
              BZ      **8                   ;NO
              ADD     R5,R0                 ;YES, ADD IN AN R0
              MOVL    R3,0
              ADC     R4,R3                 ;ADD IN THE CARRY
              MUL     R2,R0
              ADD     R4,R3
              MOVL    R0,0
              MOVL    R1,0
              DSUB    R0,R4
              POP     R5,4                  ;RESTORE REGISTERS
              JRTS                          ;RETURN
SNGP          MOV     R4,R0                 ;POSITIVE PRODUCT
              MOV     R0,R3
              SRZ     R0,1                  ;REMOVE THE SIGN BIT
              MUL     R0,R4
              DADD    R0,R0                 ;RESTORE THE SIGN BIT
              LCL     R3,1                  ;WAS ONE BIT LOST?
              BZ      **6                   ;NO
              MOVL    R3,0                  ;YES, ADD IN AN R4
              DADD    R0,R3
              MUL     R2,R4
              ADD     R0,R3
              POP     R5,4                  ;RESTORE REGISTERS
              JRTS                          ;RETURN
              EJEC
;DZML30 - MULTIPLIES 32-BIT FACTORS SCALED 1=2**30
;        PRODUCT RETURNS IN (R0,R1)
;CALLING SEQUENCE:
;       R13=ADR OF FIRST FACTOR
;       R14=ADR OF SECOND FACTOR
;       JSUB DZML30(R)
;       (R0,R1)=PRODUCT
DZML30        MOVL    R0,0
              MOVL    R1,0
              JSUB    DMUL30(R)
;DMUL30 - MULTIPLIES 32-BIT FACTORS SCALED 1=2**30
;        AND ACCUMULATES RESULT IN (R0,R1)
;CALLING SEQUENCE:
;       R13=ADR OF FIRST FACTOR
;       R14=ADR OF SECOND FACTOR
;       (R0,R1)=PRODUCT ACCUMULATOR
;       JSUB DMUL30(R)
;       (R0,R1)=(R0,R1)+PRODUCT
DMUL30        PUSH    R2,8                  ;SAVE REGISTERS
              MOVL    R2,0                  ;(R2,R3)=0
              MOVL    R3,0
              MOVL    R5,0                  ;(R5,R6)=0
              MOVL    R6,0
              LM      R8,2(R13)             ;(R7,R8)=A
              L       R7,R13
              BM      DM30AM
              DADD    R2,R7                 ;(R2,R3)=ABS(A)
              LM      R8,2(R14)             ;(R7,R8)=B
              L       R7,R14
              BM      DM30A1
              DADD    R5,R7                 ;(R5,R6)=ABS(B)
              BR      DM30P                 ;PRODUCT IS +
DM30A1        DSUB    R5,R7                 ;(R5,R6)=ABS(B)
              BR      DM30M1                ;PRODUCT IS -
```

```
DM3@AM   DSUB    R2,R7              ;(R2,R3)=ABS(A)
         LM      R8,2(R14)          ;(R7,R8)=B

L       R7,R14
         BP      DM3@M              ;PRODUCT IS -
         DSUB    R5,R7              ;(R5,R6)=ABS(B)
DM3@P    DADD    R2,R2              ;PRODUCT IS +
         DADD    R5,R5
         JSUB    DMUL(R)            ;GET PRODUCT

DADD    R2,R2
         POP     R9,8               ;RESTORE REGISTERS
         JR?S                       ;RETURN
DM3@M    DADD    R5,R7              ;(R5,R6)=ABS(B)
DM3@M1   DADD    R2,R2              ;PRODUCT IS -
         DADD    R5,R5
         JSUB    DMUL(R)

DSUB    R2,R2
         POP     R9,8               ;RESTORE REGISTERS
         JR?S                       ;RETURN
         EJEC
;DMUL - MULTIPLIES 32-BIT UNSIGNED EVEN FACTORS
;        AND RETURN 32 MSB OF PRODUCT
;CALLING SEQUENCE;
;       (R2,R3)=32 BIT EVEN FACTOR
;       (R5,R6)=32 BIT EVEN FACTOR
;       JSUB DMUL(R)
;       (R2,R3)=32 MSB OF PRODUCT
DMUL     MOVL    R7,0               ;RESIDUAL=R7*2**48+R8*2**32+R9*2**16
         MOVL    R8,0
         LM      R9,'8000(I)        ;R9=ROUNDOFF BIT

MOVL    R4,0               ;R4=0 FOR ADC
         LCL     R2,1               ;BIT LOST FROM R2?
         BZ      *+6                ;NO
         DADD    R8,R5              ;YES, COMPUTE RESIDUAL
         ANDL    R2,'FE             ;MASK OFF LSB
         LCL     R5,1               ;BIT LOST FROM R5?
         BZ      *+6                ;NO
         DADD    R8,R2              ;YES, COMPUTE RESIDUAL
         ADC     R7,R4
         SRZ     R2,1               ;SHIFT OFF SIGN BITS
         SRZ     R3,1
         SRZ     R5,1
         SRZ     R6,1
         MUL     R3,R5
         DSLA    R3,2
         DADD    R8,R3              ;RESTORE SIGN BIT
         BNL     *+4
         ADDL    R7,1
         MOV     R3,R6
         MUL     R3,R2
         DSLA    R3,2               ;RESTORE SIGN BIT
         DADD    R8,R3
         BNL     *+4
         ADDL    R7,1
         MUL     R2,R5
         DSLA    R2,2
         DADD    R2,R7              ;ADD IN RESIDUAL
         JR?S                       ;RETURN
         EJEC
```

```
;DDIV30 - DIVIDES SIGNED 30BIT DIVIDEND BY POSITIVE 30BIT DIVISOR
;        QUOTIENT IS SCALED BY 2**30
;CALLING SEQUENCE:
;        R13=ADR DIVIDEND
;        R14=ADR DIVISOR
;        JSUB  DDIV30(R)
;        (R0,R1)=SCALED QUOTIENT
DDIV30   PUSH  R2,6            ;SAVE REGISTERS
         MOVL  R4,0            ;(R4,R5)=ABS(DIVIDEND)
         MOVL  R5,0
         LM    R1,2(R13)

L     R0,R13
         BP    DD30DP
         DSUB  R4,R0           ;DIVIDEND IS -
         LM    R3,2(R14)

L     R2,R14
         BP    DD30M           ;DIVISOR IS +
         COM   R2,R2           ;(R2,R3)=ABS(DIVISOR)
         NEG   R3,R3
         BNZ   DD30P
         ADDL  R2,1
         BR    DD30P
DD30M    JSUB  DDIV(R)         ;QUOTIENT IS -

COM   R0,R0           ;NEGATE IT
         NEG   R1,R1
         BNZ   **4
         ADDL  R0,1
         POP   R7,6            ;RESTORE REGISTERS
         JRTS                  ;RETURN
DD30DP   DADD  R4,R0           ;DIVIDEND IS +
         LM    R3,2(R14)

L     R2,R14
         BP    DD30P           ;DIVISOR IS +
         COM   R2,R2
         NEG   R3,R3
         BNZ   DD30M
         ADDL  R2,1
         BR    DD30M
DD30P    JSUB  DDIV(R)         ;QUOTIENT IS +

POP   R7,6            ;RESTORE REGISTERS
         JRTS                  ;RETURN
         EJEC
;DDIV - DIVIDES 30BIT DIVIDEND BY 30BIT DIVISOR
;        SCALES QUOTIENT BY 2**30
;        (UNSCALED QUOTIENT MUST BE LESS THAN 2)
;CALLING SEQUENCE:
;        (R2,R3)=30BIT DIVISOR
;        (R4,R5)=30BIT DIVIDEND
;        JSUB  DDIV(R)
;        (R0,R1)=SCALED QUOTIENT
DDIV     CMPL  R2,0            ;R2=0?
         BNZ   DDIV1           ;NO
         MOV   R4,R5           ;YES, SWAP R4&R5, R2&R3
         MOVL  R5,0
         MOV   R2,R3
         MOVL  R3,0
         DSRZ  R4,1            ;ENSURE SIGN BIT IS ZERO
```

```
           DSRZ   R2,1
DDIV1      CMPL   R2,'7F            ;SCALE DIVIDEND & DIVISOR
           BGT    *+6               ;SO THAT DIVISOR IS ABOUT 2**30
           DSLZ   R2,7
           DSLZ   R4,7
           CMPM   R2,'7FF(I)

BGT    *+6
           DSLZ   R2,4
           DSLZ   R4,4
           CMPM   R2,'1FFF(I)

BGT    *+6
           DSLZ   R2,2
           DSLZ   R4,2
           CMPM   R2,'3FFF(I)

BGT    *+6
           DSLZ   R2,1
           DSLZ   R4,1
           CMPL   R3,0              ;SIGN BIT OF B2 SET?
           BNM    DDIV1B            ;NO
           ADDL   R2,1              ;YES, USE IT AS NEGATIVE #
           BNV    DDIV1B            ;R2 ='8000?
           MOV    R0,R4             ;YES, DO SPECIAL COMPUTATION BY
                                                       SHIFTS
           MOV    R1,R5
           DSRZ   R0,1              ;(R0,R1)=2*(Q1,Q2)/2**2
           SRA    R3,1              ;R3=S/4 (IN CASE B2='8000)
           MUL    R3,R0
           DSLA   R3,2              ;R3=Q1*S=Q1*B2/(B1*2**16)
           SEXE   R2,R3             ;(R2,R3)=Q1*S/2**16
           DSUB   R0,R2             ;SUBTRACT CORRECTION
           JRTS                     ;RETURN
DDIV1B     MOVL   R7,0              ;SET QUOTIENT MSB
           CMP    R2,R4
           BHI    *+8
           SUB    R4,R2
           LM     R7,'4000(I)       ;R7=Q1 MSB
           MOVL   R6,0              ;R6=REM0
           LCL    R5,1
           BZ     *+4
           MOVL   R6,1
           DSRZ   R4,1
           DIV    R4,R2
           MOV    R0,R4             ;R0=QU01=2*Q
           ADD    R5,R5             ;R5=REM1=2*R+REM0
           ADD    R0,R0
           ADD    R5,R6
           MOVL   R6,0
DDIV2      CMP    R2,R5             ;ADJUST REMAINDER
           BHI    *+6
           SUB    R5,R2
           ADDL   R0,1
           DSRZ   R5,1
           DIV    R5,R2
           MOVL   R4,0
           MOV    R1,R5             ;R1=QU02=2*Q
           MOVL   R5,2              ;(R4,R5)=(0,2)
           ADD    R1,R1
           DADD   R0,R4             ;ROUND UP
```

```
              DSRZ    R0,2              ;(R0,R1)=(Q1',Q2')=(Q1,Q2)/4
              OR      R0,R7             ;OR IN MSB
              CMPL    R3,0              ;R3=B2=0?
              BZ      DDIVX             ;YES, EXIT
              MOVL    R4,0              ;(R3,R4)=(B2,0)/4
              DSRA    R3,2              ; IN CASE B2=!8000
              DIV     R3,R2             ;R3=S/4=(B2,0)/(4*B1)
              MUL     R3,R0             ;(R3,R4)=Q1*S/4
              DSLA    R3,2              ;(R3,R4)=Q1*S
              SEXE    R2,R3             ;(R2,R3)=Q1*S/2**16
              DSUB    R0,R2             ;SUBTRACT CORRECTION
DDIVX         JRTS                      ;RETURN
              EJEC
;DSQRT = CALCULATES 30BIT SQRT(R0,R1)
;CALLING SEQUENCE;
;       (R0,R1)=SQUARE
;       (R2,R3)=SQUARE ROOT ESTIMATE
;       JSUB DSQRT(R)
;       (R2,R3)=30BIT SQUARE ROOT
DSQRT         PUSH    R4,6              ;SAVE REGISTERS
              MOV     R9,R1             ;(R8,R9)=SQUARE
              MOV     R8,R0
              BP      DSQRT1            ;SQUARE IS POSITIVE
              MOVL    R2,0              ;SQUARE IS NEGATIVE, ZERO THE ROOT
              MOVL    R3,0
              POP     R9,6              ;RESTORE REGISTERS
              JRTS                      ;RETURN
DSQRT1        DSRA    R0,2              ;(R0,R1)=SQUARE/4
              JSUB    SQRT(R)           ;(R2,R3)=ESTIMATE
              MOVL    R3,0
              CMPL    R2,0              ;ESTIMATE 0?
              BNE     *+6               ;NO
              LM      R3,'8000(I)       ;YES, MAKE IT 2**(-15)
              MOV     R4,R8             ;(R4,R5)=SQUARE=DIVIDEND
              MOV     R5,R9
              PUSH    R2,2              ;DDIV DESTROYS REGISTERS 2-7
              JSUB    DDIV(R)           ;(R0,R1)=SQUARE/ESTIMATE
              POP     R3,2              ;RESTORE ESTIMATE
              DADD    R2,R0             ;(R2,R3)=ESTIMATE+SQUARE/ESTIMATE
              DSRZ    R2,1              ;(R2,R3)=(ESTIMATE+SQUARE/ESTIMATE)/2
              MOV     R0,R8             ;RESTORE SQUARE
              MOV     R1,R9
              POP     R9,6              ;RESTORE REGISTERS
              JRTS                      ;RETURN
              EJEC
;V3NRM = NORMALIZES 3 COMPONENT VECTOR
;CALLING SEQUENCE;
;       R14=VECTOR ADR
;       JSUB    V3NRM(R)
;       R14=VECTOR ADR
V3NRM         MOV     R13,R14           ;R13=V1 ADR
              JSUB    DSML30(R)         ;(R0,R1)=V1**2

ADDL    R14,4
              ADDL    R13,4
              JSUB    DMUL30(R)         ;(R0,R1)=V1**2+V2**2

ADDL    R14,4
              ADDL    R13,4
              JSUB    DMUL30(R)         ;(R0,R1)=V1**2+V2**2+V3**2
```

```
            LM      R2,'4000(I)

JSUB    DSQRT(R)          !(R2,R3)=SQRT(R0,R1)

LA      R14,V3SQRT(R)     !R14=ADR V3SQRT

SI      R2,R14
            S       R3,R14
            ADDL    R14,=2
            ADDL    R13,=2*4          !R13=ADR V1
            MOVL    R3,3              !R3 COUNTS 3 COMPONENTS
V3NRM1      JSUB    DDIV3O(R)         !(R0,R1)=V(I)/SQRT

SI      R0,R13
            SI      R1,R13
            BCT     R3,V3NRM1
            LA      R14,-12(R13)      !RESTORE R14

JRTS                      !RETURN
V3SQRT      DATA    0,0               !SQRT(V1**2+V2**2+V3**2)

EJEC
            IFN     DEBUG
!
!NUMBER PROCESSING - R1 CARRIES THE DIGIT
!
NBRFLG      LA      R2,NPROC(R)       !SET NFLAG

SM      R2,NFLAG(R)

SM      R2,CHRNBR(R)      !NEXT DIGIT GOES DIRECTLY TO NPROC

NPROC       PUSH    R4,2              !SAVE R4&R5
            LM      R4,CHRCOM(R)      !R4=# BASE

LM      R2,NBR2(R)        !R2=LSB*BASE

MUL     R2,R4
            ADD     R3,R1             !ADD IN DIGIT
            BNL     *+4
            ADDL    R2,1
            DSLZ    R2,1              !CLEAR SIGN BIT
            SRZ     R3,1
            SM      R3,NBR2(R)

LM      R5,NBR1(R)        !R5=MSB*BASE

MUL     R4,R5
            ADD     R5,R2             !ADD IN CURRENT HIGH ORDER DIGIT
            SM      R5,NBR1(R)

POP     R5,2              !RESTORE R4&R5
            JMPM    TTYEND(R)

EJEC
!I PROCESSING - INSPECT & MODIFY MEMORY
!
IPROC       LA      R1,IPRADD(R)      !FIRST CR GETS ADDRESS

SM      R1,CHRCR(R)
```

```
         MOVL    R1,16            ;SET BASE TO 16
         SM      R1,CHRCOM(R)

LA      R1,NBRFLG(R)     ;SET NUMBER PROCESSING FCR FLAG

SM      R1,CHRNBR(R)

JMPM    TTYN0(R)

IPRADD   LM      R1,MEMINI(R)     ;R1=OLD MEMORY ADR

LM      R2,NFLAG(R)      ;WAS NEW MEMORY ADR INPUT?

BZ      **+10            ;NO
         JSUB    HEXMSB(R)        ;YES, R1= NEW ADR

SM      R1,MEMINI(R)     ;UPDATE MEMORY ADR

SM      R1,MEMADR(R)     ;INIT CURRENT MEMORY ADR

LA      R1,IPRCR(R)      ;NEXT CR MAY MODIFY DATA

SM      R1,CHRCR(R)

LA      R1,IPRLF(R)      ;LF FETCHES NEXT LOCATION

SM      R1,CHRLF(R)

BR      IPRDIS           ;DISPLAY CONTENTS
IPRLF    MOVL    R0,'D            ;ECHO A CRLF
         JSUB    TTYOUT(R)

LM      R0,NFLAG(R)      ;MODIFY CONTENTS?

BZ      IPRDIS           ;NO
         JSUB    HEXMSB(R)        ;YES, R1=NEW CONTENTS

LM      R3,MEMADR(R)

SM      R1,-2(R3)

IPRDIS   LM      R1,MEMADR(R)     ;R1=MEMORY ADR

JSUB    TTYDIS(R)        ;DISPLAY ADR

MOV     R2,R1
         LI      R1,R2            ;R1=CONTENTS
         SM      R2,MEMADR(R)     ;UPDATE CURRENT ADR

JSUB    TTYDIS(R)        ;DISPLAY CONTENTS

LA      R0,NBRFLG(R)     ;SET UP # FLAG PROCESSING

SM      R0,CHRNBR(R)

JMPM    TTYN0(R)

IPRCR    LM      R0,NFLAG(R)      ;2ND IPROC CR

BZ      IPRCR1           ;NO MODIFICATIONS
         JSUB    HEXMSB(R)        ;R1=NEW CONTENTS
```

```
                LM      R3;MEMADR(R)    ;R3=MEMORY ADR+2

SM      R1,=2(R3)       ;UPDATE LOCATION CONTENTS

IPRCR1          JMPM    REINIT(R)       ;REINIT TTY PROCESSING

MEMINI          DATA    0               ;INITIAL MEMORY ADR
MEMADR          DATA    0               ;CURRENT MEMORY ADR
                EJEC
;PPROC - PRINTS MEMORY BLOCK
;
PPROC           LA      R1;PPCR(R)      ;CR PICKS UP TERMINAL ADR

SM      R1;CHRER(R)

LA      R1;PPCOL(R)     ;;PICKS UP INITIAL ADR

SM      R1;CHREOL(R)

MOVL    R1;16           ;SET BASE TO 16
                SM      R1;CHREOM(R)

LA      R1;NBRFLG(R)    ;SET NUMBER PROCESSING FOR FLAG

SM      R1;CHRNBR(R)

JMPM    TTYN0(R)

PPCOL           LM      R1;NFLAG(R)     ;ADDRESS INPUT?

BZ      $+10            ;NO
                JSUB    HEXMSB(R)       ;YES, GET NEW INITIAL ADR

SM      R1;PPADR1(R)    ;UPDATE INITIAL ADR

JMPM    TTYEND(R)

PPCR            LM      R1;NFLAG(R)     ;ADDRESS INPUT?

BZ      $+10            ;NO
                JSUB    HEXMSB(R)       ;YES, GET NEW TERMINAL ADR

SM      R1;PPADR2(R)

LM      R2;PPADR1(R)

PPLOP           LMB     R1;TKS(A)       ;IS USER TRYING TO ESCAPE?

BP      PPLOP2          ;NO
                LMB     R1;TKB(A)       ;PERHAPS, R1=INPUT CHAR

ANDL    R1;'7F
                CMPL    R1;'1B          ;ESCAPE?
                BE      PPLOPX          ;YES, EXIT
PPLOP2          MOV     R1;R2
                JSUB    TTYDIS(R)       ;DISPLAY ADR

LI      R1;R2
                JSUB    TTYDIS(R)       ;DISPLAY CONTENTS

MOVL    R0;'0D          ;TYPE CRLF
```

```
                JSUB     TTYOUT(R)

CMPM     R2;PPADR2(R)       ;DONE?

PPLOP           BLOS     PPLOP              ;NO
PPLOPX          JMPM     REINIT(R)          ;EXIT

PPADR1          DATA     0                  ;FIRST ADR OF MEMORY BLOCK
PPADR2          DATA     0                  ;SECOND ADR OF MEMORY BLOCK
                EJEC
;X PROCESSING - TRANSFERS PROGRAM CONTROL
;
XPROC           LA       R0;XCR(R)          ;SETUP X CR

SM       R0;CHRRR(R)

MOVL     R0;16              ;SET BASE TO 16
                SM       R0;CHRCOM(R)

JMPM     TTYN0(R)

XCR             LM       R0;NFLAG(R)        ;ADR INPUT?

BNE      *+6                ;YES
                JMPM     CHRERR(R)          ;NO ADR

JSUB     HEXMSB(R)          ;R1=EXECUTE ADR

LM       R0;'F0(I)          ;DISABLE INTERRUPTS

LSR      R0
                JMP      R1                 ;XFER CONTROL
                EJEC
;
;HEXMSB - MOVES SIGN BIT INTO WORD CONTAINING LSB'S
;CALLING SEQUENCE;
;       JSUB HEXMSB(R)
;       R1=16 LSB'S
HEXMSB          PUSH     R0;1               ;SAVE R0
                LM       R0;NBR1(R)         ;R0=MSB

LM       R1;NBR2(R)         ;R1=LSB'S

SLZ      R1;1               ;INSERT SIGN BIT
                DSRZ     R0;1
                POP      R0;1               ;RESTORE R0
                JRTS                        ;RETURN
                EJEC
;TTYOUT - OUTPUTS CHARACTER IN R0 TO TTY
;
TTYOUT          PUSH     R1;1               ;SAVE R1
TTYOT1          LMB      R1;TPS(A)          ;CHECK PRINT STATUS

BP       TTYOT1             ;BUSY
                SMB      R0;TPB(A)          ;OUTPUT CHAR

CMPL     R0;'A              ;LF?
                BE       TTYOTA             ;YES, WAIT FOR TTY
                CMPL     R0;'D              ;CR?
                BNE      TTYOT3             ;NO, RETURN
                MOVL     R0;'A              ;YES, SUPPLY A LF
TTYOT2          LMB      R1;TPS(A)
```

```
            BP      TTYOT2
            SMB     R0,TPB(A)

TTYOTA      MOVL    R0,'D
            LM      R1,'1(1)        ;LA 36 DOESN'T NEED A WAIT

BCT     R1,*
TTYOT3      POP     R1,1            ;RESTORE R1
            JRTS                    ;RETURN
            EJEC
;
;TTYDIS - TYPES CONTENTS OF R1
;
TTYDIS      PUSH    R0,3            ;SAVE REGISTERS
            MOVL    R2,4            ;R2 COUNTS 4 BYTES
TTYD1       MOVL    R0,0            ;OUTPUT R1
            DSLZ    R0,4
            ADDL    R0,'30
            CMPL    R0,'39
            BLE     *+4
            ADDL    R0,7
            JSUB    TTYOUT(R)

BCT     R2,TTYD1
            MOVL    R0,'20          ;OUTPUT A BLANK
            JSUB    TTYOUT(R)

POP     R2,3            ;RESTORE REGISTERS
            JRTS                    ;RETURN
            EJEC
;COMMAND CHARACTERS
;
CHRCOM      DATA    10              ;# BASE
            DATA    '49             ;I
            DATA    '0D             ;CR
            DATA    '0A             ;LF
            DATA    '50             ;P
            DATA    '3A             ;!
            DATA    '58             ;X
;
;INITIAL CHARACTER DISPATCHER
;
CHRINI      DATA    NBRFLG          ;# PROCESSOR
            DATA    IPROC           ;I PROCESSOR (INSPECT & MODIFY)
            DATA    CHRERR          ;CR PROCESS
            DATA    TTYEND          ;LF PROCESS
            DATA    PPROC           ;P PROCESSOR (PRINT)
            DATA    CHRERR          ;! PROCESS
            DATA    XPROC           ;X PROCESSOR (EXECUTE)
;
;WORKING CHARACTER DISPATCHER
;
CHRWRK      DATA    NBRFLG
CHRNBR      EQU     CHRWRK          ;# PROCESS IS MODIFIED
            DATA    IPROC
CHRCR       DATA    CHRERR          ;CR PROCESS IS MODIFIED
CHRLF       DATA    TTYEND          ;LF PROCESS IS MODIFIED
            DATA    PPROC
CHRCOL      DATA    CHRERR          ;! IS MODIFIED
            DATA    XPROC
```

```
CHRLEN   EQU      CHRINI/2-CHRCOM/2
NBR1     DATA     0              !MSB'S OF ACCUMULATED #
NBR2     DATA     0              !15 LSB'S OF ACCUMULATED #
NFLAG    DATA     0              !NUMBER FLAG
         IEND
         EJEC
!
!CONTROL PANEL DATA AREA
!
CPOLD    DATA     0              !OLD CONTROL PANEL STATUS
LMPWRD   DATA     '00FF          !PRESENT LAMP STATUS
TCHR     DATA     '4080          !CHAR "T"
TCHRXY   DATA     'C22F          !"T" POSITION
TRNLOC   DATA     0              !LOCATION OF "T" IN DISPLAY BUFFER
TSTLMP   DATA     -1             !-1/0 = TEST LAMP DISABLED/ENABLED
         EJEC
!
!DISPLAY DATA AREA
!
MAXTHR   EQU      32             !MAXIMUM THREAT DISPLAY
RFINT    EQU      64             !1/2 SECOND REFRESH RATE
REFRSH   DATA     0              !NEXT REFRESH TIME IN STRAPDOWN

SERVICE COUNTS

DSPENB   DATA     -1             !-1/0 = DISPLAY DISABLED/ENABLED
DSPMSL   DATA     0              !-/0/+ = MISSILE LAUNCH/INACTIVITY/ALERT
DISIR    DATA     -1             !-1/0/1/ NOT IR/IRS/IRT
DISBND   DATA     -1             !-1/1/2/3 ALL BANDS/BAND 1/BAND2/BAND3
DISNUM   DATA     MAXTHR         !CURRENT NUMBER OF THREATS ALLOWED
DISSCH   DATA     -1             !-1/0 NO SEARCH/SEARCH
DISLOK   DATA     0              !0/# FLOAT/LOCKED ON #
DISDMD   DATA     0              !CURRENT DIAMOND THREAT
DSP1ST   DATA     0              !THREAT ADR OF 1ST DISPLAYED THREAT
DSPNXT   DATA     0              !THREAT ADR OF THREAT FOLLOWING DIAMOND
                                                                THREAT

DISPRI   DATA     0              !-1/0/1 LO/AUTO/HI ALTITUDE PRIORITY
DISTRN   DATA     -1             !-1/0 NOT TRAINING/TRAINING
DISUNK   DATA     0              !-1/0 UNKNOWN DISABLED/ENABLED
DISTGT   DATA     0              !-1/0 SEPARATE/UNSEPARATED
DISLNG   DATA     0              !0/HANDL = LONG HANDOFF PUSH
                                                   INACTIVE/ACTIVE
DISAAA   DATA     0              !-1/0 AAA DISABLED/ENABLED
DISOFF   DATA     '8000          !DISPLAY TURNOFF BUFFER
DISPNT   DATA     0              !DISPLAY STACK POINTER
DISSTK   REPT     MAXTHR(0)      !DISPLAY STACK
DISBUF   REPT     MAXTHR(0)      !DISPLAY BUFFER
         REPT     MAXTHR(0)
ACTTHR   DATA     0              !# THREATS CURRENTLY DISPLAYED
DISCUR   DATA     0              !THREATS ON DISPLAY AT START OF REFRESH
                                                                CYCLE
DISPRC   DATA     0              !OLD THREATS PROCESSED THUS FAR IN REFRESH
                                                                CYCLE
DMDADR   DATA     -1             !DIAMOND DISPLAY ADR
DMDTIM   DATA     0              !MISSION TIME OF LAST DIAMOND UPDATE
DMDSYM   EQU      '12D0          !DIAMOND SYMBOL
SPOKES   REPT     32(0)          !TARGET SEPARATION DISPLAY SPOKES
TSTDIS   EQU      *              !DISPLAY TEST PATTERN BUFFER
         DATA     '1A80,'1070    !2
```

```
            DATA    '1980,'2880     ;2 BAR
            DATA    '1B80,'4197     ;3
            DATA    '1C80,'5EAF     ;4
            DATA    '1D80,'71C2     ;5
            DATA    '1E80,'86C6     ;6
            DATA    '8000           ;BUFFER END
            EJEC
;COMPENSATION DATA
;
;ACCELERATION
ABB         DATA    '3A              ;BIAS (1)
            DATA    '6               ;(2)
            DATA    'FFDD            ;(3)
CAB         DATA    '4FDF            ;ORTHO & SCALE FACTOR (1,1)
            DATA    '1               ;(1,2)
            DATA    'FFFA            ;(1,3)
            DATA    '4FE5            ;(2,2)
            DATA    '2E              ;(2,3)
            DATA    '4FE8            ;(3,3)
CABUBA      DATA    'A               ;SCALE FACTOR UNBALANCE (1,1)
            DATA    '9               ;(2,2)
            DATA    'FFFD            ;(3,3)
;
;ANGULAR VELOCITY
;
GBB         DATA    'FFF5            ;BIAS (1)
            DATA    '11              ;(2)
            DATA    'FF3A            ;(3)
CGB         DATA    '4,'EC56         ;ORTHO,ALIGN & SCALE (1,1)
            DATA    'FFBE            ;(1,2)
            DATA    'FFDB            ;(1,3)
            DATA    'FFBE            ;(2,1)
            DATA    '4,'ECFF         ;(2,2)
            DATA    'FF92            ;(2,3)
            DATA    'FFDB            ;(3,1)
            DATA    'FF92            ;(3,2)
            DATA    '4,'EBFD         ;(3,3)
CGBUBG      DATA    '0               ;SCALE FACTOR UNBALANCE (1,1)
            DATA    '0               ;(2,2)
            DATA    '0               ;(3,3)
CGBMU       DATA    '2B1             ;MASS UNBALANCE LSB=2**(-9)
                                     ; RAD/KM/SEC (1,1)
            DATA    'A49             ;(1,2)
            DATA    '178             ;(1,3)
            DATA    '3B8             ;(2,1)
            DATA    '1CE7            ;(2,2)
            DATA    'FC15            ;(2,3)
            DATA    'FA97            ;(3,1)
            DATA    'FF43            ;(3,2)
            DATA    '4C2D            ;(3,3)
KFAC        DATA    'A00,'A
OLDCX       DATA    0,0              ;PREVIOUS OX VALUE
OLDCZ       DATA    0,0              ;PREVIOUS OZ VALUE
```

```
OXDIF   DATA    0,0             ;PRESENT-PREVIOUS OX

OZDIF   DATA    0,0             ;PRESENT-PREVIOUS OZ

EJEC
;
;MISCELLANEOUS DATA
;
PRIBEG  DATA    0       ;POINTER TO HIGHEST PRIORITY THREAT
AFLG    DATA    0       ;ALIGNMENT FLAG 0/1 - UNALIGNED/ALIGNED
TIME    DATA    0.      ;TIME IN SECONDS
SECUPD  DATA    0       ;NEXT SECOND UPDATE AS COUNTED BY STRAPDOWN
                                                SERVICE
SSRVCT  DATA    0       ;STRAPDOWN SERVICE COUNT
SCNENB  DATA    -1      ;-1/0 = SCNARIO DISABLED/ENABLED
        EJEC
;REFERENCE FRAME DATA
;
ACPOS   EQU     *       ;AIRCRAFT POSITION VECTOR (2**16=1KM)
ACPOSX  DATA    0,0

ACPOSY  DATA    0,0

ACPOSZ  DATA    0,0

ACVEL   EQU     *       ;AIRCRAFT VELOCITY VECTOR (2**30=1KM/SEC)
ACVELX  DATA    0,0

ACVELY  DATA    0,0

ACVELZ  DATA    0,0

DACVEL  EQU     *       ;DELTA VELOCITY VECTOR
DACVLX  DATA    0,0

DACVLY  DATA    0,0

DACVLZ  DATA    0,0

GSCND   EQU     *       ;1 SEC GRAVITY ACCUMULATOR
GSCNDX  DATA    0,0

GSCNDY  DATA    0,0

GSCNDZ  DATA    0,0

GREF    EQU     *       ;GRAVITY*0.125 SEC  (2**30=1KM/SEC)
GREFX   DATA    0,0

GREFY   DATA    0,0

GREFZ   DATA    0,0

EJEC
;
;ALIGNMENT DATA
;
TIMKNT  DATA    0,0     ;NEGATIVE ALIGNMENT TIME COUNT

TIMINC  DATA    '0013,'31C5     ;6/(8*G*N*(N-1))
```

| | | | |
|---|---|---|---|
| ALNGN | DATA | '197E,'2F16 | !1/(G*N) |
| SDV | EQU | * | !SUMMATION VECTOR FOR DELTA VELOCITY IN REF FRAME |
| SDVX | DATA | 0.0 | |
| SDVY | DATA | 0.0 | |
| SDVZ | DATA | 0.0 | |
| SDVT | EQU | * | !SUMMATION VECTOR FOR DELTAV*TIMKNT IN REF FRAME |
| SDVTX | DATA | 0.0 | |
| SDVTY | DATA | 0.0 | |
| SDVTZ | DATA | 0.0 | |
| G0 | EQU | * | !NORMALIZED GRAVITY VECTOR AT T=0 |
| G0X | DATA | 0.0 | |
| G0Y | DATA | 0.0 | |
| G0Z | DATA | 0.0 | |
| G256 | EQU | * | !NORMALIZED GRAVITY VECTOR AT T=256 |
| G256X | DATA | 0.0 | |
| G256Y | DATA | 0.0 | |
| G256Z | DATA | 0.0 | |
| G1DIFF | DATA | 0.0 | !G0(1)=G256(1) |
| G2DIFF | DATA | 0.0 | !G0(2)=G256(2) |
| G3DIFF | DATA | 0.0 | !G0(3)=G256(3) |
| GSQRT | DATA | 0.0 | !SQRT OF SUM OF SQUARES |
| XE1 | DATA | 0.0 | !X-AXIS ROTATION E1 |
| XE2 | DATA | 0.0 | !X-AXIS ROTATION E2 |
| ZE1 | DATA | 0.0 | !Z-AXIS ROTATION E1 |
| ZE4 | DATA | 0.0 | !Z-AXIS ROTATION E4 |
| YE1 | DATA | 0.0 | !Y-AXIS ROTATION E1 |
| YE3 | DATA | 0.0 | !Y-AXIS ROTATION E3 |
| BE1 | DATA | '3FFF,'0253 | !GRAVITY BISECTION E1 |
| BE4 | DATA | 'FFB3,'8972 | !GRAVITY BISECTION E4 |
| XCOS | DATA | 0.0 | !X-AXIS ROTATION COS |
| XSIN | DATA | 0.0 | !X-AXIS ROTATION SIN |
| ZCOS | EQU | XCOS | !Z-AXIS ROTATION COS |

```
ZSIN      EQU    XSIN           ;Z-AXIS ROTATION SIN
YCOS      EQU    XCOS           ;Y-AXIS ROTATION COS
WE        DATA   '4C76,'9FF5    ;EARTH'S ROTATION RATE
                                 (1 RAD/SEC=2**30)

EJEC
;
;SCNARIO FRAME DATA
;
SACPOS    EQU    *              ;AIRCRAFT POSITION VECTOR (1KM=2**4)
ACX       DATA   0
ACY       DATA   0
ACZ       DATA   0
SACVEL    EQU    *              ;AIRCRAFT VELOCITY VECTOR (2**14=1KM/SEC)
ACVX      DATA   0
ACVY      DATA   0
ACVZ      DATA   0
WE2RE     DATA   0,'8E3F        ;WE**2*RE
COSPH2    DATA   0,0            ;COS(PHI)**2
COSPHI    DATA   0,0            ;COS(PHI)
SINPH2    DATA   0,0            ;SIN(PHI)**2
SINPHI    DATA   0,0            ;SIN(PHI)
COSLT2    DATA   0,0            ;LATITUDE COSINE**2
COSLAT    DATA   0,0            ;LATITUDE COSINE
SINLT2    DATA   0,0            ;SINE(LAT)**2
SINLAT    DATA   0,0            ;LATITUDE SINE
RAD       DATA   0,0            ;SQRT(COS(LAT)**2=G0(2)**2)
COSWE     DATA   '3FFF,'FFFD    ;COS(WE*1 SEC)
SINWEM    DATA   'FFFE,'CE26    ;-SIN(WE*1 SEC)
SINWE     DATA   '1,'31BA       ;SIN(WE*1 SEC)
EASTV     DATA   0,0            ;EAST VELOCITY
COSWT     DATA   0,0            ;COS(WE*T)
SINWT     DATA   0,0            ;SIN(WE*T)
SX2Y2     DATA   0,0            ;SQRT(ACPOSX**2+ACPOSY**2)
RMAG      DATA   0,0            ;SQRT(ACPOSX**2+ACPOSY**2+ACPOSZ**2)
COSLTN    DATA   0,0            ;COS(PRESENT LATITUDE)
SINLTN    DATA   0,0            ;SIN(PRESENT LATITUDE)
COSLNN    DATA   0,0            ;COS(PRESENT RELATIVE LONGITUDE)
SINLNN    DATA   0,0            ;SIN(PRESENT RELATIVE LONGITUDE)
SNLTN2    DATA   0,0            ;SIN(PRESENT LAT)**2
```

```
WERE    DATA    '10C4,'4025       ;EARTH'S ROTATION*EARTH'S RADIUS
AVE     DATA    0,0               ;EAST VELOCITY RELATIVE TO EARTH
AVN     DATA    0,0               ;NORTH VELOCITY RELATIVE TO EARTH
SVNVE   DATA    0,0               ;SQRT(AVN**2+AVE**2)
COSHD   DATA    0,0               ;COS(HEADING)
SINHD   DATA    0,0               ;SIN(HEADING)
SINDLN  DATA    0,0               ;SIN(LONGITUDE CHANGE)
COSDLN  DATA    0,0               ;COS(LONGITUDE CHANGE)
ERE     DATA    'FFEA,'9E48       ;=ECCENTRICITY*RE
EWERE   DATA    'FFE6,'7454       ;=WE*RE*ECCENTRICITY
SXY     DATA    0                 ;DIST TO SCNARIO ORIGIN*COS(LAT)
                                  ; (2**2=1KM)
SORG    EQU     $                 ;SCNARIO ORIGIN VECTOR (2**16=1KM)
SORGX   DATA    0,0               ;ORIGIN X-COORDINATE
SORGY   DATA    0,0               ;ORIGIN Y-COORDINATE
SORGZ   DATA    0,0               ;ORIGIN Z-COORDINATE
SDCOS   EQU     $                 ;REFERENCE TO SCNARIO D-COSINE
                                  ; (2**14=1)
SDCS11  DATA    0
SDCS12  DATA    0
SDCS13  DATA    0
SDCS21  DATA    0
SDCS22  DATA    0
SDCS23  DATA    0
SDCS31  DATA    0
SDCS32  DATA    0
SDCS33  DATA    0
SORGR   DATA    0,0               ;DISTANCE FROM EARTH CENTER TO
                                  ; SCNARIO ORIGIN

EJEC
;
;STRAPDOWN FRAME DATA
;
BADCNT  DATA    0                 ;# OF LITTON DATA ERRORS
RAWDV   REPT    3(0)              ;NET DELTA VELOCITY PULSES
RAWDVM  REPT    3(0)              ;TOTAL DELTA VELOCITY PULSES
RAWDO   REPT    3(0)              ;NET DELTA ANGLE PULSES
RAWDOM  REPT    3(0)              ;TOTAL DELTA ANGLE PULSES
CDO     EQU     $                 ;COMPENSATED DELTA ANGLE VECTOR
CDOX    DATA    0,0
CDOY    DATA    0,0
CDOZ    DATA    0,0
CDV     EQU     $                 ;COMPENSATED DELTA VELOCITY VECTOR
CDVX    DATA    0,0
```

```
CDVY    DATA    0.0

CDVZ    DATA    0.0

PCDO    EQU     *               ;PREVIOUS COMPENSATED ANGLES
PCDOX   DATA    0.0

PCDOY   DATA    0.0

PCDOZ   DATA    0.0

EJEC
;
;RELATIONSHIPS BETWEEN STRAPDOWN & REFERENCE FRAMES
;
;QUATERNIONS FROM REFERENCE TO STRAPDOWN
;
EVEC    EQU     *
E1      DATA    0.0

E2      DATA    0.0

E3      DATA    0.0

E4      DATA    0.0

;
;DIRECTION COSINE MATRIX FROM STRAPDOWN TO REFERENCE
;
STORMT  EQU     *
STOR11  DATA    0.0

STOR12  DATA    0.0

STOR13  DATA    0.0

STOR21  DATA    0.0

STOR22  DATA    0.0

STOR23  DATA    0.0

STOR31  DATA    0.0

STOR32  DATA    0.0

STOR33  DATA    0.0

;
;QUATERNION ROTATION MATRIX = OPPOSITE SENSE ROTATION QUATERNION
;
ROTMT   EQU     *
ROT11   DATA    0.0

ROT12   DATA    0.0

ROT13   DATA    0.0

ROT14   DATA    0.0

EJEC
```

```
; RELATIONSHIP BETWEEN STRAPDOWN AND SCNARIO FRAMES
;
SCTOST   EQU    *                    ;SCNARIO TO STRAPDOWN XFORM MATRIX
STOS11   DATA   0
STOS12   DATA   0
STOS13   DATA   0
STOS21   DATA   0
STOS22   DATA   0
STOS23   DATA   0
STOS31   DATA   0
STOS32   DATA   0
STOS33   DATA   0
         EJEC
;
; RELATIONSHIP BETWEEN STRAPDOWN AND DISPLAY FRAME
;
STTODS   EQU    *
STOD11   DATA   'D2BF
STOD12   DATA   '2D41
STOD13   DATA   0
STOD21   DATA   '2D41
STOD22   DATA   '2D41
STOD23   DATA   0
STOD31   DATA   0
STOD32   DATA   0
STOD33   DATA   'C000
         EJEC
;
; RELATIONSHIP BETWEEN SCNARIO AND DISPLAY FRAME
;
SCTODS   EQU    *                    ;SCNARIO TO DISPLAY XFORM MATRIX
         REPT   9(0)
         EJEC
;
; THREAT TABLE OFFSETS
;
THRPNT   EQU    0                    ;NEXT THREAT (DESCENDING PRIORITY)
THRFLG   EQU    THRPNT+2             ;MISCELLANEOUS THREAT FLAGS
THRX     EQU    THRFLG+2             ;X-COORDINATE (1KM=2**4)
THRY     EQU    THRX+2               ;Y-COORDINATE (1KM=2**4)
THRZ     EQU    THRY+2               ;Z-COORDINATE (1KM=2**4)
THRUPD   EQU    THRZ+2               ;TIME OF LAST UPDATE (1 SEC)
THRVEL   EQU    THRUPD+2             ;THREAT VELOCITY (1KM/SEC=2**14)
THRVX    EQU    THRVEL+2             ;VELOCITY X-COMPONENT (1KM/SEC=2**14)
THRVY    EQU    THRVX+2              ;VELOCITY Y-COMPONENT (1KM/SEC=2**14)
THRVZ    EQU    THRVY+2              ;VELOCITY Z-COMPONENT (1KM/SEC=2**14)
THRWR    EQU    THRVZ+2              ;WEAPONS RANGE (1KM=2**4)
THRON    EQU    THRWR+2              ;THREAT TURN ON RANGE (1KM=2**4)
THRPRI   EQU    THRON+2              ;THREAT PRIORITY (DISPLAY RADIUS)
THRRNG   EQU    THRPRI+2             ;RANGE (1KM=2**4)
THRSYM   EQU    THRRNG+2             ;THREAT DISPLAY SYMBOL (BITS 7-15)
THRIMS   EQU    THRSYM+1             ;INITIAL # OF ARMED MISSILES (BITS 0-6)
THROCT   EQU    THRSYM+2             ;THREAT OCTAGON DISPLAY ADR (LEFT BYTE)
THRADR   EQU    THROCT+1             ;THREAT DISPLAY ADDRESS (RIGHT BYTE)
THRCMS   EQU    THRADR+1             ;CURRENT # OF ARMED MISSILES (LEFT BYTE)
THREVL   EQU    THRCMS+1             ;EVALUATION TIME (1 SEC) (RIGHT BYTE)
THRMV    EQU    THREVL+1             ;THREAT MISSILE VELOCITY (1KM/SEC=2**14)
THRINT   EQU    THRMV+2              ;TIME TO MISSILE INTERCEPT (SEC)
THRMFR   EQU    THRINT+2             ;RANGE OF FIRST MISSILE FIRING (1KM=2**4)
THRPRF   EQU    THRMFR+2             ;LEFT BYTE = THREAT AUDIO TONE
THRBND   EQU    THRPRF+1             ;RIGHT BYTE = RF BAND (1-3)
```

```
THRLEN   EQU    THRBND/2+1      ;THREAT ENTRY WORD LENGTH
;
;THRFLG DEFINITION
;
MASTYP   EQU    '7F             ;THREAT TYPE MASK
TYSRCH   EQU    '0              ;SEARCH RADAR
TYUNK    EQU    '1              ;UNKNOWN RADAR
TYAAA    EQU    '2              ;AAA RADAR
TYOTHR   EQU    '3              ;OTHER RADARS
MASACT   EQU    '300            ;THREAT ACTIVITY
CNTON    EQU    '000            ;THREAT IS ON
CNTOFF   EQU    '100            ;THREAT IS TO BE TURNED OFF BY
                                 DISPLAY DRIVER
CNTLNT   EQU    '200            ;THREAT IS LATENT
CNTEXP   EQU    '300            ;THREAT HAS EXPIRED, IDLE LOOP
                                 REMOVES FROM THREAT LIST
MASMIS   EQU    'C00            ;MISSILE ACTIVITY MASK
CNTMOF   EQU    '000            ;MISSILE INACTIVE
CNTMLT   EQU    '400            ;MISSILE LATENT
CNTMAT   EQU    '800            ;MISSILE ALERT
CNTMLN   EQU    'C00            ;MISSILE LAUNCH
;
;SCNARIO THREAT DATA
;
COSDRE   DATA   '3FFA,'2E42     ;COS(START DISTANCE/RE)
                                ; = 170KM=START DIST
SINDRE   DATA   '184,'A35F      ;SIN(START DISTANCE/RE)
NTHRT    DATA   4               ;# THREATS IN TABLE
THRTAB   EQU    *               ;THREAT TABLE
;FIRST THREAT IS A SEARCH RADAR
         DATA   0               ;POINTER
         DATA   0               ;FLAGS
         DATA   0               ;X
         DATA   0               ;Y
         DATA   0               ;Z
         DATA   0               ;UPDATE
         DATA   0               ;VELOCITY
         DATA   0               ;VX
         DATA   0               ;VY
         DATA   0               ;VZ
         DATA   '7FFF           ;WEAPON RANGE
         DATA   '7FFF           ;TURN ON RANGE
         DATA   2*RING3-RING2   ;PRIORITY
         DATA   0               ;RANGE
         DATA   '2F80           ;"S"
         DATA   0               ;DISPLAY ADR
         DATA   0               ;EVAL TIME
         DATA   0               ;MISSILE VELOCITY
         DATA   0               ;TIME TO INTERCEPT
         DATA   0               ;NO MISSILE FIRING
         DATA   '5100           ;PRF TONE='51, BAND=0
;2ND THREAT IS UNKNOWN BAND 2
         DATA   0               ;POINTER
         DATA   '201            ;FLAG=LATENT UNKNOWN
         DATA   30              ;X
         DATA   0               ;Y
         DATA   0               ;Z
         DATA   0               ;UPDATE
         DATA   0               ;VELOCITY
         DATA   0               ;VX
```

```
            DATA    0              ;VY
            DATA    0              ;VZ
            DATA    '7FFF          ;WEAPON RANGE
            DATA    '7FFF          ;TURN ON RANGE
            DATA    'FF            ;PRIORITY
            DATA    0              ;RANGE
            DATA    '1580          ;"U" BAND 2
            DATA    0              ;DISPLAY ADR
            DATA    0              ;EVAL TIME
            DATA    0              ;MISSILE VELOCITY
            DATA    0              ;TIME TO INTERCEPT
            DATA    0              ;NO MISSILE FIRING
            DATA    '7F02          ;PRF TONE='7F, BAND=2
;3RD THREAT IS AAA BAND 3
            DATA    0              ;POINTER
            DATA    '202           ;FLAG=LATENT AAA
            DATA    30             ;X
            DATA    0              ;Y
            DATA    0              ;Z
            DATA    0              ;UPDATE
            DATA    0              ;VELOCITY
            DATA    0              ;VX
            DATA    0              ;VY
            DATA    0              ;VZ
            DATA    '7FFF          ;WEAPON RANGE
            DATA    '7FFF          ;TURN ON RANGE
            DATA    'FF            ;PRIORITY
            DATA    0              ;RANGE
            DATA    '1180          ;"A" BAND 1
            DATA    0              ;DISPLAY ADR
            DATA    0              ;EVAL TIME
            DATA    0              ;MISSILE VELOCITY
            DATA    0              ;TIME TO INTERCEPT
            DATA    0              ;NO MISSILE FIRING
            DATA    '5501          ;PRF TONE='55, BAND=1
;4TH THREAT IS AI BAND 3
            DATA    0              ;POINTER
            DATA    '203           ;FLAG=LATENT OTHER
            DATA    '300           ;X
            DATA    0              ;Y
            DATA    0              ;Z
            DATA    0              ;UPDATE
            DATA    '199B          ;VELOCITY
            DATA    0              ;VX
            DATA    0              ;VY
            DATA    0              ;VZ
            DATA    '31C           ;WEAPON RANGE
            DATA    '7FFF          ;TURN ON RANGE
            DATA    'FF            ;PRIORITY
            DATA    0              ;RANGE
            DATA    '2180          ;AI SYMBOL
            DATA    0              ;DISPLAY ADR
            DATA    0              ;EVAL TIME
            DATA    0              ;MISSILE VELOCITY
            DATA    0              ;TIME TO INTERCEPT
            DATA    0              ;NO MISSILE FIRING
            DATA    '6103          ;PRF TONE='61, BAND=3
STACKP      EQU     *
            END
```

We claim:

1. A method for providing inflight training scenarios for a radar warning receiver aboard a military aircraft comprising the steps of:

storing data including an indication of the type and position of simulated search and threat weapon radar sources relative to an arbitrary point at which said training scenario is started, determining the position of said military aircraft with respect to said arbitrary point, determining the attitude and position of said aircraft, and computing coordinates which represent the location of said aircraft with respect to simulated radar source coordinates, comparing the position of said aircraft with respect to said arbitrary point to the position of simulated radar sources as reflected by said stored data to determine the distance between said aircraft and said simulated radar sources, providing a visual display of those simulated radar sources that are within a predetermined range from said aircraft, providing an audible signal to the operator of said radar warning receiver upon said aircraft coming within a predetermined distance of certain ones of said simulated radar sources, providing an input via the controls of said radar warning receiver indicating simulated radar sources associated with certain types of anti aircraft weapons systems that are not to be displayed; and preventing the display of said last mentioned simulated radar sources when said last mentioned input is present.

2. The method in accordance with claim 1 further comprising the steps of utilizing the aircraft attitude, position and simulated radar source coordinates and information included in said stored data which indicates the radar warning receiver antenna shadowing of said aircraft as previously determined by aircraft parameters to blank appropriate ones of said simulated radar sources from said video display.

3. The method in accordance with claim 1 further comprising the steps of:

determining when certain ones of said simulated radar sources aboard aircraft flying a course to intercept the military aircraft undergoing training with the inflight training scenario have already intercepted and passed said last mentioned military aircraft; and preventing the display of ones of said intercept aircraft that have passed said military aircraft.

4. The method in accordance with claim 1 further comprising the steps of:

providing an input via the controls of said radar warning receiver indicating simulated radar sources associated with certain types of anti aircraft weapons systems that are not to be displayed; and preventing the display of said last mentioned simulated radar sources when said last mentioned input is present.

5. The method in accordance with claim 1 further comprising the steps of:

determining when certain ones of said simulated radar sources aboard aircraft flying a course to intercept the military aircraft undergoing training with the inflight training scenario have already intercepted and passed said last mentioned military aircraft; and preventing the display of ones of said intercept aircraft that have passed said military aircraft.

* * * * *